[12] United States Patent
Uyeki

(10) Patent No.: US 7,366,606 B2
(45) Date of Patent: Apr. 29, 2008

(54) METHOD FOR REFINING TRAFFIC FLOW DATA

(75) Inventor: Robert Uyeki, Torrance, CA (US)

(73) Assignee: Honda Motor Co., Ltd., Tokyo (JP)

(*) Notice: Subject to any disclaimer, the term of this patent is extended or adjusted under 35 U.S.C. 154(b) by 238 days.

(21) Appl. No.: 11/096,675

(22) Filed: Mar. 30, 2005

(65) Prior Publication Data
US 2005/0222751 A1 Oct. 6, 2005

Related U.S. Application Data

(60) Provisional application No. 60/560,087, filed on Apr. 6, 2004.

(51) Int. Cl.
G01C 21/26 (2006.01)
(52) U.S. Cl. ...................... 701/117; 340/933
(58) Field of Classification Search ................ 701/117, 701/118, 119; 340/933, 934, 936, 937, 942
See application file for complete search history.

(56) References Cited

U.S. PATENT DOCUMENTS

| | | |
|---|---|---|
| 3,283,297 A | 11/1966 | Pfennighausen et al. |
| 4,234,964 A | 11/1980 | Cieslak et al. |
| 4,245,352 A | 1/1981 | Karpowycz et al. |
| 5,125,105 A | 6/1992 | Kennedy et al. |
| 5,155,491 A | 10/1992 | Ando |
| 5,173,691 A | 12/1992 | Sumner |
| 5,182,555 A | 1/1993 | Sumner |
| 5,280,641 A | 1/1994 | Ishii et al. |
| 5,303,401 A | 4/1994 | Duckeck et al. |
| 5,359,529 A | 10/1994 | Snider |
| 5,406,490 A | 4/1995 | Braegas |
| 5,428,544 A | 6/1995 | Shyu |
| 5,465,088 A | 11/1995 | Braegas |
| 5,508,931 A | 4/1996 | Snider |
| 5,539,645 A | 7/1996 | Mandhyan et al. |
| 5,608,635 A | 3/1997 | Tamai |
| 5,635,924 A | 6/1997 | Tran et al. |
| 5,636,245 A | 6/1997 | Ernst et al. |
| 5,648,768 A | 7/1997 | Bouve |
| 5,649,300 A | 7/1997 | Snyder et al. |
| 5,682,525 A | 10/1997 | Bouve et al. |
| 5,691,723 A | 11/1997 | King et al. |
| 5,699,056 A | 12/1997 | Yoshida |
| 5,774,827 A | 6/1998 | Smith et al. |
| 5,822,712 A * | 10/1998 | Olsson ........................ 701/117 |

(Continued)

FOREIGN PATENT DOCUMENTS

DE 10 2004 017091 10/2005

(Continued)

Primary Examiner—Dalena Tran
(74) Attorney, Agent, or Firm—O'Melveny & Myers LLP

(57) ABSTRACT

Traffic information, including traffic flow information and traffic incident information, obtained through a traffic management system for providing and facilitating the exchange of traffic information between a remote location and a vehicle may be presented to a user on a user display in the vehicle. In one embodiment, traffic information provided to a vehicle navigation device is refined by comparing the average speed of the vehicle against the average speed of other vehicles traveling along the same road. In another embodiment, the operation of a traffic signal is controlled based, in part, on the current traffic flow and distance from the traffic signal to alleviate traffic congestion.

12 Claims, 55 Drawing Sheets

U.S. PATENT DOCUMENTS

| | | |
|---|---|---|
| 5,842,146 A | 11/1998 | Shishido |
| 5,862,510 A | 1/1999 | Saga et al. |
| 5,864,305 A | 1/1999 | Rosenquist |
| 5,892,463 A | 4/1999 | Hikita et al. |
| 5,911,773 A | 6/1999 | Mutsuga et al. |
| 5,926,108 A | 7/1999 | Wicks et al. |
| 5,928,307 A | 7/1999 | Oshizawa et al. |
| 5,959,577 A | 9/1999 | Fan et al. |
| 5,982,298 A | 11/1999 | Lappenbusch et al. |
| 5,991,629 A | 11/1999 | Agrawal et al. |
| 5,999,882 A | 12/1999 | Simpson et al. |
| 6,078,865 A | 6/2000 | Koyanagi |
| 6,085,146 A | 7/2000 | Kuribayashi et al. |
| 6,111,521 A | 8/2000 | Mulder et al. |
| 6,137,992 A | 10/2000 | Mohan et al. |
| 6,150,961 A | 11/2000 | Alewine et al. |
| 6,163,751 A | 12/2000 | Van Roekel |
| 6,169,894 B1 | 1/2001 | McCormick et al. |
| 6,178,378 B1 | 1/2001 | Leibold |
| 6,204,778 B1 * | 3/2001 | Bergan et al. .............. 340/936 |
| 6,208,918 B1 | 3/2001 | Ando et al. |
| 6,208,932 B1 | 3/2001 | Ohmura et al. |
| 6,208,935 B1 | 3/2001 | Yamada et al. |
| 6,236,359 B1 | 5/2001 | Watters et al. |
| 6,240,364 B1 | 5/2001 | Kerner et al. |
| 6,253,146 B1 | 6/2001 | Hanson et al. |
| 6,255,963 B1 | 7/2001 | Heimann et al. |
| 6,266,607 B1 | 7/2001 | Meis et al. |
| 6,266,608 B1 | 7/2001 | Pertz |
| 6,297,748 B1 | 10/2001 | Lappenbusch et al. |
| 6,298,302 B2 | 10/2001 | Walgers et al. |
| 6,317,685 B1 | 11/2001 | Kozak et al. |
| 6,317,686 B1 | 11/2001 | Ran |
| 6,321,158 B1 | 11/2001 | DeLorme et al. |
| 6,333,703 B1 | 12/2001 | Alewine et al. |
| 6,334,086 B1 | 12/2001 | Park et al. |
| 6,349,211 B2 | 2/2002 | Koshima et al. |
| 6,349,261 B1 | 2/2002 | Ohnishi et al. |
| 6,351,709 B2 | 2/2002 | King et al. |
| 6,370,454 B1 | 4/2002 | Moore |
| 6,385,539 B1 | 5/2002 | Wilson et al. |
| 6,408,307 B1 | 6/2002 | Semple et al. |
| 6,433,704 B1 | 8/2002 | Fushiki et al. |
| 6,438,490 B2 | 8/2002 | Ohta |
| 6,453,230 B1 | 9/2002 | Geurts |
| 6,480,783 B1 | 11/2002 | Myr |
| 6,493,546 B2 | 12/2002 | Patsiokas |
| 6,522,250 B1 | 2/2003 | Ernst et al. |
| 6,526,335 B1 | 2/2003 | Treyz et al. |
| 6,529,143 B2 | 3/2003 | Mikkola et al. |
| 6,539,302 B1 | 3/2003 | Bender et al. |
| 6,542,822 B1 | 4/2003 | Froeberg |
| 6,546,330 B2 | 4/2003 | Fushiki et al. |
| 6,546,333 B2 | 4/2003 | Tanaka et al. |
| 6,549,833 B2 | 4/2003 | Katagishi et al. |
| 6,552,682 B1 | 4/2003 | Fan |
| 6,553,308 B1 | 4/2003 | Uhlmann et al. |
| 6,553,309 B2 | 4/2003 | Uchida et al. |
| 6,553,313 B1 | 4/2003 | Froeberg |
| 6,583,734 B2 | 6/2003 | Bates et al. |
| 6,584,401 B2 | 6/2003 | Kirshenbaum et al. |
| 6,587,777 B1 | 7/2003 | St. Pierre |
| 6,587,785 B2 | 7/2003 | Jijina et al. |
| 6,587,787 B1 | 7/2003 | Yokota |
| 6,590,507 B2 | 7/2003 | Burns |
| 6,591,188 B1 | 7/2003 | Ohler |
| 6,594,576 B2 | 7/2003 | Fan et al. |
| 6,594,580 B1 | 7/2003 | Tada et al. |
| 6,603,405 B2 | 8/2003 | Smith |
| 6,608,559 B1 | 8/2003 | Lemelson et al. |
| 6,611,753 B1 | 8/2003 | Millington |
| 6,615,130 B2 | 9/2003 | Myr |
| 6,615,133 B2 | 9/2003 | Boies et al. |
| 6,618,669 B2 | 9/2003 | Ota et al. |
| 6,622,083 B1 | 9/2003 | Knockeart et al. |
| 6,622,087 B2 | 9/2003 | Anderson |
| 6,650,948 B1 | 11/2003 | Atkinson et al. |
| 6,657,558 B2 | 12/2003 | Horita et al. |
| 6,664,922 B1 | 12/2003 | Fan |
| 6,680,674 B1 | 1/2004 | Park |
| 6,680,694 B1 | 1/2004 | Knockeart et al. |
| 6,707,421 B1 | 3/2004 | Drury et al. |
| 6,708,085 B2 | 3/2004 | Yamane et al. |
| 6,721,650 B2 | 4/2004 | Fushiki et al. |
| 6,728,920 B1 | 4/2004 | Ebersman |
| 6,730,940 B1 | 5/2004 | Steranka et al. |
| 6,735,504 B2 | 5/2004 | Katagishi et al. |
| 6,741,188 B1 | 5/2004 | Miller et al. |
| 6,760,661 B2 | 7/2004 | Klein et al. |
| 6,785,551 B1 | 8/2004 | Richard |
| 6,785,606 B2 * | 8/2004 | DeKock et al. .............. 701/117 |
| 6,798,358 B2 | 9/2004 | Joyce et al. |
| 6,804,602 B2 | 10/2004 | Impson et al. |
| 6,810,323 B1 | 10/2004 | Bullock et al. |
| 6,810,328 B2 | 10/2004 | Yokota et al. |
| 6,812,860 B1 | 11/2004 | Schwarzwalder, Jr. |
| 6,812,888 B2 | 11/2004 | Drury et al. |
| 6,816,778 B2 | 11/2004 | Diaz |
| 6,819,268 B2 | 11/2004 | Wakamatsu et al. |
| 6,823,263 B1 | 11/2004 | Kelly et al. |
| 6,836,667 B1 | 12/2004 | Smith, Jr. |
| 6,842,609 B2 | 1/2005 | Davis et al. |
| 6,850,842 B2 | 2/2005 | Park |
| 6,859,720 B2 | 2/2005 | Satoh et al. |
| 6,859,726 B2 | 2/2005 | Choi |
| 6,859,728 B2 | 2/2005 | Sakamoto et al. |
| 6,862,524 B1 | 3/2005 | Nagda et al. |
| 6,868,331 B2 | 3/2005 | Hanebrink |
| 6,870,487 B2 | 3/2005 | Nuesser et al. |
| 6,920,328 B2 | 7/2005 | Wollrab |
| 6,920,382 B2 | 7/2005 | Katagishi et al. |
| 6,957,134 B2 | 10/2005 | Ramseyer et al. |
| 6,973,384 B2 | 12/2005 | Zhao et al. |
| 7,006,903 B2 | 2/2006 | Smith et al. |
| 7,050,818 B2 | 5/2006 | Tendler |
| 7,096,115 B1 * | 8/2006 | Groth et al. ................. 701/117 |
| 7,155,376 B2 * | 12/2006 | Yang et al. .................... 703/8 |
| 2001/0001848 A1 | 5/2001 | Oshizawa et al. |
| 2001/0029425 A1 | 10/2001 | Myr |
| 2001/0044285 A1 | 11/2001 | Hirayasu |
| 2002/0016655 A1 | 2/2002 | Joao |
| 2002/0025777 A1 | 2/2002 | Kawamata et al. |
| 2002/0049531 A1 | 4/2002 | Tanaka et al. |
| 2002/0059017 A1 | 5/2002 | Yamane et al. |
| 2002/0062236 A1 | 5/2002 | Murashita |
| 2002/0067289 A1 | 6/2002 | Smith |
| 2002/0115436 A1 | 8/2002 | Howell et al. |
| 2002/0128773 A1 | 9/2002 | Chowanic et al. |
| 2002/0152021 A1 | 10/2002 | Ota et al. |
| 2002/0193926 A1 | 12/2002 | Katagishi et al. |
| 2003/0006912 A1 | 1/2003 | Brescia |
| 2003/0028312 A1 | 2/2003 | Matsuoka et al. |
| 2003/0060977 A1 | 3/2003 | Jijina et al. |
| 2003/0069683 A1 | 4/2003 | Lapidot |
| 2003/0069978 A1 | 4/2003 | Cherry et al. |
| 2003/0125866 A1 | 7/2003 | Mori et al. |
| 2003/0139880 A1 | 7/2003 | Leimbach et al. |
| 2003/0158640 A1 | 8/2003 | Pillar et al. |
| 2003/0163248 A1 | 8/2003 | Mizuishi |
| 2003/0167110 A1 | 9/2003 | Smith et al. |
| 2003/0169182 A1 | 9/2003 | Wilhelm et al. |
| 2003/0182034 A1 | 9/2003 | Katagishi et al. |
| 2003/0191583 A1 | 10/2003 | Uhlmann et al. |
| 2003/0194980 A1 | 10/2003 | Peterson, III et al. |

| | | |
|---|---|---|
| 2003/0206549 A1 | 11/2003 | Mody et al. |
| 2003/0208313 A1 | 11/2003 | Wells et al. |
| 2003/0216859 A1 | 11/2003 | Martell et al. |
| 2003/0225516 A1 | 12/2003 | DeKock et al. |
| 2003/0225668 A1 | 12/2003 | Goto et al. |
| 2003/0236613 A1 | 12/2003 | Satoh et al. |
| 2004/0010366 A1 | 1/2004 | Videtich |
| 2004/0043760 A1 | 3/2004 | Rosenfeld et al. |
| 2004/0059613 A1 | 3/2004 | Ford et al. |
| 2004/0059618 A1 | 3/2004 | Ford et al. |
| 2004/0068364 A1 | 4/2004 | Zhao et al. |
| 2004/0073356 A1 | 4/2004 | Craine |
| 2004/0080430 A1 | 4/2004 | Videtich |
| 2004/0083037 A1 | 4/2004 | Yamane et al. |
| 2004/0102898 A1 | 5/2004 | Yokota et al. |
| 2004/0104842 A1 | 6/2004 | Drury et al. |
| 2004/0110515 A1 | 6/2004 | Blumberg et al. |
| 2004/0117113 A1 | 6/2004 | Friedrichs et al. |
| 2004/0119612 A1 | 6/2004 | Chen |
| 2004/0148099 A1 | 7/2004 | Kim |
| 2004/0150534 A1 | 8/2004 | Linn |
| 2004/0158392 A1 | 8/2004 | Choi |
| 2004/0158395 A1 | 8/2004 | Yamada et al. |
| 2004/0167710 A1 | 8/2004 | Fushiki et al. |
| 2004/0172192 A1 | 9/2004 | Knutson |
| 2004/0179625 A1 | 9/2004 | Kim |
| 2004/0193343 A1 | 9/2004 | Tan et al. |
| 2004/0198217 A1 | 10/2004 | Lee et al. |
| 2004/0203403 A1 | 10/2004 | Cutcher et al. |
| 2004/0203436 A1 | 10/2004 | Oesterling |
| 2004/0203909 A1 | 10/2004 | Koster |
| 2004/0204821 A1 | 10/2004 | Tu |
| 2004/0233070 A1 | 11/2004 | Finnern |
| 2004/0233101 A1 | 11/2004 | Kim |
| 2004/0239526 A1 | 12/2004 | Nakajima |
| 2004/0239531 A1 | 12/2004 | Adamczyk |
| 2004/0246147 A1 | 12/2004 | von Grabe |
| 2004/0249530 A1 | 12/2004 | Kelly et al. |
| 2004/0249531 A1 | 12/2004 | Kelly et al. |
| 2005/0003781 A1 | 1/2005 | Kunz et al. |
| 2005/0015197 A1 | 1/2005 | Ohtsuji et al. |
| 2005/0015199 A1 | 1/2005 | Lokshin et al. |
| 2005/0024236 A1 | 2/2005 | Gosdin et al. |
| 2005/0027436 A1 | 2/2005 | Yoshikawa et al. |
| 2005/0027442 A1 | 2/2005 | Keley et al. |
| 2005/0027447 A1 | 2/2005 | Hirose et al. |
| 2005/0027449 A1 | 2/2005 | Marsh |
| 2005/0038596 A1 | 2/2005 | Yang et al. |
| 2005/0043880 A1 | 2/2005 | Yamane et al. |
| 2005/0046594 A1 | 3/2005 | Taylor |
| 2005/0065717 A1 | 3/2005 | Meuller et al. |
| 2005/0093720 A1 | 5/2005 | Yamane et al. |
| 2005/0096840 A1 | 5/2005 | Simske |
| 2005/0131626 A1 | 6/2005 | Ignatin |
| 2005/0131628 A1 | 6/2005 | Peeters |
| 2005/0137763 A1 | 6/2005 | Watkins et al. |
| 2005/0143882 A1 | 6/2005 | Umezawa |
| 2005/0222760 A1 | 10/2005 | Cabral et al. |
| 2006/0055565 A1 | 3/2006 | Kawamata et al. |
| 2006/0058037 A1 | 3/2006 | Kenyon |

FOREIGN PATENT DOCUMENTS

| | | |
|---|---|---|
| EP | 1276088 | 1/2003 |
| WO | WO 9701940 | 1/1997 |
| WO | WO 9934343 | 7/1999 |

* cited by examiner

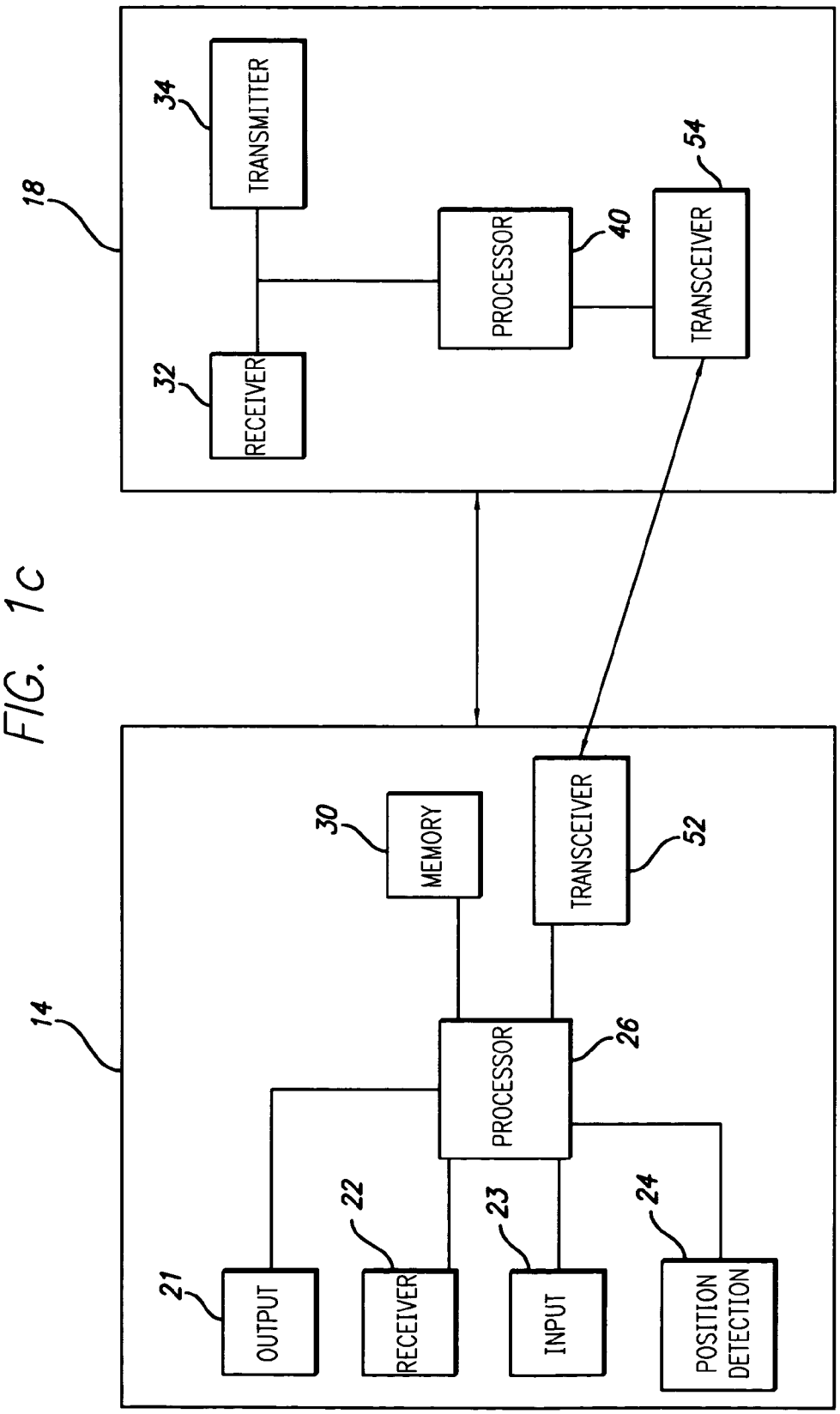

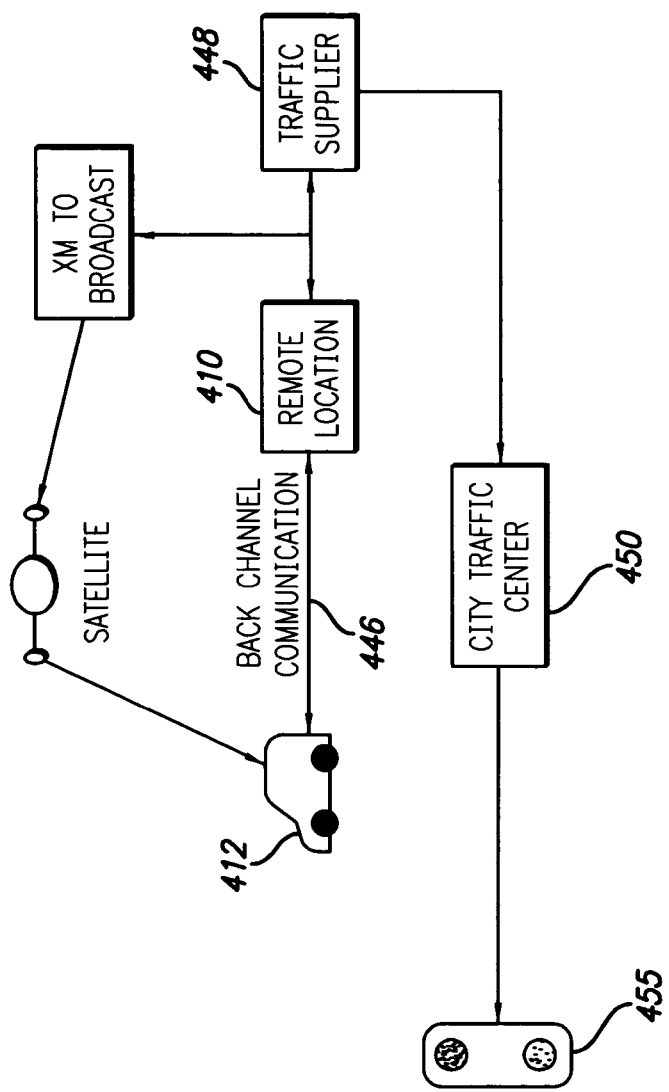
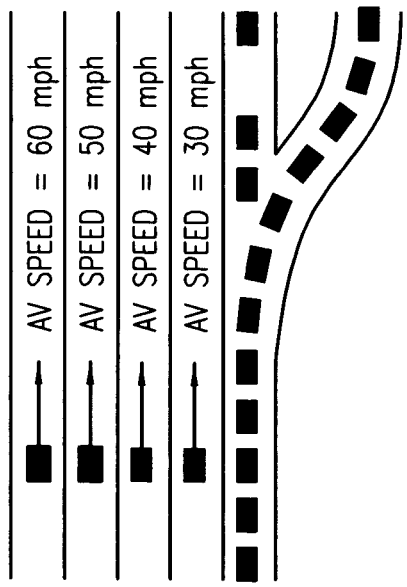
FIG. 4

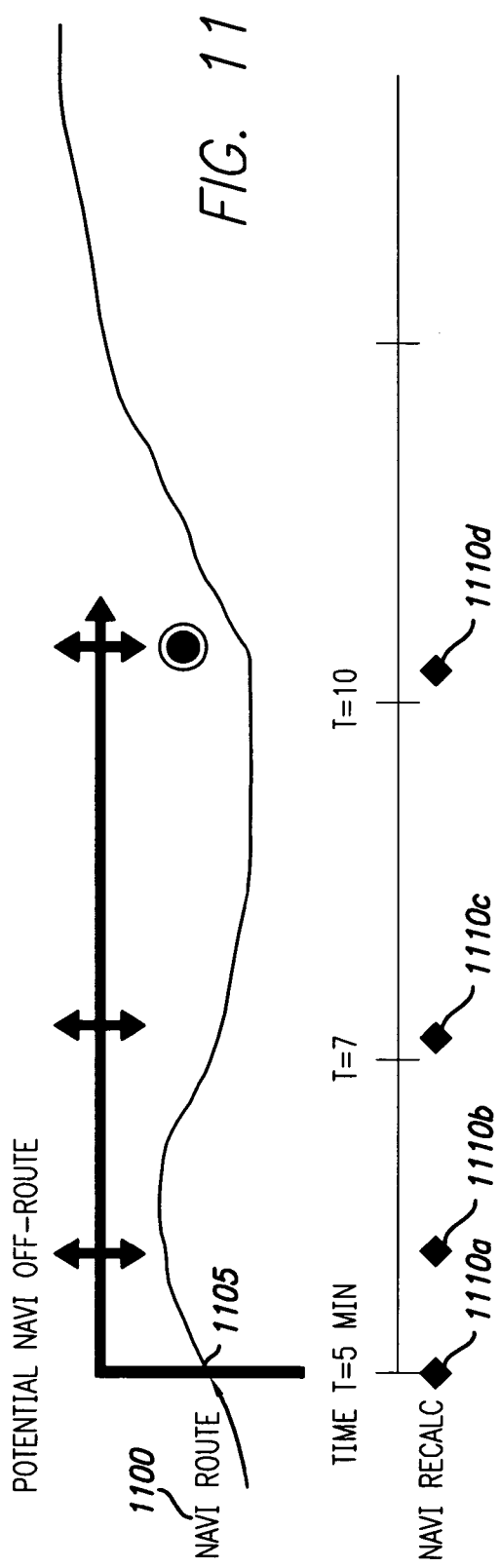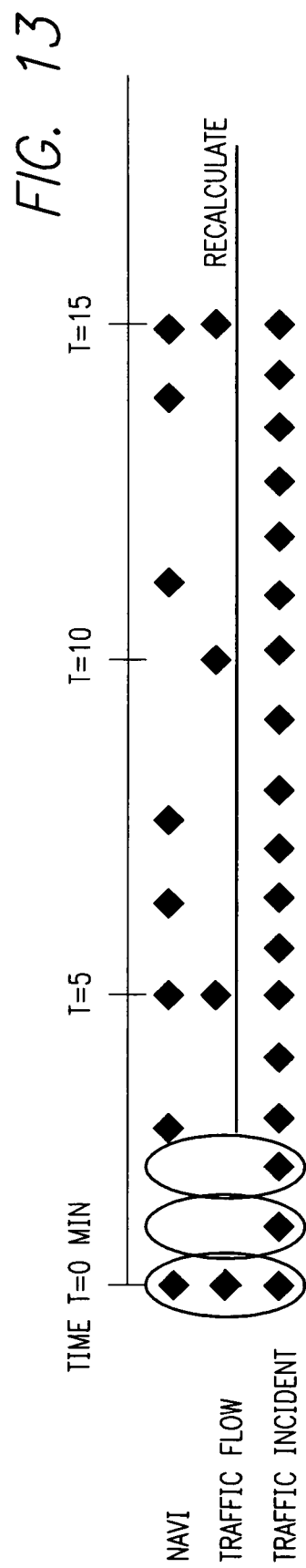

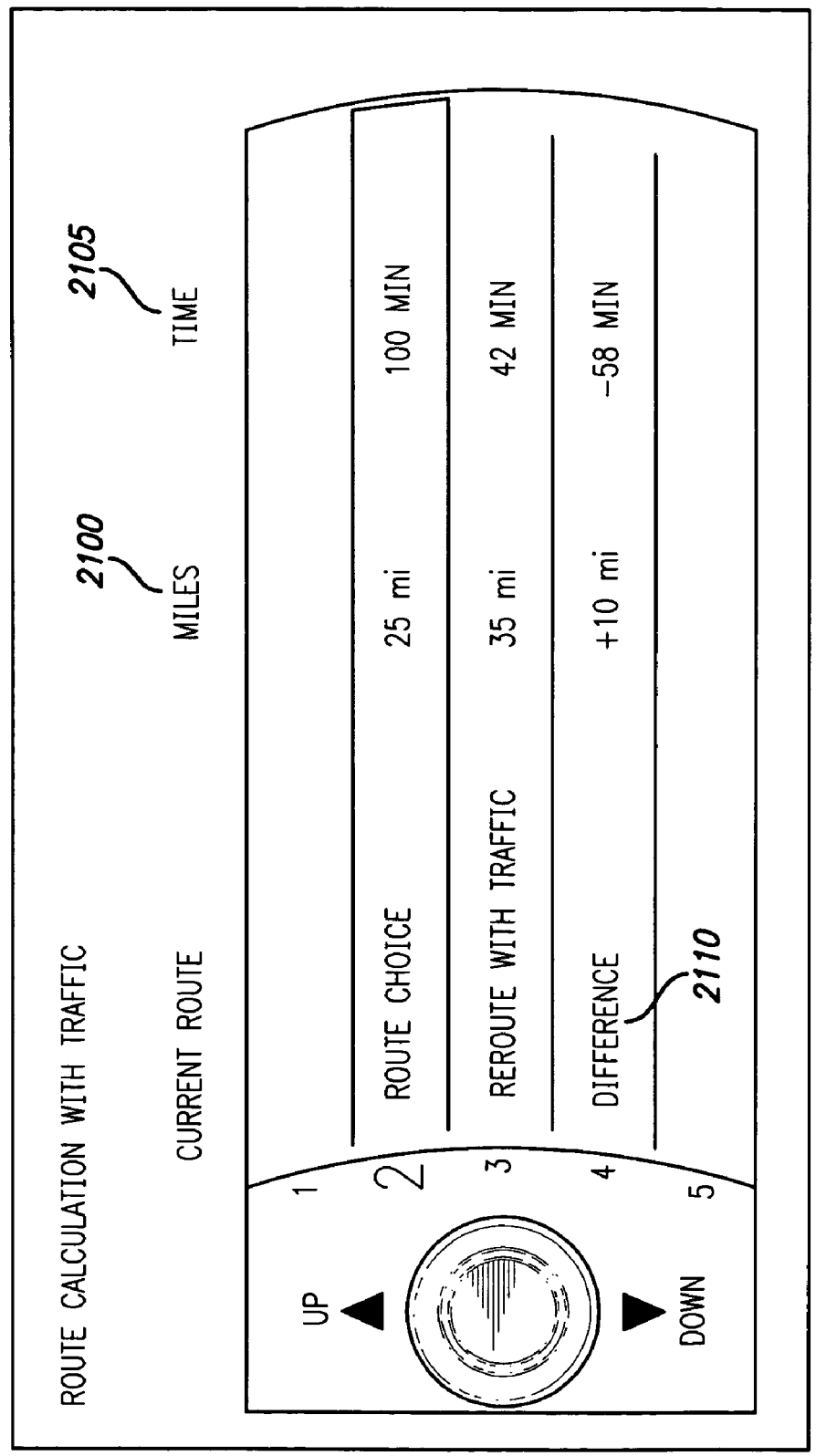

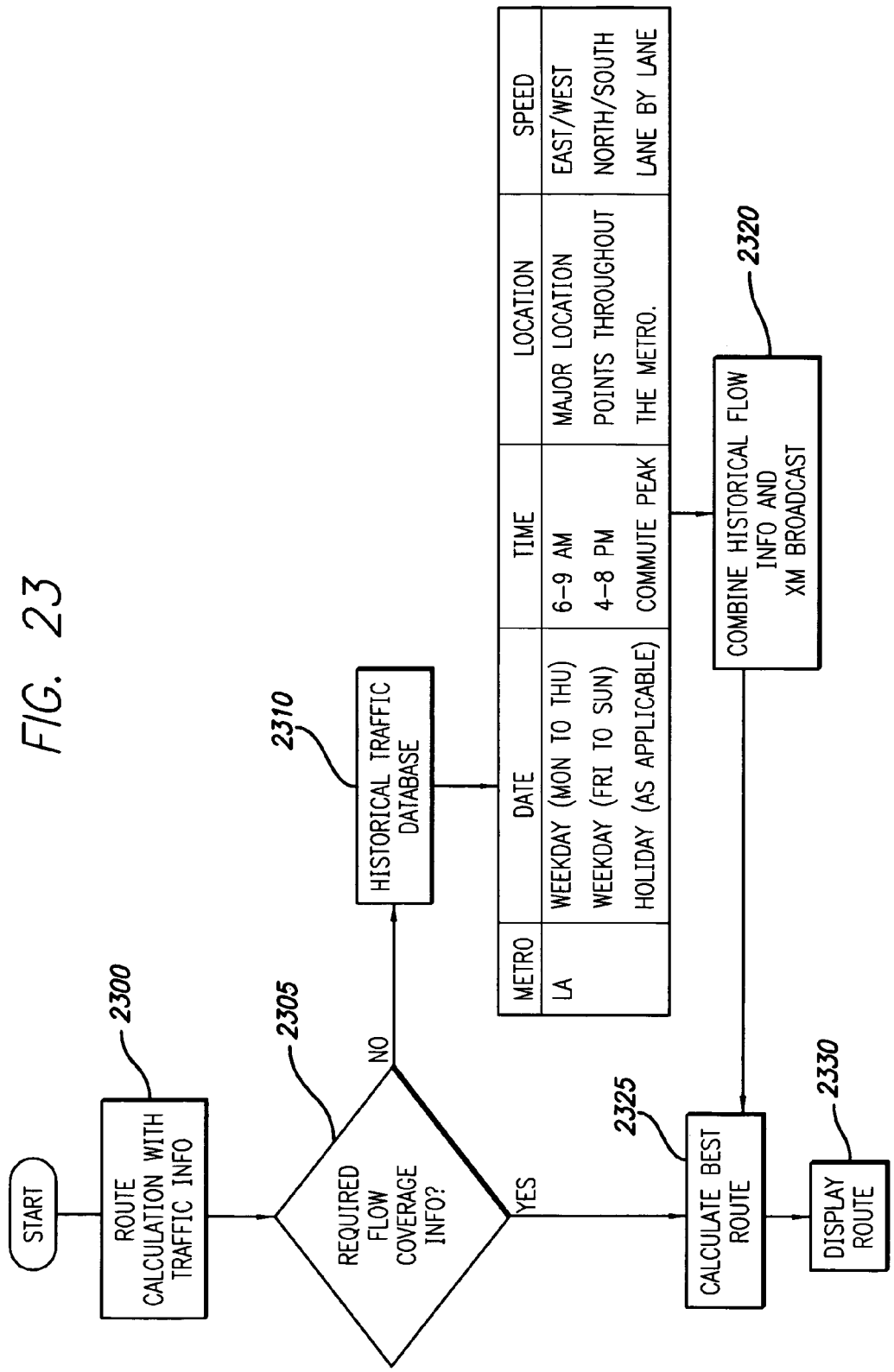

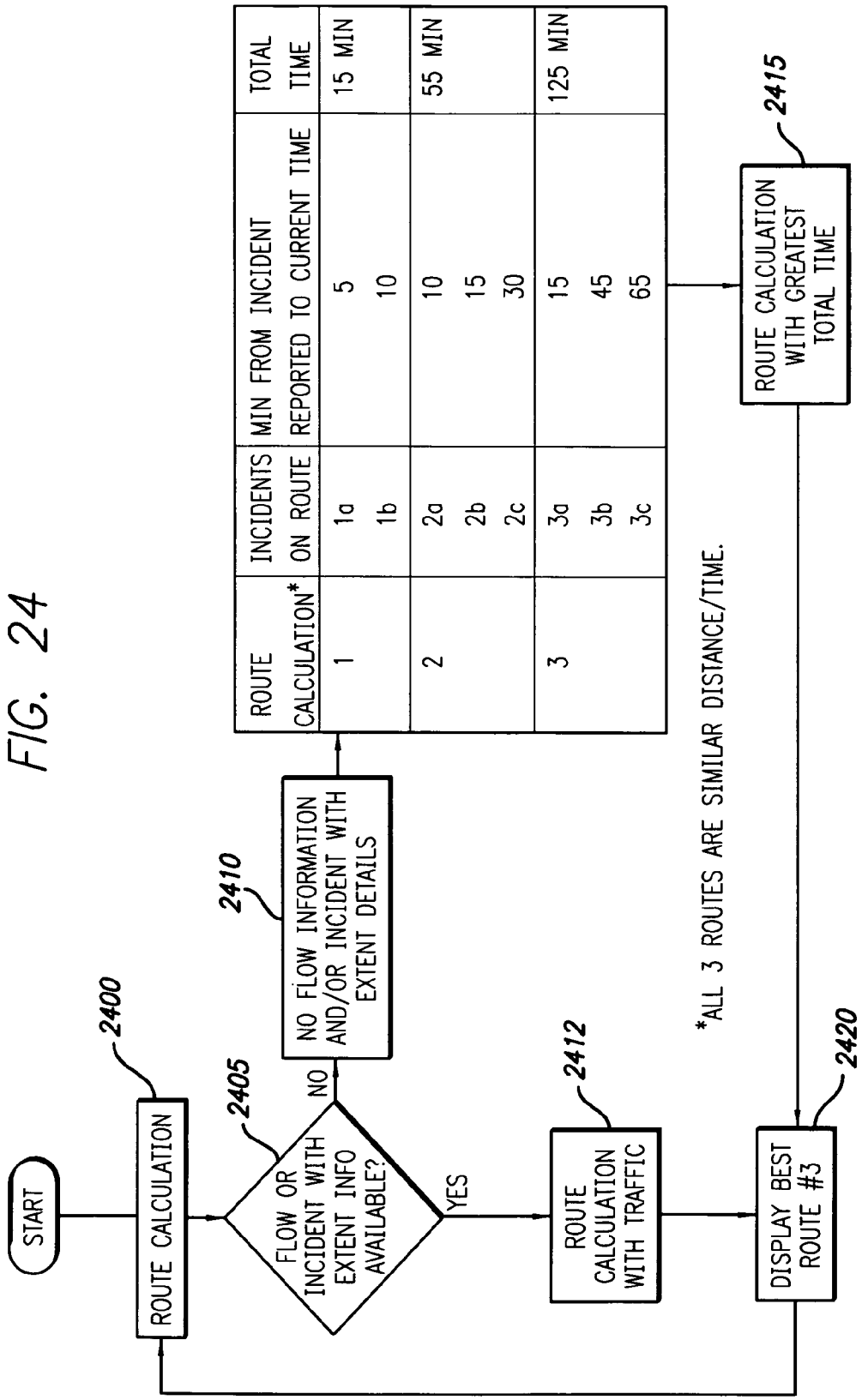

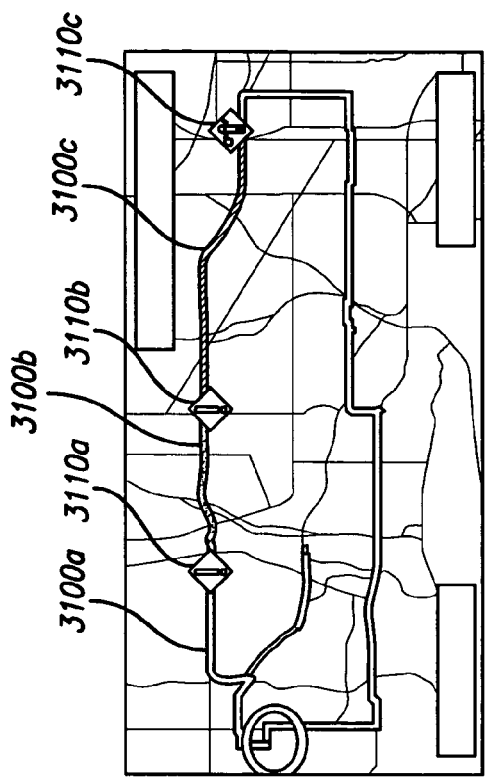
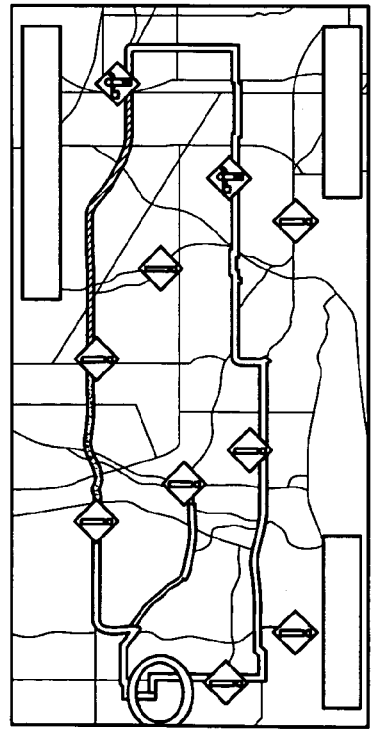
FIG. 31b
FIG. 31a
METHOD 1:

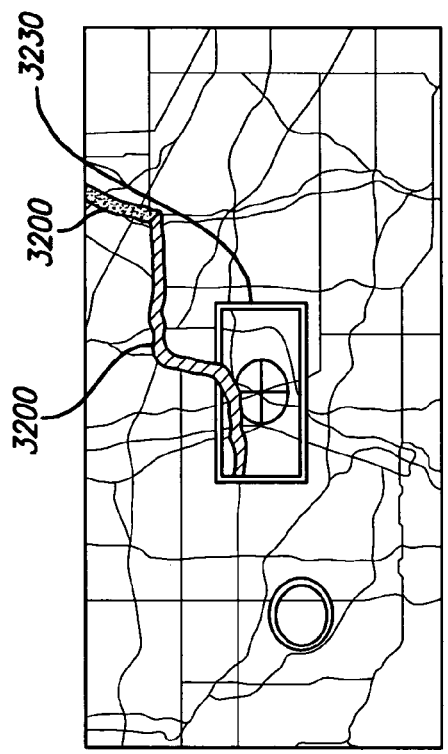
FIG. 32b
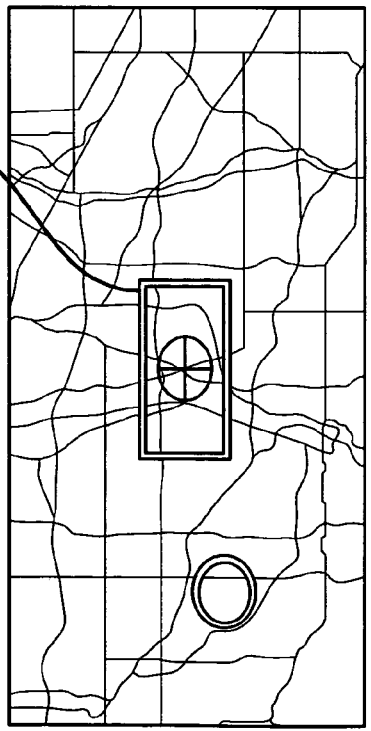
FIG. 32a

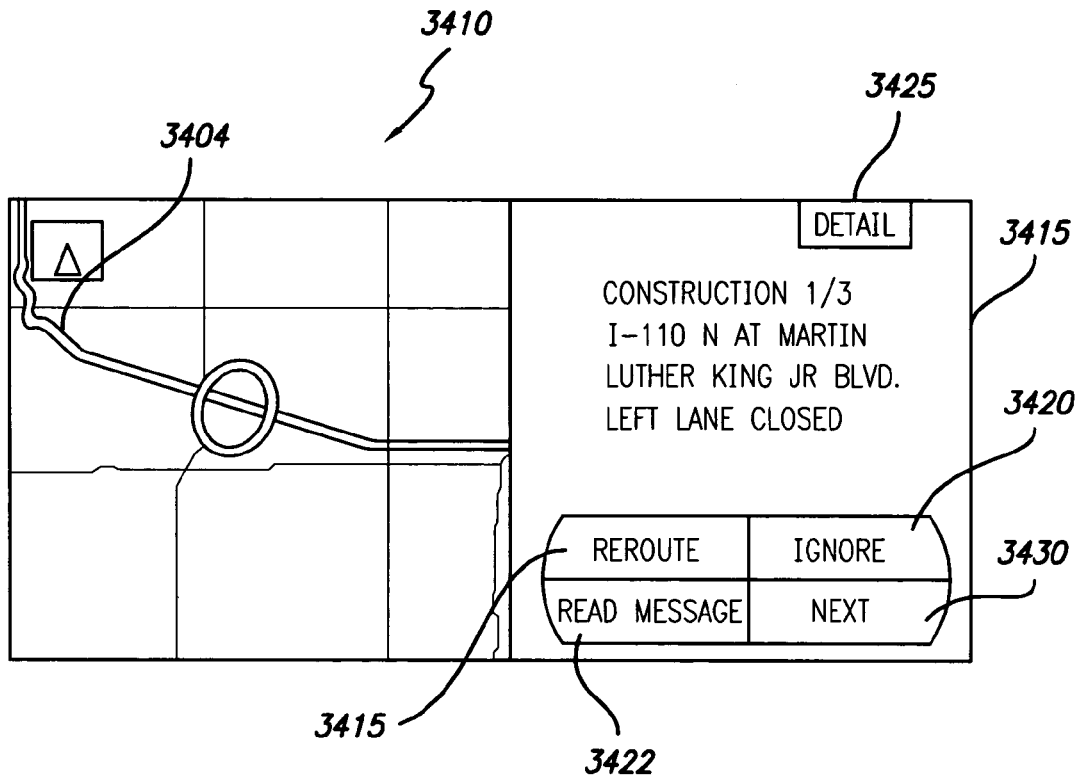
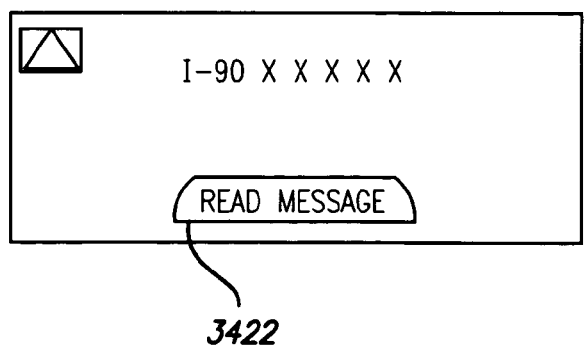
FIG. 34

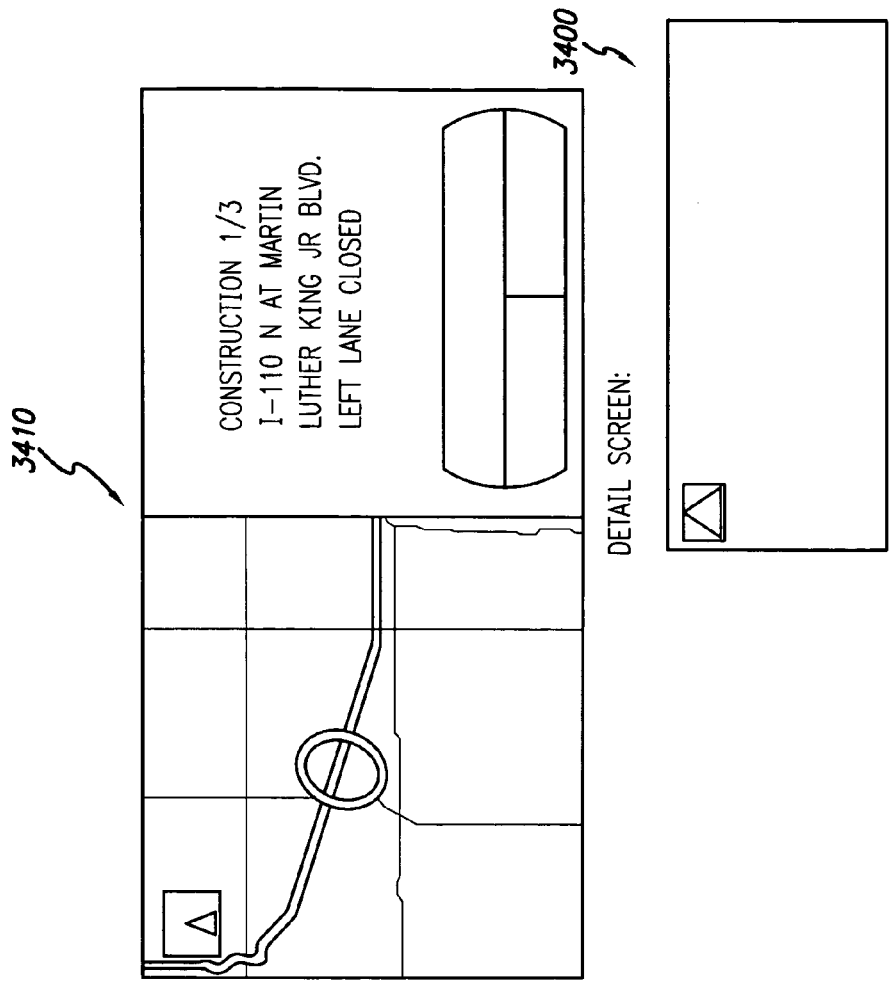
FIG. 35
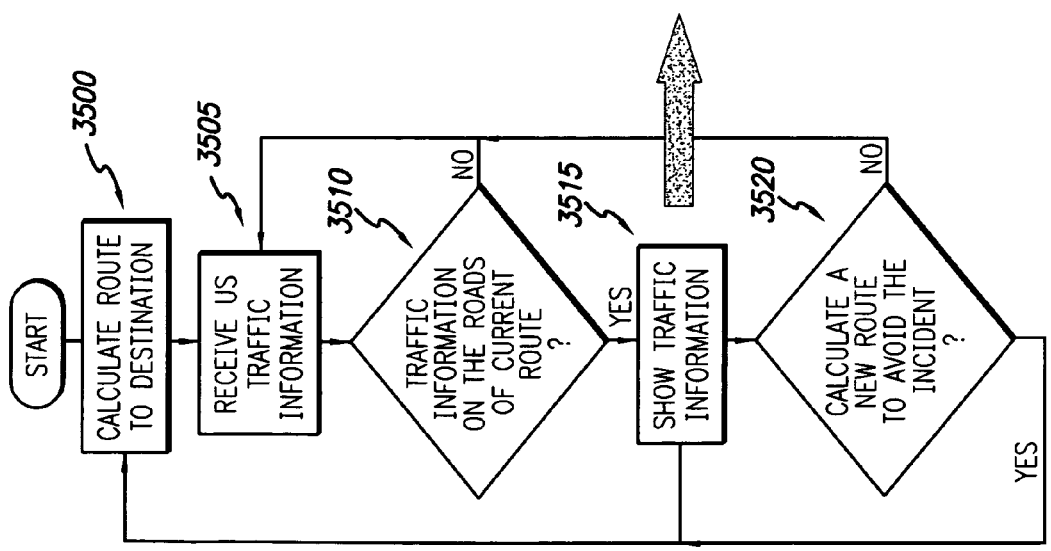

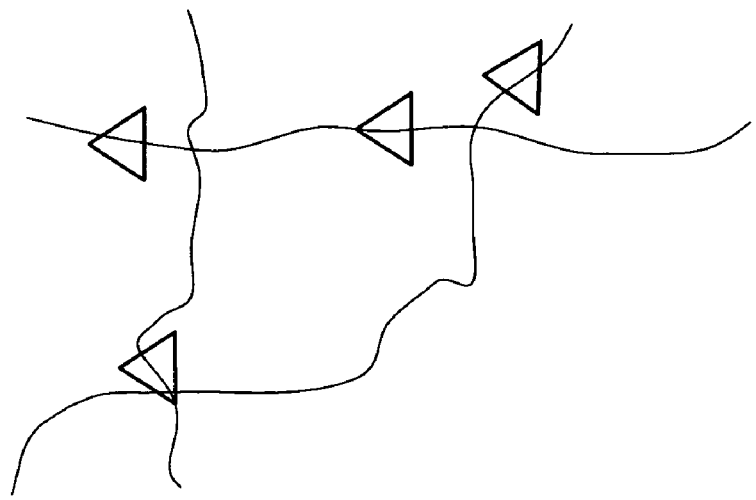
FIG. 36b
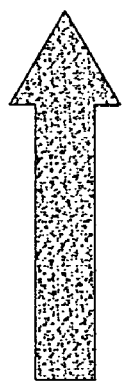
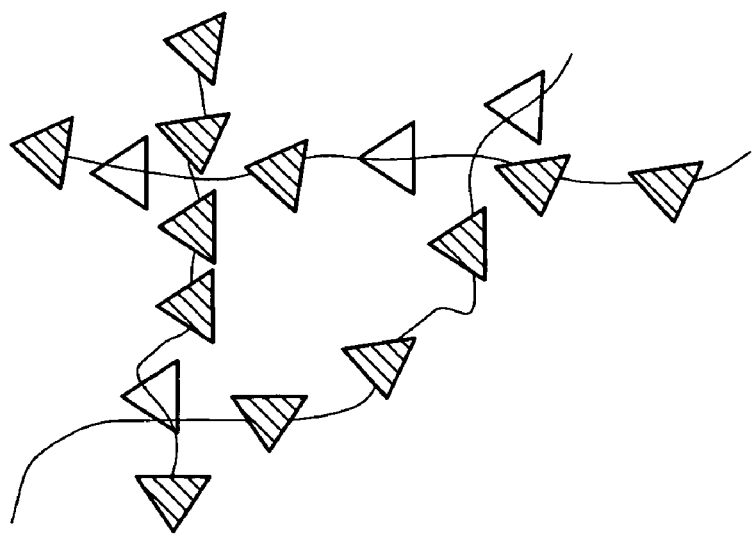
FIG. 36a

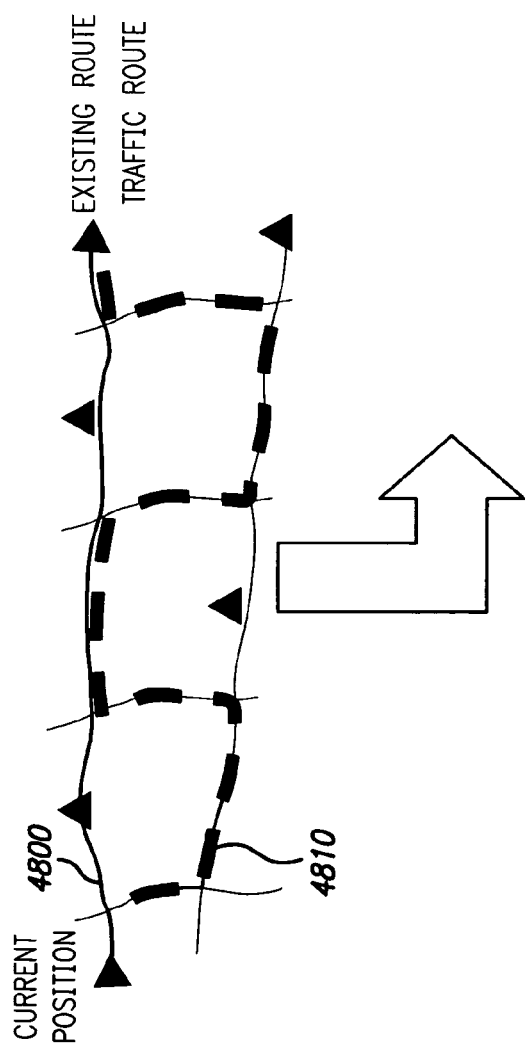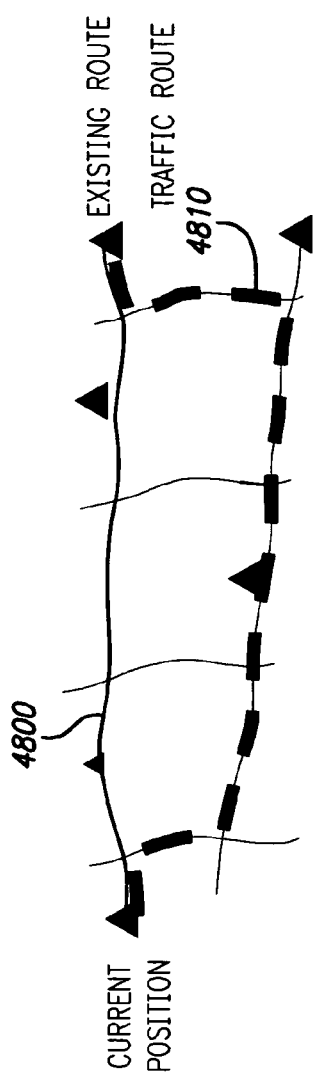

METHOD FOR REFINING TRAFFIC FLOW DATA

RELATED APPLICATION INFORMATION

This application claims priority to U.S. Provisional Application Ser. No. 60/560,087, entitled "Method and System for Traffic Management Between a Vehicle and Remote Location," which was filed with the U.S. Patent and Trademark Office on Apr. 6, 2004.

BACKGROUND OF THE INVENTION

1. Field of the Invention

The present invention generally relates to a vehicle navigation system. More specifically, the present invention relates to a vehicle navigation system that provides traffic information to a user of the vehicle navigation system based at least in part on user preferences.

2. Description of Related Art

Navigation systems for determining a route from a start point to a destination point are well known in the art. In addition, navigation systems having capabilities for determining the geographic position of a reference point are also well known in the art (e.g., a Global Positioning System (GPS) or a self-contained system having distance and bearing sensors). As an example, a commonly used navigation system allows a user (or driver) of a vehicle to enter a destination place into the navigation system. The navigation system then looks up an appropriate route from an original point (using its geographic positioning capabilities) to the destination point in a road map database (e.g., the route may be a route having the shortest distance from the start point to the destination, one which would take the vehicle the least time, or some other route), and guides the user to the destination point along the searched route through a visual display or vocal guide.

In searching the appropriate route, some types of mobile navigation system use traffic information (e.g., position data on traffic jams; information on roads closed by accidents, construction, or maintenance; lane-regulated locations) delivered from a traffic information supplier in addition to using the road map database. Conventionally, however, known methods for providing and utilizing the above-described traffic information for navigation remain very inflexible, cumbersome, and inefficient. For example, one method uses a one-to-one communication system to individually send traffic information streams to a particular vehicle in an attempt to send vehicle specific data to the particular vehicle. A drawback with this method is that many vehicles require the same information. For example, several vehicles might require the same regional traffic information. This method, therefore, requires the transmittal of the same information several times to a plurality of vehicles, which results in a waste of precious bandwidth. As known in the art, wireless network bandwidth is extremely sensitive to network capacity.

In other methods, the same traffic information is transmitted to all vehicles. The drawback with these methods is that many vehicles are inundated with a large amount of unwanted traffic information. Users and/or navigation systems are required to sift through the redundant, superfluous, or otherwise unwanted information to pick out pertinent traffic information.

As a result, there remains a need for systems and methods that allow for the transmittal of vehicle-related traffic information from a remote location to a vehicle and that allow for the selective transmittal of vehicle related information from a vehicle to a remote location. Moreover, it is desired that the navigation system be provided with enough information to properly determine efficient routes without being inundated with redundant, useless, and/or superfluous information. There is also a need that the information be provided to a user in a useful, efficient, and easily understandable manner.

Accordingly, it would be very desirable to provide a traffic management architecture that overcomes the above-described shortcomings of the prior art while retaining their advantages.

SUMMARY OF THE INVENTION

The present invention addresses the shortcomings of the prior art systems and methods. In particular, the present invention is directed to a system and method for monitoring the accuracy of vehicle speeds detected by road sensors. In one embodiment, the system compares the vehicle's speed transmitted by the navigation device against the vehicle's speed detected by a road sensor. If there is a discrepancy between the two speeds, the system generates an alert containing proposed sensor corrective action. In one embodiment, each alert is generated based, in part, on actual differences (e.g., miler per hour) between the vehicle's speed transmitted by the navigation device and the speed detected by the sensor. In another embodiment, each alert is generated based, in part, on percentage differentials (e.g., speed detected by sensor is twenty percent greater that speed transmitted by navigation device).

Another aspect of the present invention is to provide a system that refines the traffic information provided to a vehicle's navigation system based, in part, on speeds detected by the road sensors—after they have been corrected (if required). In one embodiment, the system first corrects the vehicle speed detected by the sensor and then transmits the corrected traffic information to the vehicle navigation device.

Yet another aspect of the present invention is to provide a system that alleviates traffic congestion. In general, the system monitors the location and speed of each vehicle on the road in relation to a specific traffic signal. In one embodiment, the system modifies the signal strength of the traffic signal based, in part, on speed and distance factors. For example, the system will not modify the signal of the traffic signal until the speed differential between vehicles traveling in adjacent lanes is less than twenty miles per hour. In another embodiment, the system modifies the signal strength of the traffic signal based, in part, on the speed differential and the distance that a specific vehicle is located form the traffic signal.

A more complete understanding of the vehicle navigation system and method will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIG. 1c is a schematic diagram of a navigation device in communication with a mobile unit pursuant to aspects of the invention;

FIG. 4 is a schematic diagram of an embodiment of a system for coordinating traffic signals pursuant to aspects of the invention;

FIG. 11 is a schematic diagram of an embodiment of a system that initiates a recalculation of a route when there is an upcoming turn pursuant to aspects of the invention;

FIG. 13 is a schematic diagram of an embodiment of a system that performs a route calculation using traffic information broadcast from a remote location and/or a traffic supplier pursuant to aspects of the invention;

FIG. 21 illustrates an embodiment of a display system pursuant to aspects of the invention;

FIG. 23 is a flow diagram of an embodiment for combining actual and historical traffic information pursuant to aspects of the invention;

FIG. 24 is a flow diagram of an embodiment for providing a time stamp to traffic incident information and for using the time stamp to determine a route for calculation pursuant to aspects of the invention;

FIGS. 31a and 31b illustrate an embodiment of a display system having traffic flow information and traffic incident information pursuant to aspects of the invention;

FIGS. 32a and 32b illustrate an alternative embodiment of a display system having traffic flow information and traffic incident information pursuant to aspects of the invention;

FIG. 34 illustrates yet another embodiment of a display system pursuant to aspects of the invention;

FIG. 35 is a flow diagram of an embodiment for providing a pop-up window to convey certain traffic information details pursuant to aspects of the invention;

FIGS. 36a and 36b illustrate an embodiment of a display system that displays only traffic information indicating traffic problems pursuant to aspects of the invention;

FIGS. 48a and 48b illustrate an embodiment for avoiding a zigzag route pursuant to aspects of the invention;

DETAILED DESCRIPTION OF THE PREFERRED EMBODIMENT

The present invention is directed to a system and method for facilitating the exchange of traffic information between a remote location and a vehicle. In particular, the present invention is directed to a system and method that includes a vehicle that exchanges traffic information with the remote location by way of one or more communication networks in a manner that conserves bandwidth while providing sufficient traffic information to the vehicle.

Figure 1A:
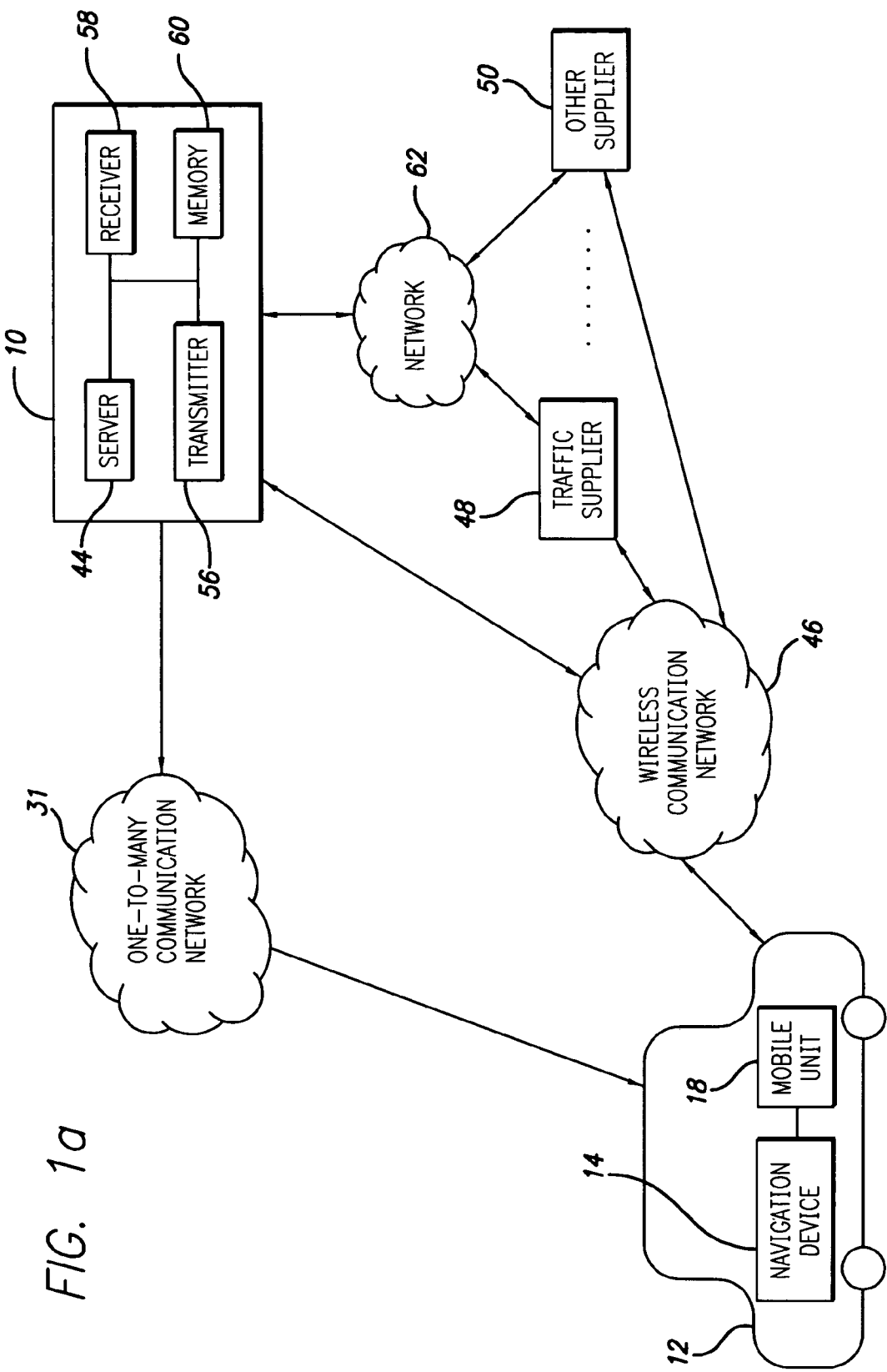
FIG. 1a is a schematic diagram of a first embodiment of a system pursuant to aspects of the invention.

FIG. 1a shows a first embodiment of a system for facilitating the exchange of information between a remote location 10 and a vehicle 12 pursuant to aspects of the invention. The vehicle 12 includes a navigation device 14. Referring now also to FIG. 1c, the navigation device 14 may include an output unit 21, a receiver unit 22, an input unit 23, a position detection unit 25, a navigation memory unit 30, a navigation processor unit 26, and an RF transceiver unit 52 that are all in electrical communication with one another. The navigation memory unit 30 includes at least a portion of a user profile and, in some embodiments, includes the entire user profile. In addition, the navigation memory unit 30 includes a road map database portion and, in some embodiments, includes a disk reading unit for reading road map information not built into the navigation device 14. As is provided in greater detail below, the user profile and/or the road map database stored in the memory 30 may be updated in the vehicle by way of the input unit 23, which includes at least one of a keyboard, a touch sensitive display, and a microphone. The user profile and/or the road map database may also be updated by way of information received through the receiver unit 22 and/or the RF transceiver unit 52.

Figure 1B:
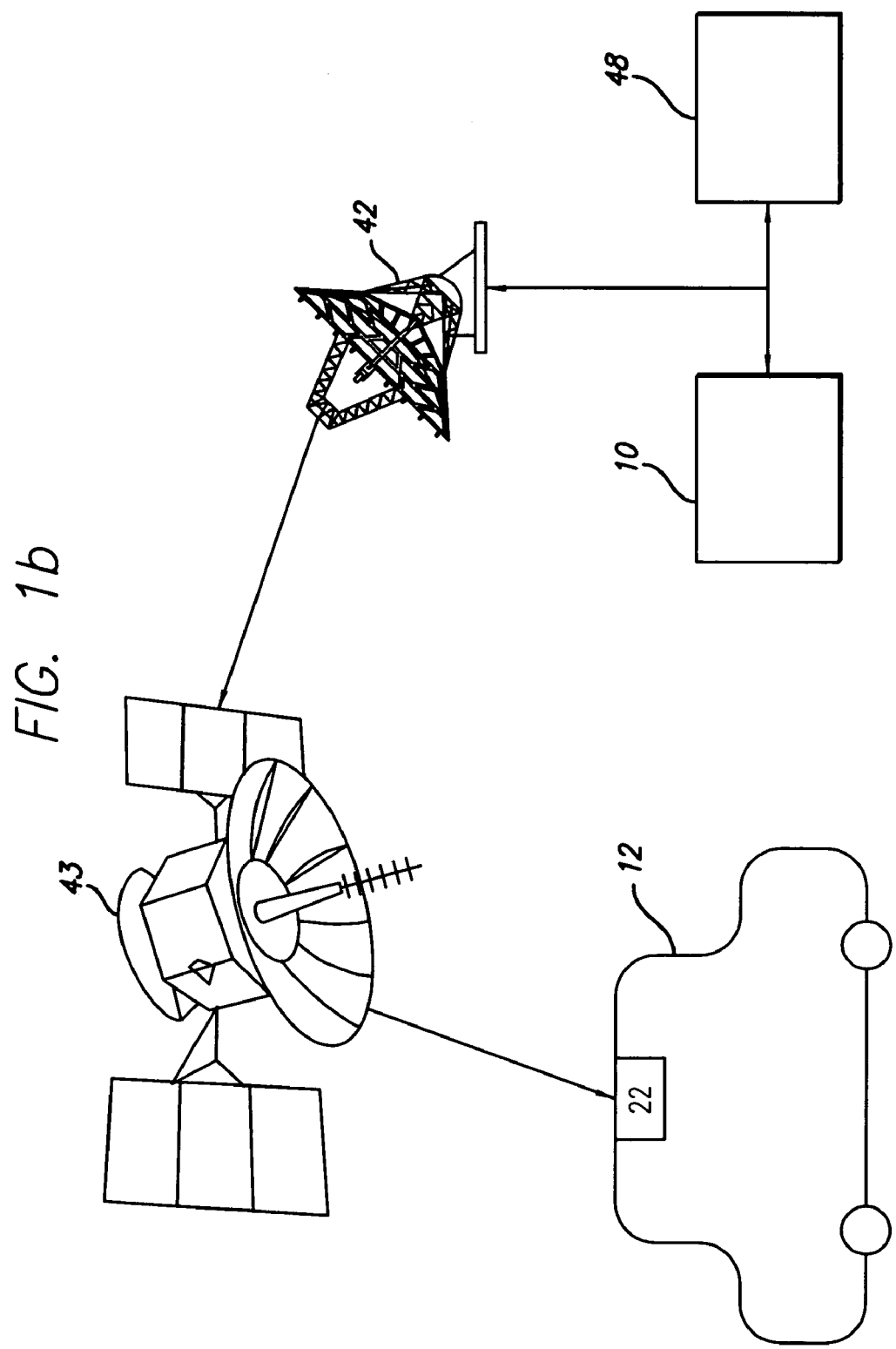
FIG. 1b is a schematic diagram of a broadcast communication network pursuant to aspects of the invention.

The receiver unit 22 receives information from the remote location 10 and, in one embodiment, is in communication with the remote location by way of a one-to-many communication system. One-to-many communication systems include systems that can send information from one source to a plurality of receivers, such as a broadcast network 31. Broadcast networks include television, radio, and satellite networks. Referring now to FIG. 1b, in one embodiment, the broadcast network 31 is the XM Radio satellite network 40, which comprises broadcast towers 42, satellite servers (not shown), and satellites 43. The broadcast towers 42 transmit information to the satellites 43, which bounce the information back down to the receiver unit 22 of the navigation device 14.

Referring now back to FIG. 1a, the information received by the receiver 22 may be processed by the navigation processor unit 26. The processed information may then be displayed by way of the output unit 21, which includes at least one of a display and a speaker. In one embodiment, the receiver unit 22, the navigation processor unit 26 and the output unit 21 are provided access to only subsets of the received broadcast information based on user preferences and/or traffic information demands. The user preferences, as well as user identity information and traffic-related information, can be part of the user profile.

The position detection unit 25 may include a GPS receiver that communicates with a plurality of GPS satellites (separate from the XM satellites) to determine the position of the vehicle 12. For example, the GPS receiver searches for and collects GPS information (or signals) broadcast from four or more GPS satellites that are in view of the GPS receiver. Next, using the time interval between the broadcast time and reception time of each broadcast signal, the GPS receiver calculates the distance between the GPS receiver and each of the four or more GPS satellites. These distance measurements, along with the position and time information received in the broadcast signals, allow the GPS receiver to calculate the geographic position of the vehicle 12.

Figure 2:
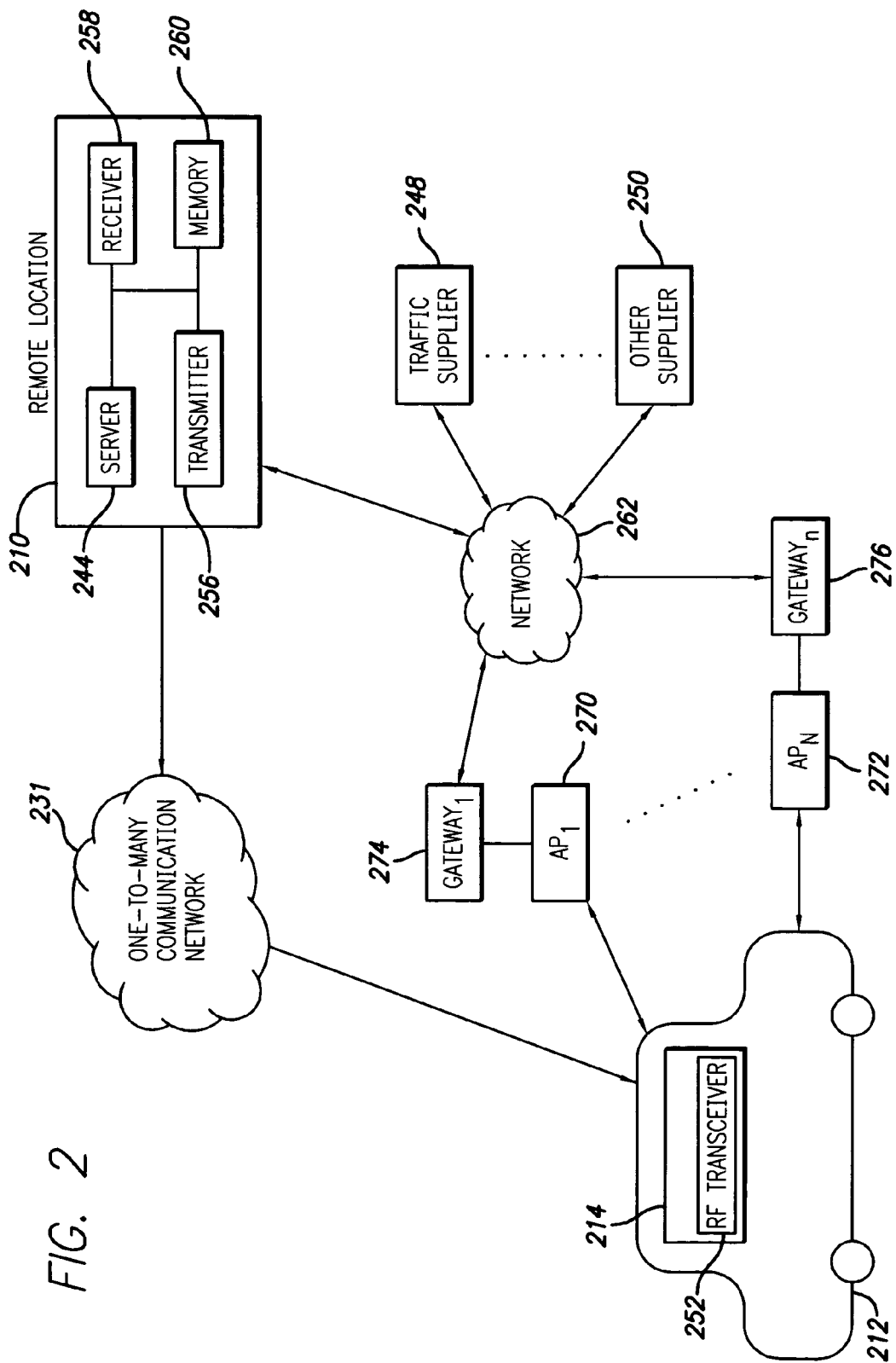
FIG. 2 is a schematic diagram of an alternate embodiment of a system pursuant to aspects of the invention.

In the embodiment shown in FIG. 1a, the mobile unit 18 is used to receive and transmit information from and to the remote location 10; and, in an alternate embodiment shown in FIG. 2, an RF transceiver 252 is used to receive and transmit information from and to the remote location 210. The mobile unit 18 may be a wireless phone or any other device that communicates with other devices by way of the wireless communication network 46. As shown in FIG. 1c, the mobile unit 100 of the present invention includes a wireless receiver 32, a wireless transmitter 34, a mobile unit processor 40, and an RF transceiver unit 54 that are in communication with one another. The mobile unit 18 is in two-way communication with the remote location 10 by way of the receiver 32, the transmitter 34, and the wireless communication network 46, which comprises numerous base stations. In one embodiment, information is transmitted from or to the vehicle or remote location over a high bandwidth GPRS/1XRTT channel of the wireless communication network 46. If the high bandwidth channel is unavailable, a low bandwidth DTMF channel is used. The receiver 32 receives information from the remote location 10, and the transmitter 34 transmits information to the remote location 10. In other embodiments described below in greater detail, the transmitter 34 also transmits information to suppliers of traffic or other information 48, 50.

In one embodiment, the information received from and transmitted to the remote location 10 by way of the mobile unit 18 is accessed by the user through the navigation device 14, which is in communication with the mobile unit 18. The mobile unit 18 may be embedded in the vehicle 12 and be in communication with the navigation device 14 by, for example, a cable (not shown).

In another embodiment, the navigation device 14 and mobile unit 18 are in communication with one another by way of RF transceiver units 54 and 52. Both the navigation device 14 and the mobile unit 18 include RF transceiver units 52, 54, which, in one embodiment, comply with the Bluetooth® wireless data communication format. The RF transceiver units 52, 54 allow the navigation device 14 and the mobile unit 18 to communicate with one another. In other embodiments not shown, the receiver 32 and transmitter 14 of the mobile unit 18 and the receiver unit 20 of the navigation device 14 allow the navigation device 14 and mobile unit 18 to communicate with one another. In yet other embodiments, there may be an RF transceiver that is separate from the navigation device 14 and the mobile unit 18 and that allows the navigation device 14 and mobile unit 18 to communicate with one another.

In the alternate embodiment shown in FIG. 2, the navigation device 214 transmits and receives information to and from the remote location 210 by way of the RF transceiver 252, access points 270, 272, and gateways 274, 276 that are in communication with the network 262. In one embodiment, the RF transceiver 252 and the access points 270, 272 are compliant with the IEEE 802.11 specification, and such transceivers and access points include Wi-Fi®—certified equipment. The access points 270, 272 are typically in communication with the gateways 274, 276 by way of a cable, and the gateways are in communication with the remote location 210 by way of the network 262. The access points 270, 272 are in communication with the RF transceiver 252 and have a limited range over which they can communicate with the RF transceiver 252. Thus, it is preferable that there be numerous access points 270, 272 positioned so that the distance between the access points and the areas through which a vehicle 12 might pass is less than or equal to the limited range of the access points. When the access points 270, 272 are so positioned, the RF transceiver 252 effectively exchanges information with the access points 270, 272 and, thus, the remote location 210.

Note that in the alternate embodiment of FIG. 2, the navigation device 214 also includes input and output units, a receiver unit, a memory unit, and a processor unit, none of which are shown. The components of the alternate navigation device embodiment 214 have the same functionality as do the components of the navigation device 14 of the first embodiment.

The remote location 10, 210 includes a remote server 44, 244, a remote transmitter 56, 256 and receiver 58, 258, and a remote memory 60, 260 that are in communication with one another. As provided above, in the first embodiment, the remote transmitter and receiver 56, 58 communicate with the navigation device 14 and mobile unit 100 by way of the broadcast 31 and wireless 46 communication networks, respectively. In the alternate embodiment, the remote transmitter and receiver 256, 258 communicate with the navigation device 214, including the RF transceiver 252, by way of the broadcast communication network 231 and a network 262. The remote location 10, 210 is also in communication with suppliers of traffic and/or other information 48, 50, 248, 250 such as government traffic information suppliers, private traffic information suppliers, and users of other vehicles, by way of the network 62, 262.

In both the first and alternate embodiments shown in FIGS. 1 and 2, the network 62, 262 is typically a wide area network (WAN) such as the Internet. In other embodiments, some of the information suppliers 48, 50, 248, 250, such as the government and private traffic information suppliers, may be in communication with the remote location 10, 210 by way of a local area network (LAN), while other information providers 48, 50, 248, 250 such as the vehicle users, are in communication with the remote location by way of the Internet. In yet other embodiments, the RF transceiver 252 is in communication with the remote location 210 and/or the information providers 248, 250 by way of a network 262 that is an LAN. In these other embodiments, the LAN 262 is compliant with the IEEE 802.3 specification or is an Ethernet network.

As provided in greater detail below, the information suppliers 48, 50, 248, 250 may transmit updated user profiles and traffic-related information to the remote location 10, 210. A plurality of user profiles are in a user profile database, which, along with traffic-related information, is stored in the remote memory 60, 260. The updated user profiles and new traffic-related information are transmitted from the remote location 10, 210 to the navigation device 14, 214 by way of the broadcast network 31, 231. In other embodiments, the new traffic-related information and updated user profiles may be transmitted to the vehicles 12, 212 by way of the wireless network 46 or the network 262. At the vehicle, the user profile stored in the memory 30 of the navigation device 14 is updated, and the vehicle-related information is made accessible to the user by way of the output unit 26 of the navigation device 14. In other embodiments, the information providers may communicate directly with the mobile unit 18 or RF transceiver 252 by way of the wireless communication network 46 or the network 262.

Figure 3A:
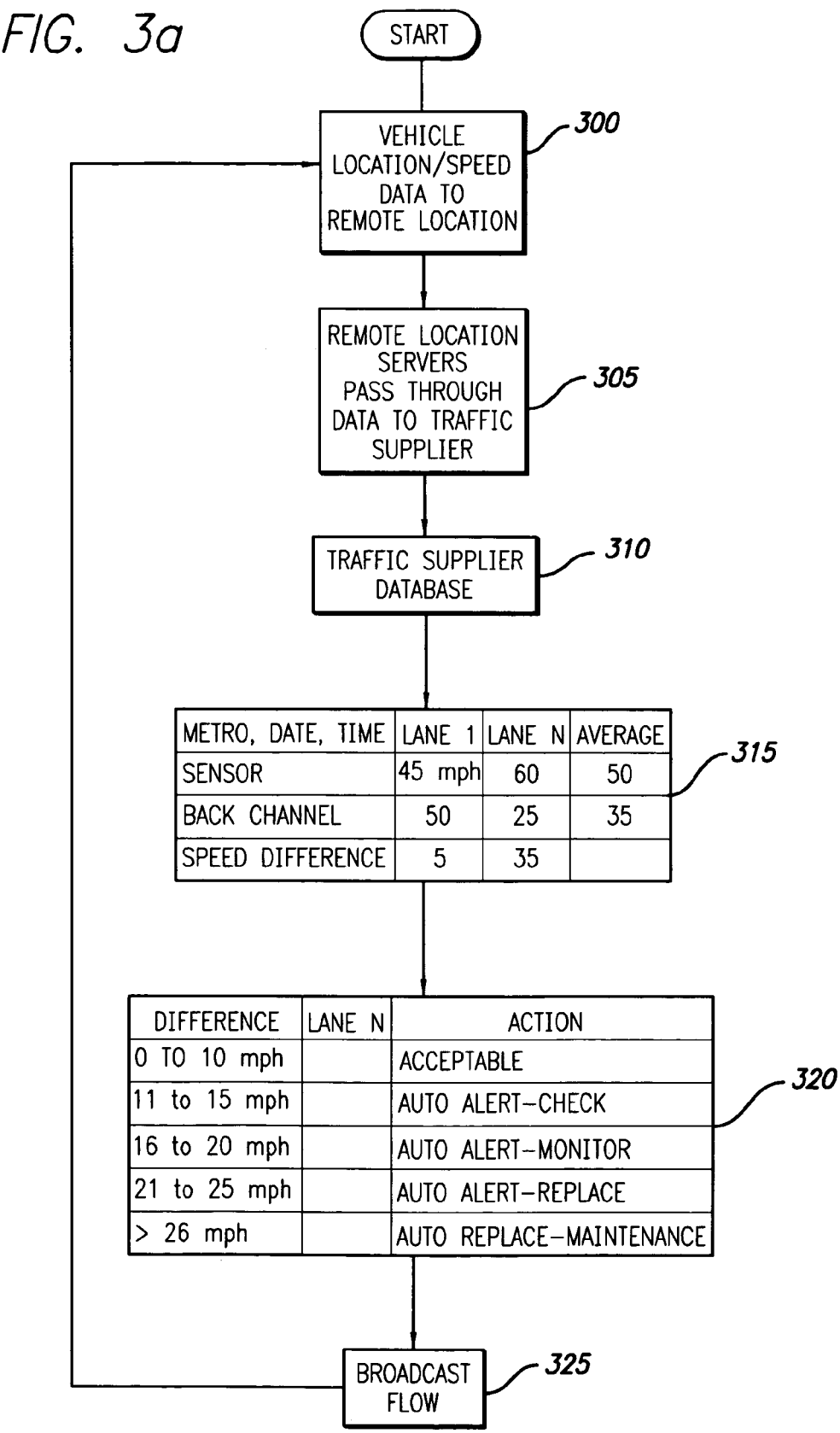
FIG. 3a is a flow diagram of an embodiment for ensuring quality and reliability of traffic information provided to a vehicle pursuant to aspects of the invention.

FIG. 3a shows an embodiment for ensuring quality and reliability of traffic information provided to the navigation device 14, 214 pursuant to aspects of the invention. The embodiment uses the navigation device 14, 214 (including its position detection unit 24) on the vehicle 12, 212 to determine vehicle location and to detect sensor error or errors on a road segment/lane (e.g., speed sensors on a freeway lane/segment). The embodiment then uses the wireless network 46 or the network 262 to communicate the position determination and the error detection data from the navigation device 14, 214 to the remote location 10, 610 and/or traffic information suppliers 48, 248 in an effort to refine the traffic information provided. At step 300, the navigation device 14, 214 uses its position detection unit 24 to determine vehicle location and speed data. The vehicle's location and speed data is then communicated over the wireless communication network 46 or the network 262 to the remote location 10, 210.

At step 305, the remote location 14, 214, via its remote server or servers 44, 244, processes and passes the vehicle location and speed data to traffic information supplier or suppliers 48, 248. The data from the remote location is transmitted over the network 62 or the network 262 to the traffic information supplier or suppliers 48, 248. In one embodiment, the data is processed at the remote location 14, 214 by filtering the information based on predetermined criteria and translating the information into a format acceptable to the traffic information supplier or suppliers 48, 248. At step 310, the transmitted vehicle location and vehicle speed data is processed at a database of the traffic information supplier or suppliers 48, 248. At step 315, the vehicle's location and speed data (i.e., the back channel data) is compared with sensor data from a speed sensor on a lane of a freeway to determine the difference between the vehicle speed data and the sensor speed data. The location of the speed sensor corresponds to the location of the vehicle where the vehicle's location and speed data was detected. At step 320, a quantized differential action scheme based on a range of the speed differences between the vehicle speed data and the sensor speed data is used to determine action items. FIG. 3 shows that a difference of zero (0) to ten (10) mph is acceptable, a difference of eleven (11) to fifteen (15) mph triggers an automatic alert to check the speed difference and speed sensor, a difference of sixteen (16) to twenty (20) mph triggers an automatic alert to monitor the speed of the sensor, a difference of twenty-one (21) to twenty-five (25) mph triggers an automatic replacement alert, and a difference of twenty-six (26) or more mph triggers automatic replacement or maintenance of the sensor. Once the appropriate action item has been determined, at step 325, the refined traffic information data (e.g., with corrected speed sensor data) is broadcast to a plurality of vehicles that may include vehicle 12, 212, by way of the broadcast network 31, 231.

Figure 3B:
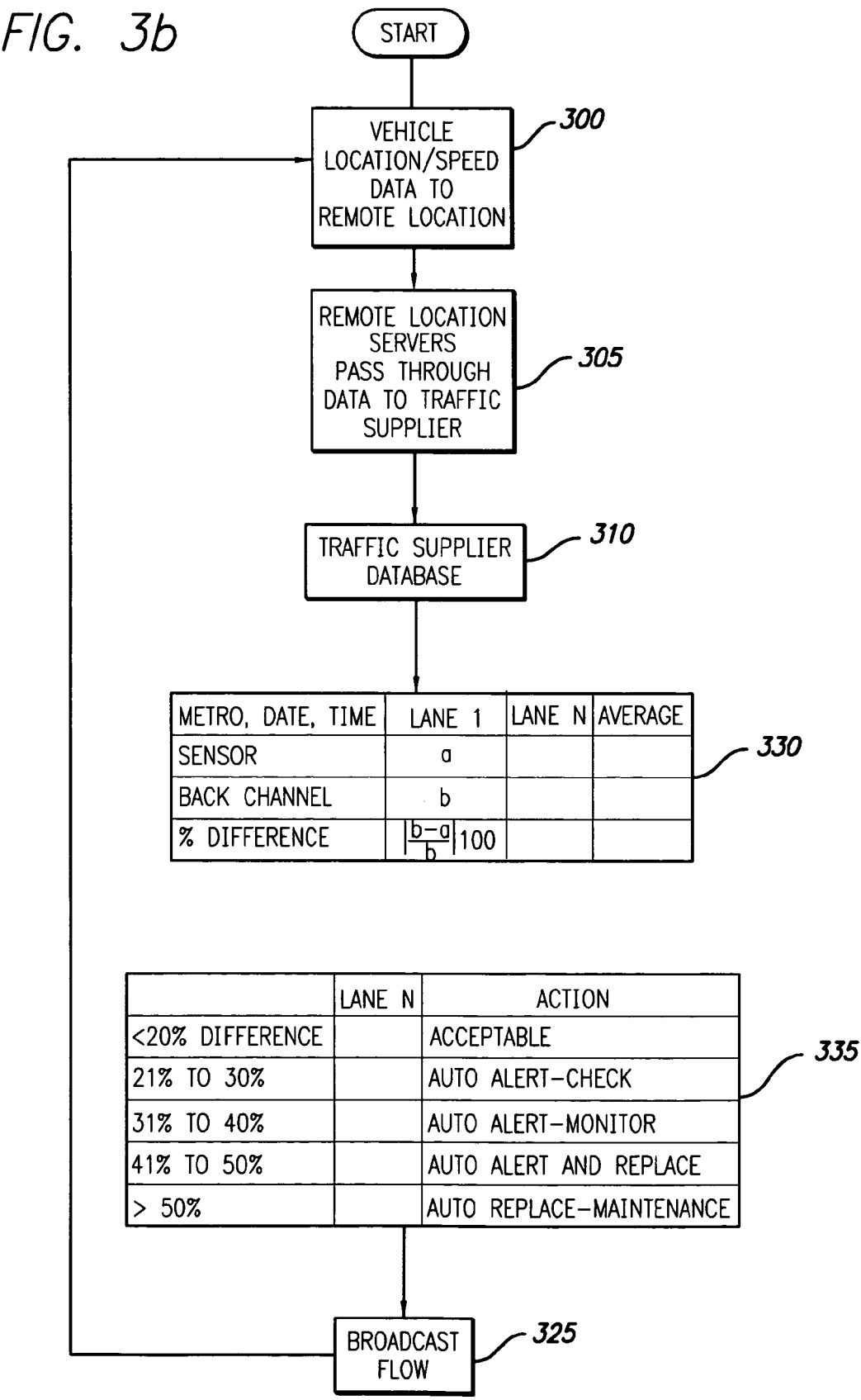
FIG. 3b is a flow diagram of an alternate embodiment for ensuring quality and reliability of traffic information provided to a vehicle pursuant to aspects of the invention.

The above-described mechanisms and process for ensuring quality and reliability of traffic information are for exemplary purposes only, and the invention is not limited thereby. For example, FIG. 3b shows an alternate embodiment that uses a quantized percentage differential method. In this method, as shown in steps 330 and 335, a percentage difference between the vehicle speed data and the speed sensor data is used to select an action item from a plurality of action items rather than using the actual differences between the vehicle speed data and the speed sensor data. That is, at step 330, the vehicle's location and speed data (i.e., the back channel data) is compared with sensor data from a speed sensor on a lane of a freeway to determine a percentage (%) difference in speed of the vehicle speed data and the sensor speed data. At step 335, a percentage quantized differential action scheme based on a range of the percentages of difference of the sensor speed data to the back channel data is used to select an action from a plurality of action items to be taken. FIG. 3b shows that a difference of less than 20% of the sensor speed data to the back channel data is acceptable, a 21% to 30% difference triggers an automatic alert to check the speed sensor, a 31% to 40% difference triggers an automatic alert to monitor the speed of the sensor, a 41% to 50% difference triggers an automatic replacement alert, and a greater than 50% difference triggers the automatic replacement or maintenance of the sensor.

Note that, in the alternate embodiment of FIG. 3b, the embodiment also includes the transmission and processing steps 300, 305, 310, and 325 described above for FIG. 3a. In addition, the steps of FIG. 3b use the same devices, units, and/or components as the embodiment shown in FIG. 3a. Moreover, those skilled in the art will appreciate that there are other ways to process the traffic-related information to ensure quality and reliability.

FIG. 4 shows an embodiment for coordinating traffic signals pursuant to aspects of the invention. The embodiment uses the navigation device's position determination unit (e.g., the GPS) and back channel capabilities (e.g., the wireless communication network 46 or the network 262). The embodiment includes a navigation device (e.g., a device 14, 214 shown in FIGS. 1a, 2) having a position detection unit (e.g., unit 24 shown in FIG. 1c). The navigation device is located on a vehicle 412 and is used to determine the location and speed of the vehicle 412 and to coordinate traffic signals 445 (e.g., freeway off-ramp signals). More specifically, the embodiment uses back channel communication 446 to communicate the speed and location of the vehicle 412 detected from the navigation device (e.g., 14, 214) to a remote location 410. The remote location 410 then transmits the speed and location of the vehicle to a traffic information supplier 448 that passes this information to a signal control center 450 (e.g., a city traffic center). The signal control center then adjusts, coordinates, and manages the traffic signals 445 based on the information from the traffic information supplier 448.

Figure 5:
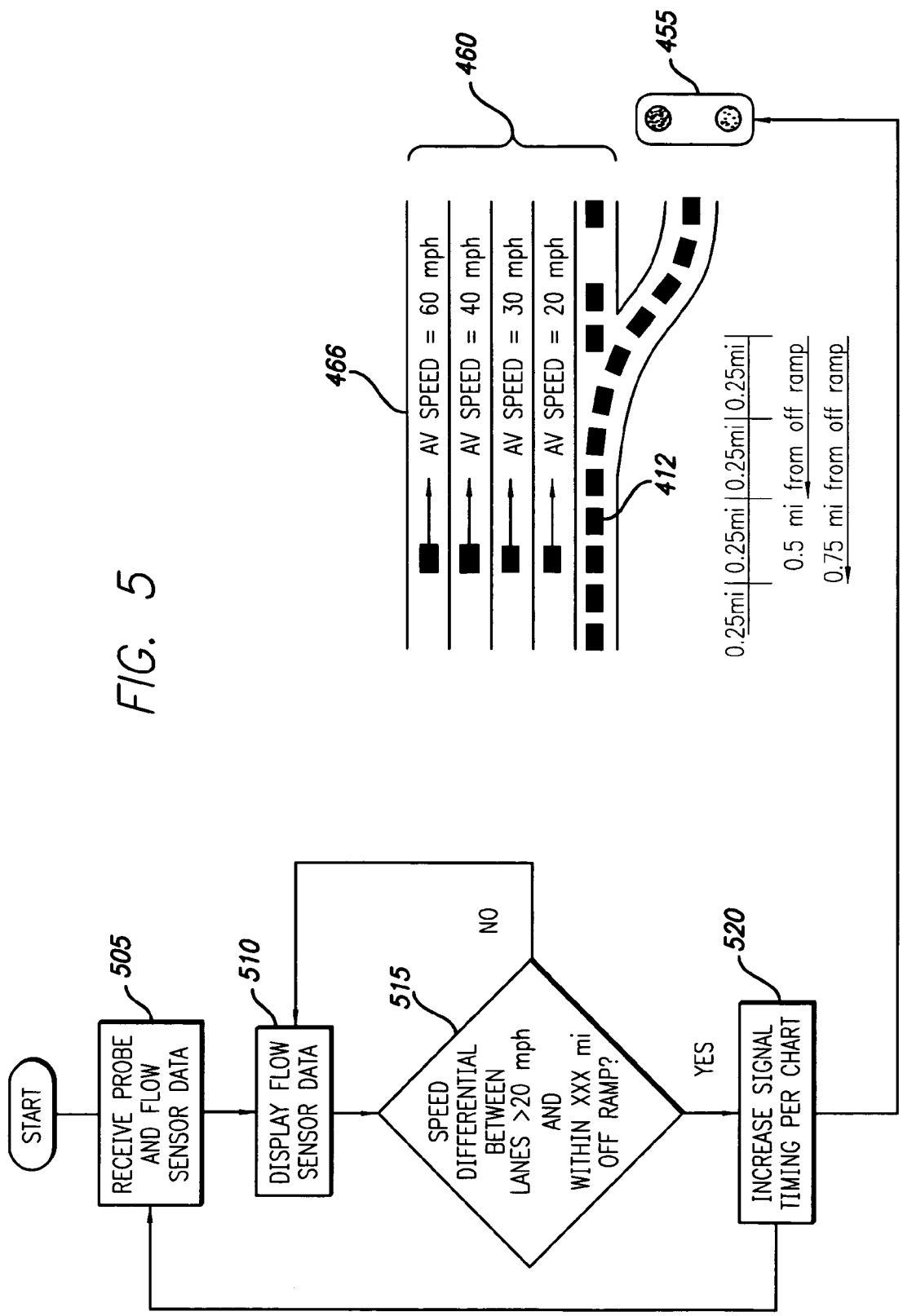
FIG. 5 is a flow diagram of an embodiment for coordinating traffic signals pursuant to aspects of the invention.

In general, according to FIG. 4, the embodiment provides a method for coordinating traffic signals, as diagrammed in FIG. 5. At step 505, the method receives probe and flow sensor data (e.g., data on the position of the vehicle, the speed of the vehicle, and the average speed of vehicles on a lane of a road). At step 510, the method displays the flow-sensor data. At step 515, the difference in speed between various lanes 460 of a roadway (e.g., a freeway) and the location of the vehicle 412 are determined. If the difference in speed between lanes 460 is less then twenty (20) mph and the vehicle 412 is within an amount of miles from the off-ramp (e.g., within a predetermined amount miles of the off-ramp), the signal length or signal timing for the traffic signals 455 is increased pursuant to step 520 and the chart shown below.

| Distance from off-ramp | Increase signal length |
| --- | --- |
| >0.25 miles | 10% |
| >0.5 miles | 15% |
| >0.75 miles | 20% |
| >1.0 miles | 30% |
| >1.25 miles | 40% |
| >1.5 miles | 50% |

Those skilled in the art will appreciate that the above method for coordinating traffic signals (e.g., by using lane averaging to clear freeway off-ramps) alleviates problems that occur when traffic-flow sensors are not available or not accurate and reduces the potential for accidents. It should be appreciated that the above-described mechanisms and process for coordinating traffic signals are for exemplary purposes only and that the invention is not limited thereby.

Figure 6:
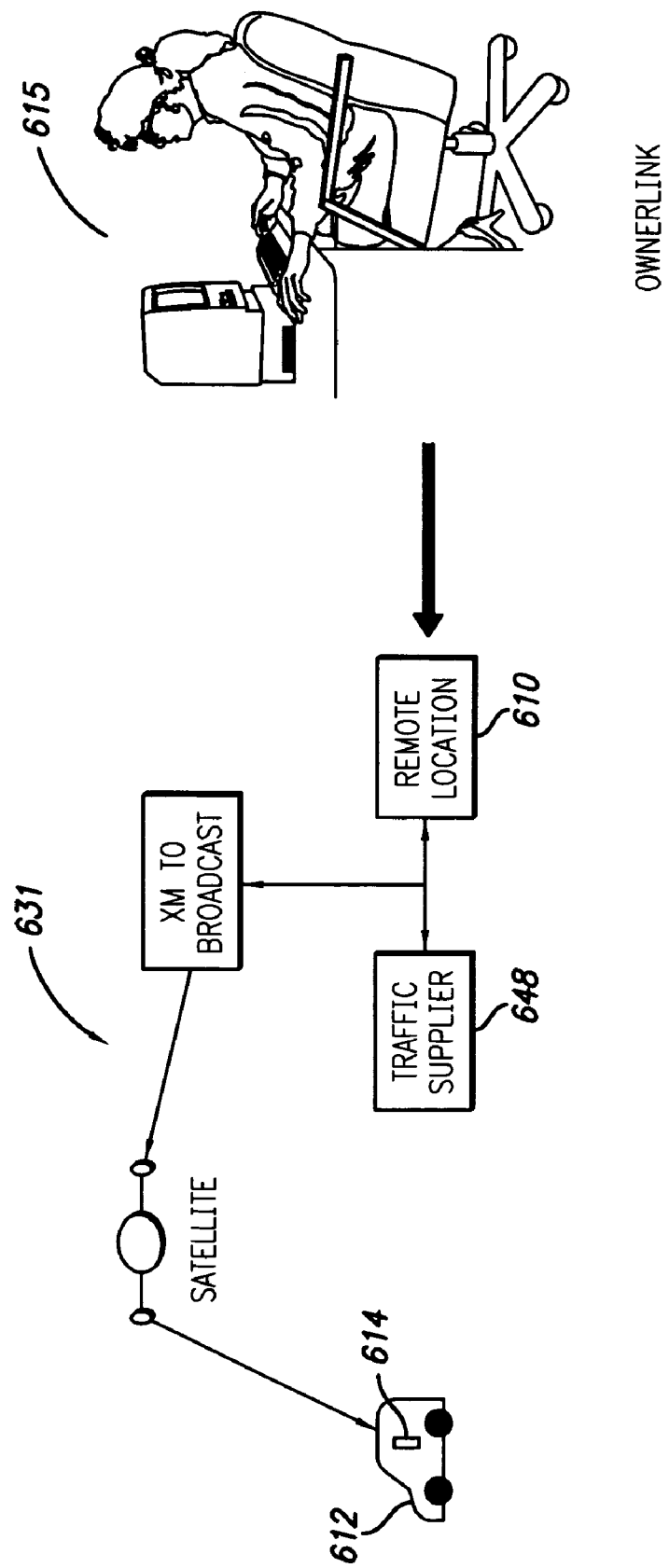
FIG. 6 is a schematic diagram of an embodiment of a system for providing automated and personalized traffic information pursuant to aspects of the invention.

FIG. 6 shows an embodiment for providing automated and personalized traffic information so that a user of a navigation device 614 located on a vehicle 612 does not have to wait for traffic information. The embodiment allows the user of the navigation device 614 to preset its commute preferences (e.g., 7 a.m. home to work; 5 p.m. work to home) so that traffic information from the traffic information supplier 648 and/or remote location 610 can be pre-provided or pre-broadcast to the navigation device 614 via a broadcast network 631. More specifically, rather than require the user to input its destination point in the navigation device 614, the present embodiment allows the user to store an address/destination in a memory unit (e.g., unit 30 in FIG. 1c) of the navigation device 614. In addition, rather than requiring the user to wait for the traffic information to be updated by the traffic information supplier 648 and for the user route to be calculated by the navigation device 614, the present embodiment allows the user to set its commute preferences in an owner link 615 (e.g., a database) located in the remote location 610 so that traffic information can be pre-broadcast to the navigation device 614. That is, the present embodiment allows a user to (1) set an address/destination in a memory unit (e.g., unit 30 in FIG. 1c) of the navigation device 614 and (2) set its commute preferences in an owner link 615 (e.g., a database) via the remote location 610 so that traffic information can be pre-broadcast to the navigation device 614.

The above-described mechanisms and process for providing automated and personalized traffic reports are for exemplary purposes only and the invention is not limited thereby.

Figure 7:
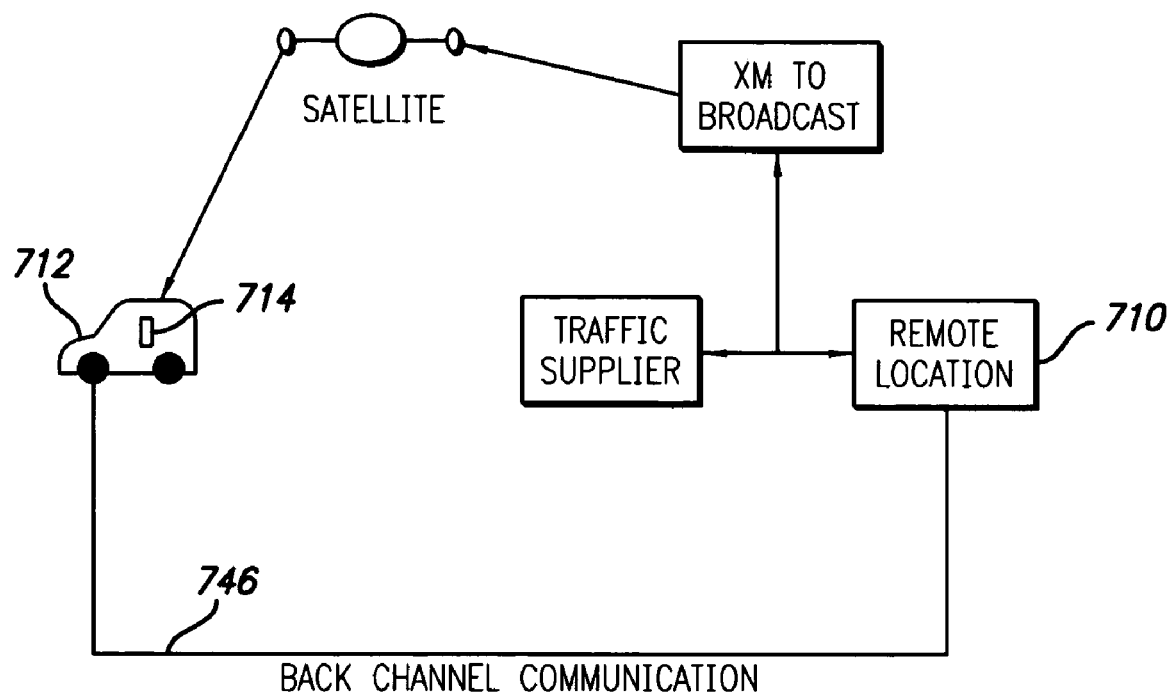
FIG. 7 is a schematic diagram of an alternate embodiment of a system for providing automated and personalized traffic information pursuant to aspects of the invention.

For example, FIG. 7 shows an alternate embodiment that automatically stores historical data of the user to determine when traffic information should be pre-provided. In this embodiment, based on historical commute patterns, the embodiment uses back channel communication 746 to store start times and addresses on a remote location 710 such that no address input is required. This embodiment automates an owner link function (e.g., 615 on FIG. 6) for traffic information by storing the pertinent commute information to memory with an internal clock (e.g., a GPS internal clock) of the navigation device 714 to determine when to gather traffic information data and begin route calculations. The gathering of the traffic information data and the calculation of routes are performed before the user enters the vehicle 712 with the navigation device 714. It should be appreciated by those skilled in the art that the above method further increases the convenience for providing automated and personalized traffic reports as compared to the method and system described with respect to FIG. 6.

Figure 8:
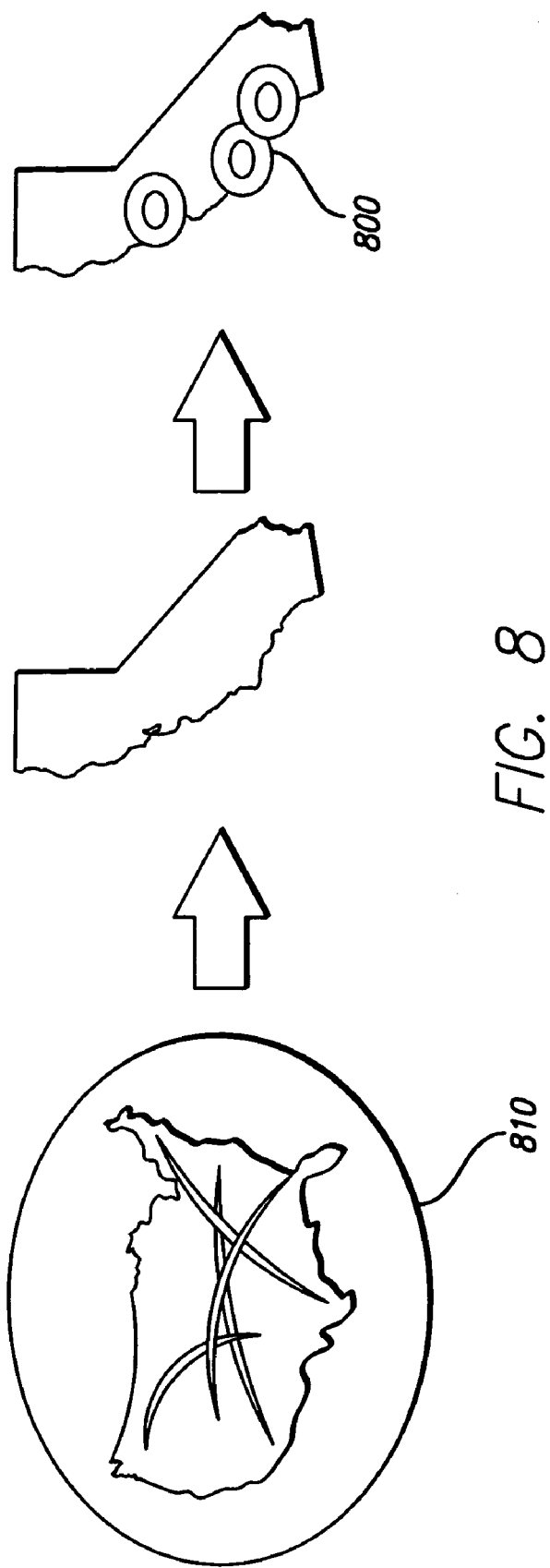
FIG. 8 is a schematic diagram of an embodiment for filtering traffic information pursuant to aspects of the invention.

FIG. 8 shows a method for filtering traffic information. Traffic information broadcast from a traffic information supplier to a fifteen (15) mile radius 800 from a user's location is filtered to expedite traffic calculation. This filtering embodiment saves on processing hardware and/or a bandwidth requirement of a navigation device and/or the traffic supplier. More specifically, the traffic information supplier broadcasts nationwide traffic information into twenty (20) smaller metropolitan area-wide information (or metros). The present filtering embodiment uses position information (e.g., GPS location information) at the start-up of the navigation device or from the memory of the navigation device if the navigation device is unable to acquire position information not only to filter the needed metro from the nationwide traffic information but also to filter down the needed metro to specific user applicable area. That is, in the present embodiment, each traffic communication packet between the navigation device and its traffic supplier includes information on metro location and filtering information for further filtering the traffic information to a fifteen (15) mile radius from a user's location.

Figure 9A:
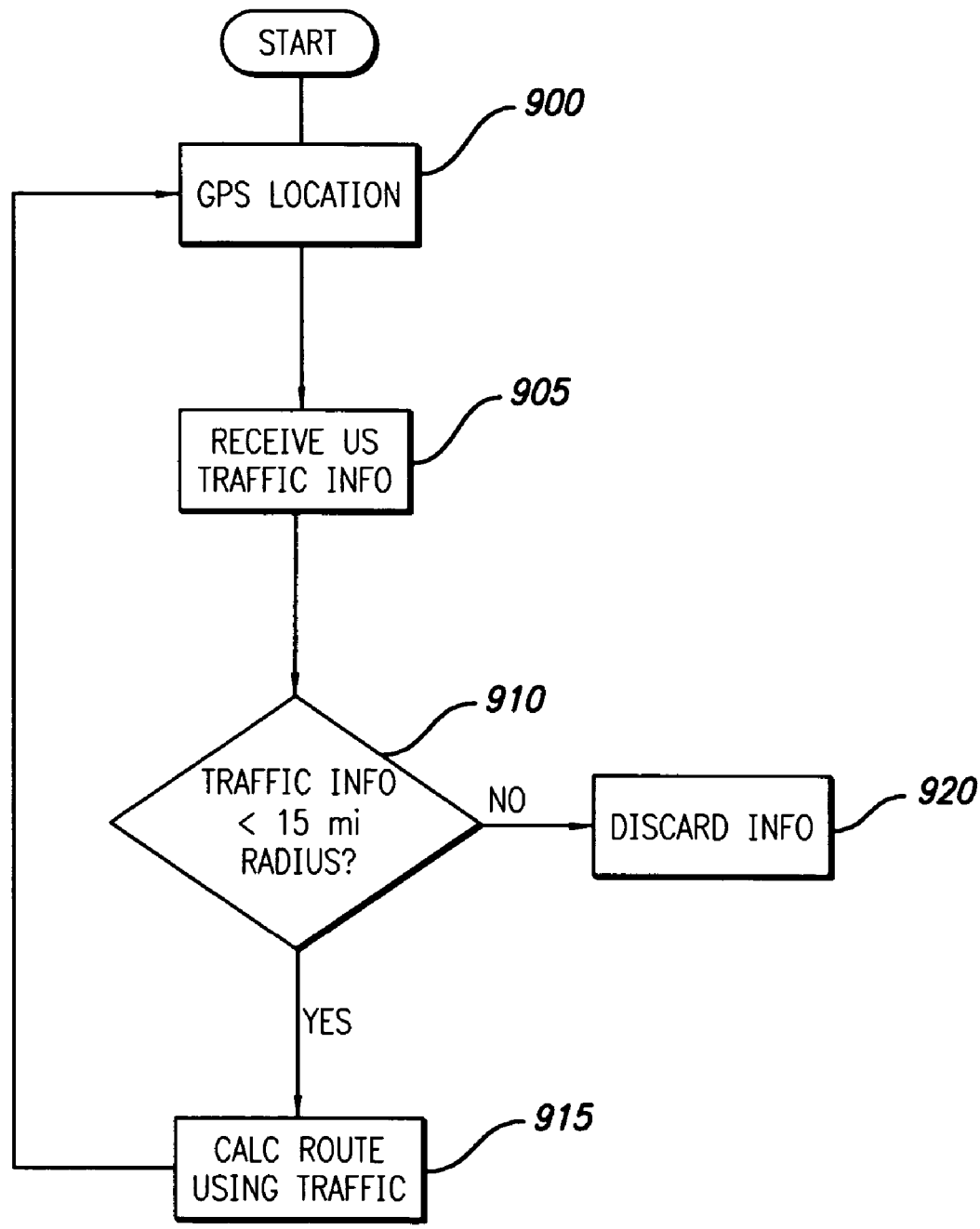
FIG. 9a is a flow diagram of an embodiment for filtering traffic information pursuant to aspects of the invention.

In general, according to FIG. 8, the embodiment provides a method for real time filtering of traffic updates, as diagrammed in FIG. 9*a*. At step 900, the method determines the location of the navigation device (e.g., a GPS location). At step 905, the method receives traffic information (e.g., U.S. traffic information). At step 910, the method determines whether the traffic information is within a predetermined radius of the navigation device or fifteen (15) mile radius of the navigation device. If the traffic information is within the predetermined radius, the navigation device then calculates a route for the user of the navigation device using the filtered traffic information at step 915. However, if the traffic information is not within the predetermined radius, then the traffic information is discarded at step 920.

Figure 9B:
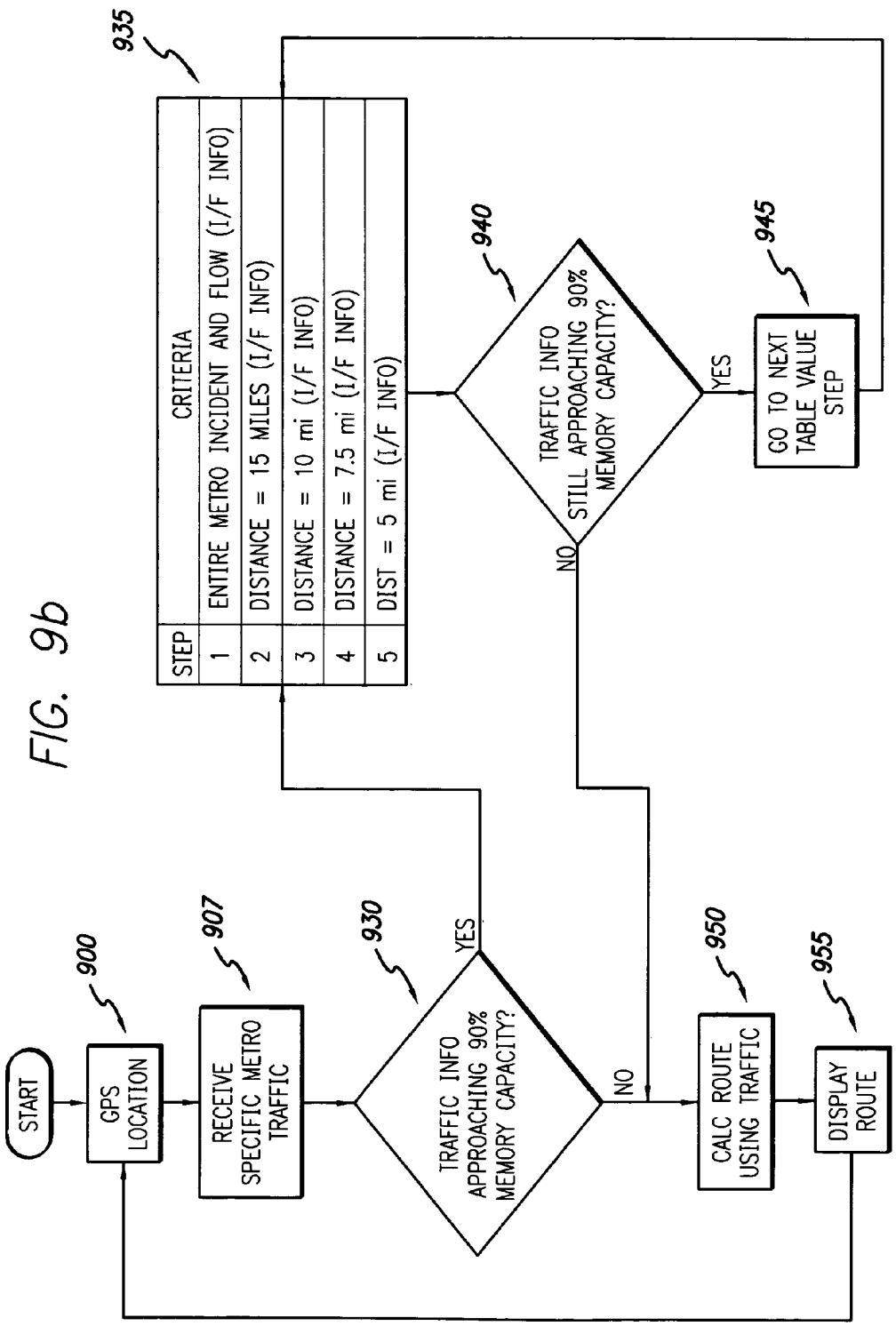
FIG. 9b is a flow diagram of an alternate embodiment for filtering traffic information pursuant to aspects of the invention.

The above-described method for real time traffic update filtering are for exemplary purposes only and the invention is not limited thereby. For example, FIG. 9*b* shows an alternate method that uses GPS location information to automatically filter traffic information based on a location of the navigation device. However, if there is still too much traffic information due to additional congestion in a specific metro for the navigation device to display/calculate effectively, the method uses decreasing radius(es) to display/calculate information in the specific metro. In this method, as shown in step 900, a location of a navigation device (e.g., a GPS location) is determined. At step 907, the method receives traffic information for a specific metro. At step 930, the method determines whether the traffic information is approaching a memory capacity level (e.g., a 90% memory capacity level) of the navigation device. If the traffic information is approaching the memory capacity, the method then selects a step-to-step criteria for filtering the traffic information pursuant to steps 935, 940, and 945 and the chart shown below. Steps 935, 940, and 945 are repeated until the memory capacity of the navigation device is below the predetermined capacity level. The method then move to step 950 to calculate a route using the filtered traffic information. The calculated result is displayed at step 955.

| Step | Criteria |
| --- | --- |
| 1 | Entire Metro incident and flow (i/f info) |
| 2 | distance = 15 miles (i/f info) |
| 3 | distance = 10 mi (i/f info) |
| 4 | Distance = 7.5 mi (i/f info) |
| 5 | Dist = 5 mi (i/f info) |

Figure 9C:
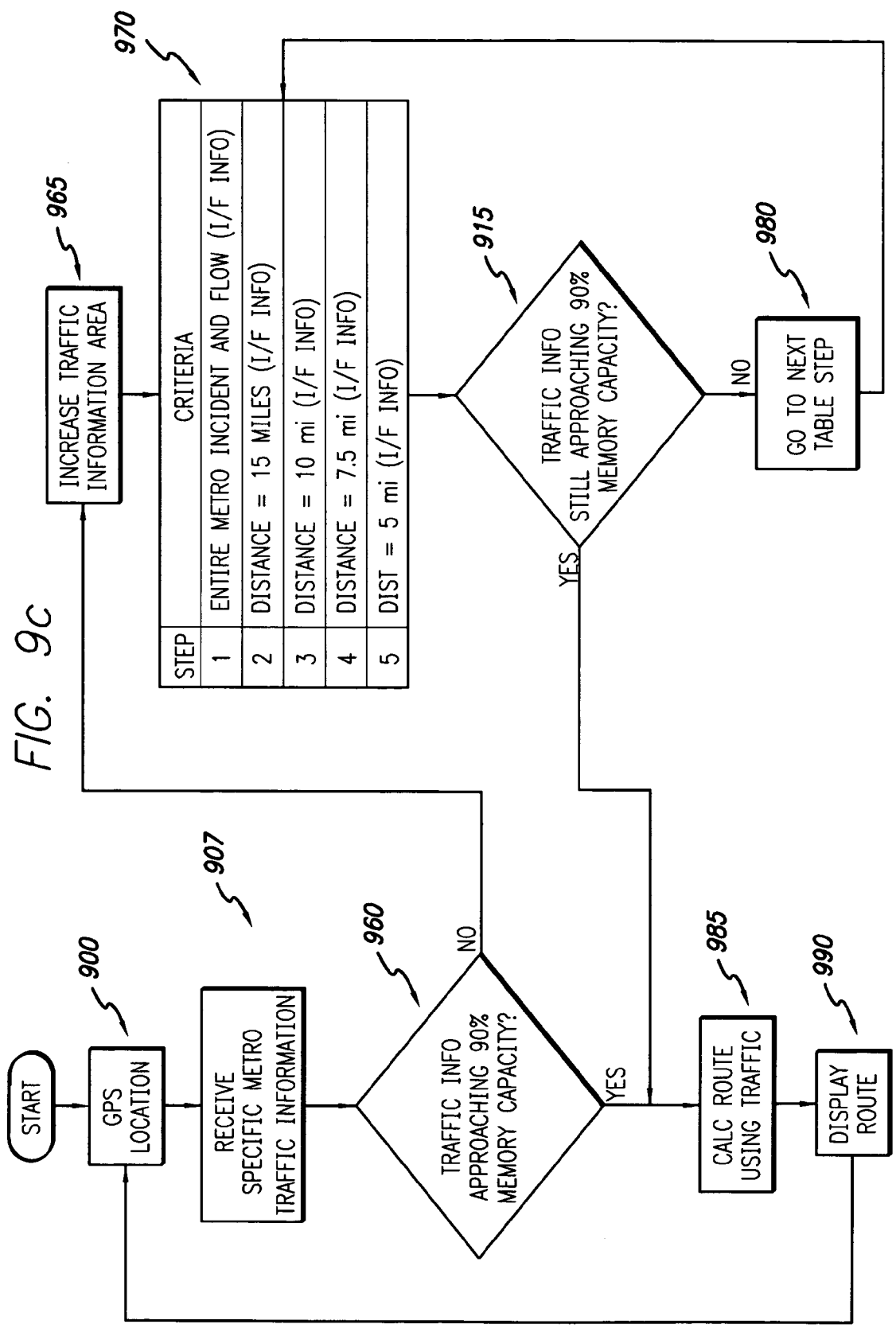
FIG. 9c is a flow diagram of an another embodiment for filtering traffic information pursuant to aspects of the invention.

FIG. 9*c* shows another method for filtering traffic information. This method monitors memory capacity to maximize an available metro traffic information and to increase the traffic information available for calculation by a navigation device. As shown in step 900, the method determines a location of a navigation device (e.g., a GPS location). At step 907, the method receives traffic information for a specific metro. At step 960, the method determines whether the traffic information is approaching a memory capacity level (e.g., a 90% memory capacity level) of the navigation device. If the traffic information is not approaching the memory capacity, the method then selects a step-to-step criteria for reverse-filtering (or increasing) the available traffic information pursuant to steps 960, 965, 970, 975, and 980 and the chart shown below. Steps 960, 965, 970, 975, and 980 are repeated until the memory capacity of the navigation device is approaching the predetermined capacity level. The method then calculates a route using the reverse-filtered traffic information at step 985 and displays the calculated route at step 990.

| Step | Criteria |
| --- | --- |
| 1 | distance = 15 miles (i/f info) |
| 2 | distance = 25 miles (i/f info) |
| 3 | Entire Metro incident and flow (i/f info) |
| 4 | Metro + adjacent Metro(s) |

Figure 10:
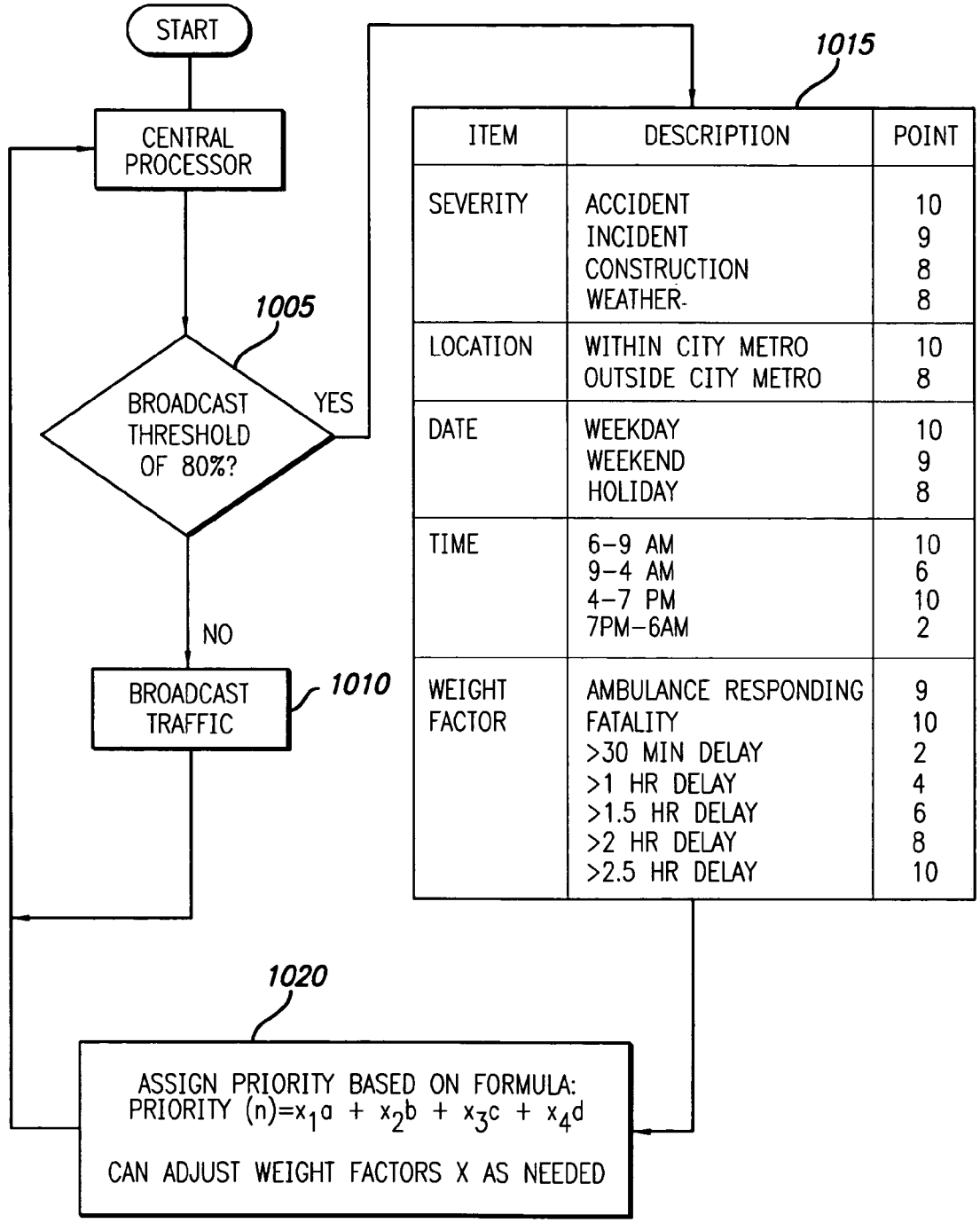
FIG. 10 is a flow diagram of an embodiment for providing weight factors and threshold prioritizing pursuant to aspects of the invention.

FIG. 10 shows a method for providing weight factors and threshold prioritization when a broadcast limit (e.g., an XM bandwidth limit) is close to being reached. The method is utilized with a broadcast network (e.g., an XM broadcast network) that broadcasts traffic information initially, for example, to twenty metropolitan areas (metros). The method prioritizes traffic information and maintains maximum bandwidth availability by assigning weight factors to each reported incident and broadcasting the traffic information based on the assigned weight factors. The assigning of the weight factors and the broadcasting of traffic information based on these factors would occur only when a certain preset broadcast threshold is met (e.g., 80% capacity of the network has been reached). At step 1005 of FIG. 10, a central processor at a remote location (e.g., 10 in FIG. 1*a*)

and/or at a navigation device (e.g., 12 in FIG. 1*a*) determines if a network broadcast threshold has been met (e.g., 80% of the capacity of the broadcast network). If the broadcast threshold has been met, weight factors are assigned to each piece of the traffic information (e.g., traffic information packets) based on the subject matter of the traffic information pursuant to step 1015 and the chart shown below.

| Item | Description | Weight Factor |
|---|---|---|
| Severity | Accident | 10 |
|  | Incident | 9 |
|  | Construction | 8 |
|  | Weather | 8 |
| Location | within city metro | 10 |
|  | outside city metro | 8 |
| Date | Weekday | 10 |
|  | Weekend | 9 |
|  | Holiday | 8 |
| Time | 6-9 AM | 10 |
|  | 9-4 AM | 6 |
|  | 4-7 PM | 10 |
|  | 7 PM-6 AM | 2 |
| Weight factor | Ambulance responding | 9 |
|  | Fatality | 10 |
|  | >30 min. delay | 2 |
|  | >1 hr. delay | 4 |
|  | >1.5 hr. delay | 6 |
|  | >2 hr. delay | 8 |
|  | >2.5 hr. delay | 10 |

Those skilled in the art will appreciate that the above method for the management of traffic information and broadcast bandwidth provides a proactive approach to ensure most critical traffic information or incidents are reported while still maintaining bandwidth requirements. It should also be appreciated that the above-described mechanisms and process for bandwidth management are for exemplary purposes only and that the invention is not limited thereby.

FIG. 11 shows an embodiment of a navigation device that initiates a recalculation of a route 1100 when there is a upcoming turn 1105 to anticipate a user of the navigation device missing the turn 1105. For example, referring now also to FIG. 12, the navigation device makes an assumption that a vehicle's starting point 1214 is somewhere ahead of its actual starting point 1212, not on the route 1200, to anticipate a user of the navigation device missing a turn 1205. In the present context, recalculation refers to all possible routes that the user may take when an error occurs (e.g., user should go left but goes right). Recalculation can also be referred to as pre-calculation or error anticipating calculation. Referring now back to FIG. 11, the recalculations can be made at variable times 1110*a* 1110*b*, 1110*c*, 1110*d*.

Figure 14:
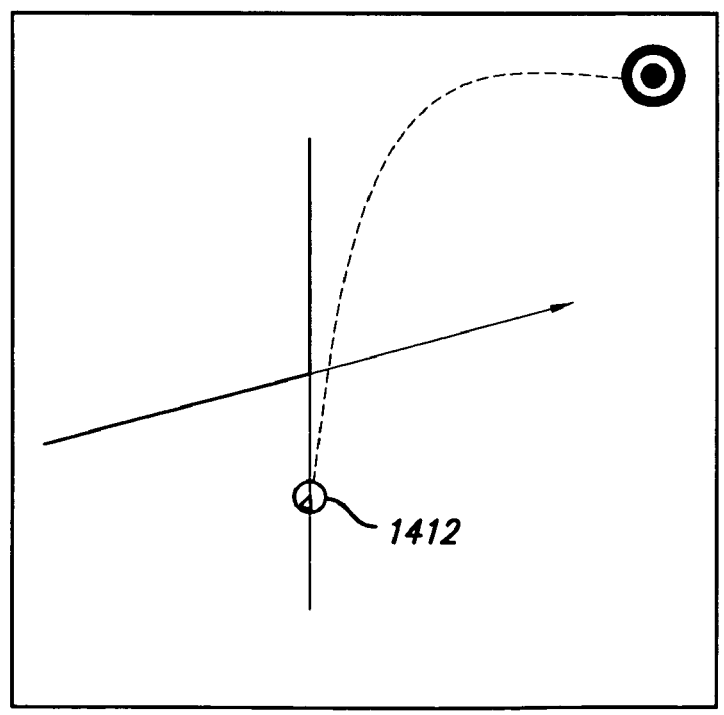
FIG. 14 is another schematic diagram of an embodiment of a system that performs a route calculation using traffic information broadcast from a remote location and/or a traffic supplier pursuant to aspects of the invention.

FIG. 13 shows an embodiment of a navigation device that performs a route calculation using traffic information broadcast from a remote location and/or a traffic information supplier. For example, referring now to FIG. 13, the traffic information updates may be provided to the navigation device every one (1) minute or five (5) minutes, and the navigation device calculates a new route with every traffic information update for better route guidance. That is, referring now also to FIG. 14, once traffic information has been completely refreshed or updated, a route calculation is triggered using a vehicle's current position 1412 as the starting point.

Figure 12:
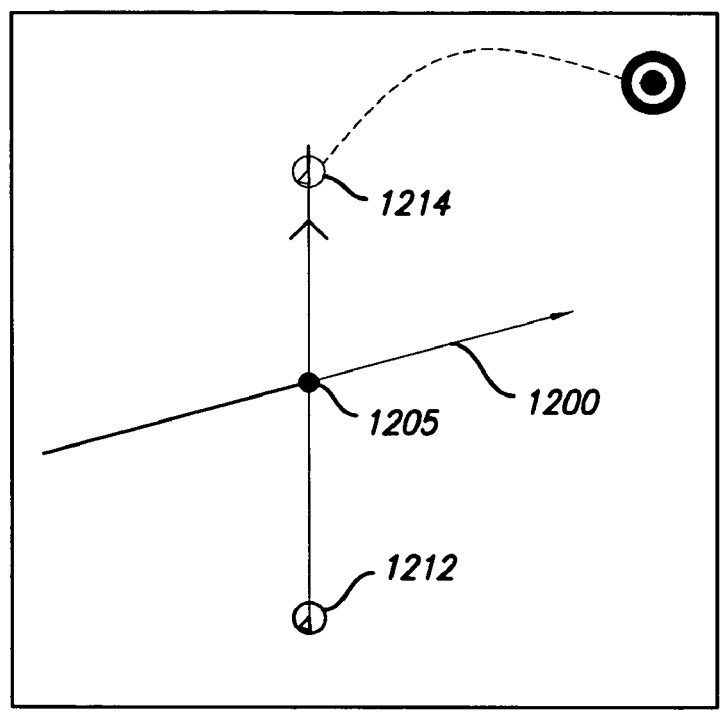
FIG. 12 is another schematic diagram of an embodiment of a system that initiates a recalculation of a route when there is a upcoming turn pursuant to aspects of the invention.
Figure 15:
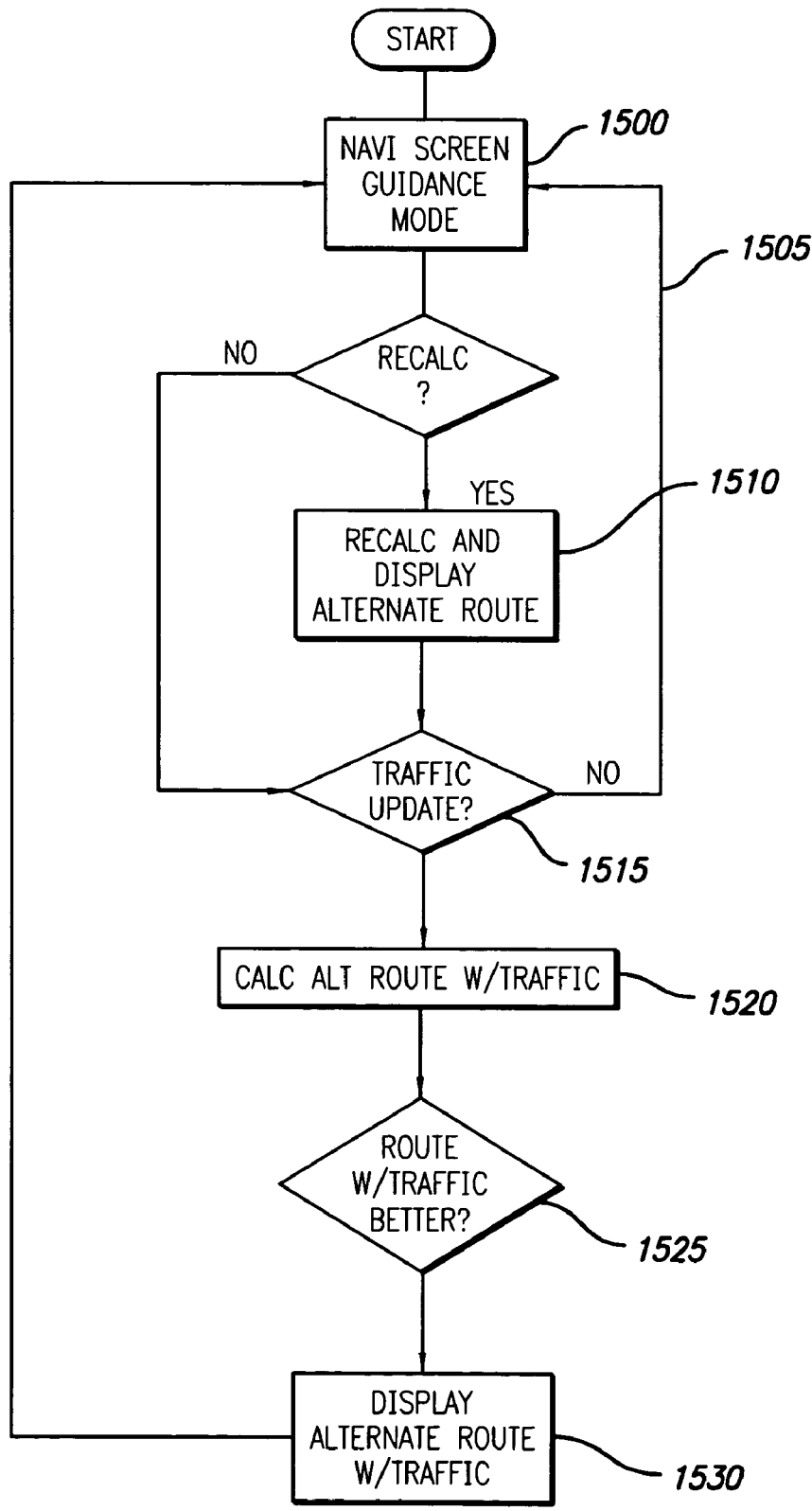
FIG. 15 is a flow diagram of an embodiment that uses every traffic information update to act as a trigger for route calculation and recalculation pursuant to aspects of the invention.

FIG. 15 shows an embodiment of a method that uses every traffic information update to act as a trigger for calculation and recalculation (i.e., anticipation of a user error). At step 1500, a navigation device is set at a route guidance mode. At step 1505, the navigation device determines whether to recalculate (i.e., pre-calculate) a new route. For example, the navigation device anticipates a user error as shown in FIG. 12 and determines that a new route (e.g., one based on an anticipated user error) should be calculated. If the navigation device recalculates the new route, the new route is displayed to a user of the navigation device at step 1510, and the method moves to step 1515. If the navigation device does not recalculate the new route, the method moves directly to step 1515. At step 1515, the navigation device determines whether a traffic information update has been provided to the navigation device. If the traffic information update has not been provided, the method moves to step 1500. If the traffic information update has been provided, the navigation device calculates a new alternative route with the updated traffic information at step 1520, and the method moves to step 1525. At step 1525, the method determines whether the alternative route is better (e.g., whether it has a shorter estimated travel time) than the route previously displayed to the user. If the alternative route is better, the navigation device displays the alternative route with the traffic information at step 1530, and then moves to step 1500.

Figure 16:
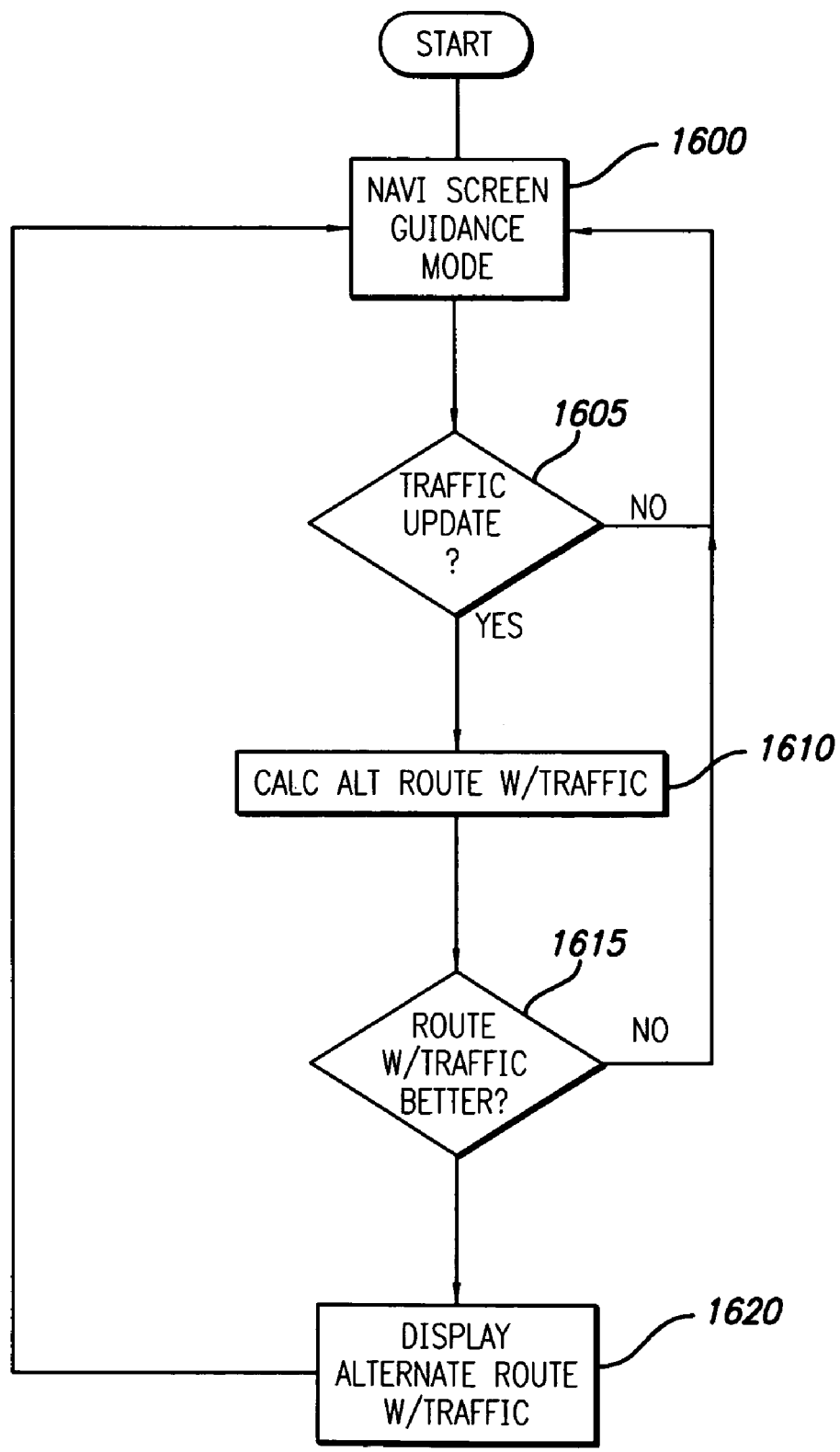
FIG. 16 is a flow diagram of an embodiment that uses every traffic information update to act as a trigger for route calculation but does not recalculate to anticipate user error pursuant to aspects of the invention.

The above-described mechanisms and process for route calculation and recalculation using traffic information are for exemplary purposes only, and the invention is not limited thereby. For example, FIG. 16 shows an embodiment of a method that uses every traffic information update to act as a trigger for recalculation but does not recalculate to anticipate user error. The embodiment is designed to reduce processing requirements at the navigation device. That is, at step 1600, a navigation device is set at a route guidance mode, and the method moves immediately to step 1605. At step 1605, the navigation device determines whether a traffic information update has been provided to the navigation device. If the traffic information update has not been provided, the method moves to step 1600. If the traffic information update has been provided, the navigation device calculates a new alternative route with the updated traffic information at step 1610, and the method moves to step 1615. At step 1615, the method determines whether the alternative route is better (e.g., whether it has a shorter estimated travel time) than the route previously displayed to the user. If the alternative route is better, the navigation device displays the alternative route with the traffic information at step 1620, and then moves to step 1600.

Figure 17:
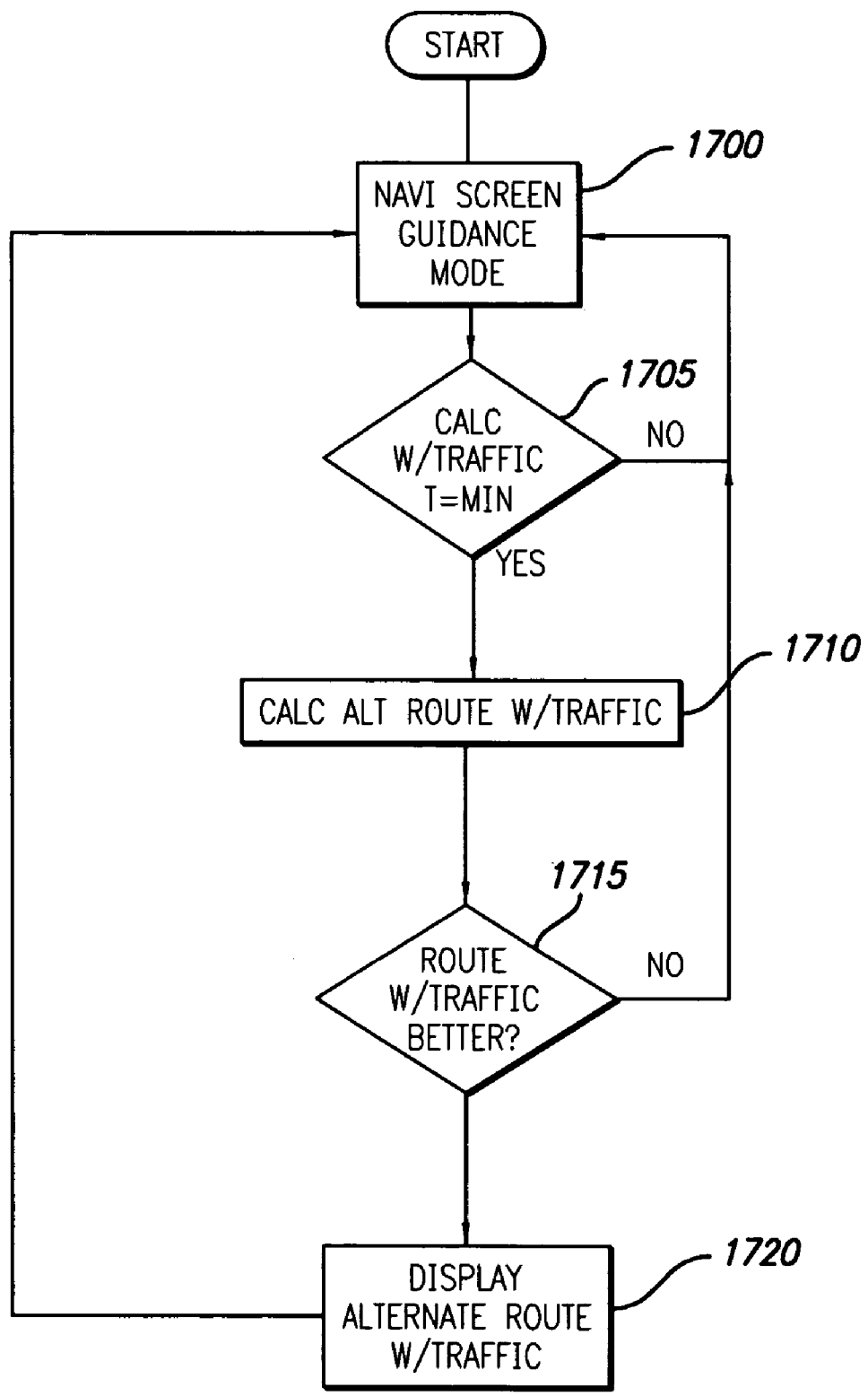
FIG. 17 is a flow diagram of an embodiment that uses streaming traffic information and an internal clock to trigger route calculation and/or recalculation pursuant to aspects of the invention.

FIG. 17 shows an embodiment of a method that uses streaming (non-static or constantly changing) traffic information data and an internal processing clock to trigger route calculation at fixed and/or variable time intervals. At step 1700, a navigation device is set at a route guidance mode. At step 1705, the navigation device determines whether a predetermined amount of time (e.g., one minute) has elapsed using an internal processing clock (e.g., one located in a processor unit and/or a position determination unit of the navigation device). If the predetermined amount of time has not elapsed, the method moves to step 1700. If the predetermined amount of time has elapsed, the navigation device calculates a new alternative route with the updated traffic information at step 1710, and the method moves to step 1715. At step 1715, the method determines whether the alternative route is better (e.g., whether it has a shorter estimated travel time) than the route previously displayed to the user. If the alternative route is better, the navigation device displays the alternative route with the traffic information at step 1720 and then moves to step 1700.

Figure 18:
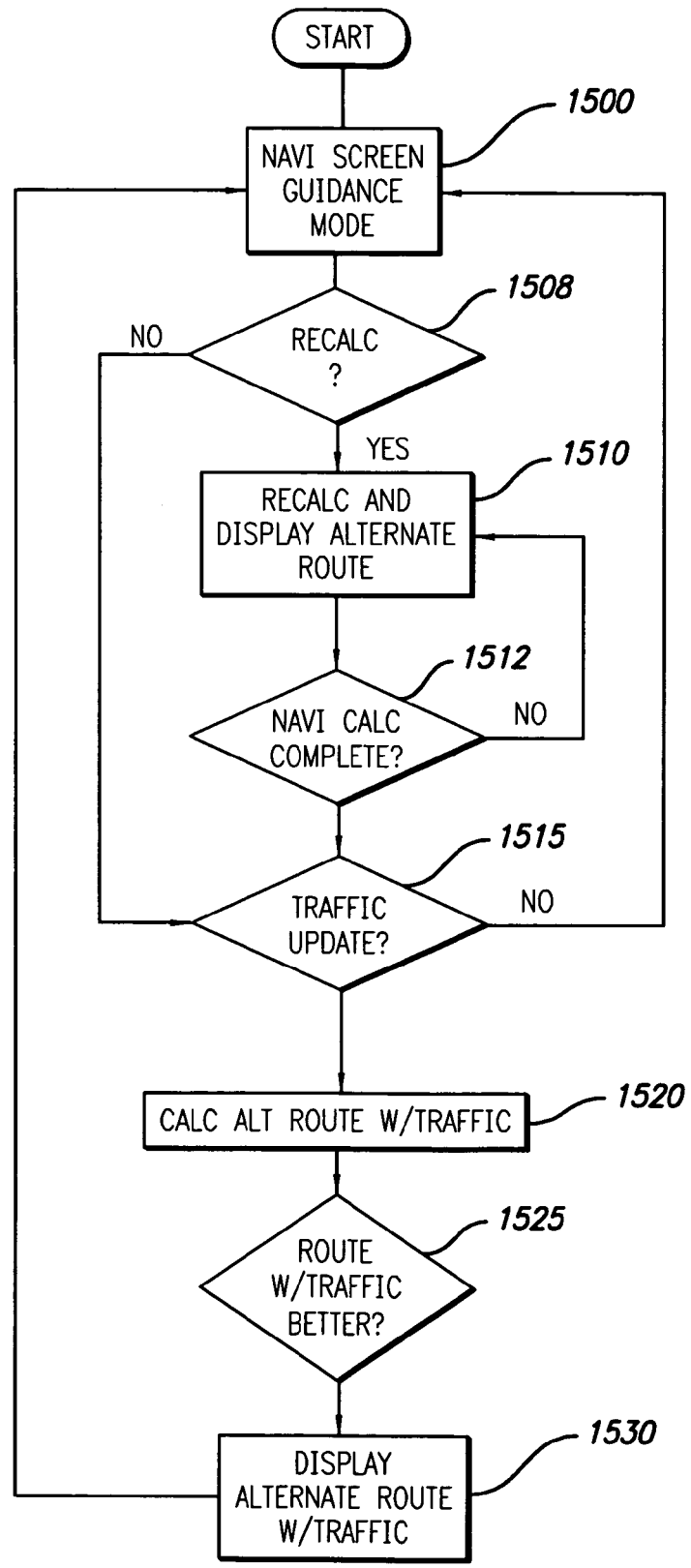
FIG. 18 is a flow diagram of an embodiment that waits for a recalculation to finish and then calculates a new alternate route with traffic information pursuant to aspects of the invention.

FIG. 18 shows an embodiment of a method that waits for a recalculation (i.e., an anticipation of a user error) to finish and then calculates a new alternate route with traffic information to determine the best route. That is, in the method shown in FIG. 18, the recalculation (without traffic information) always takes precedence over the calculation with traffic information. In addition, it should be appreciated that the steps shown in FIG. 18 are similar to those shown for FIG. 15 with the exception of additional step 1512 (located between the recalculation step 1510 and the traffic information update determination step 1515) that determines whether the recalculation (at step 1510) has been completed.

Figure 19:
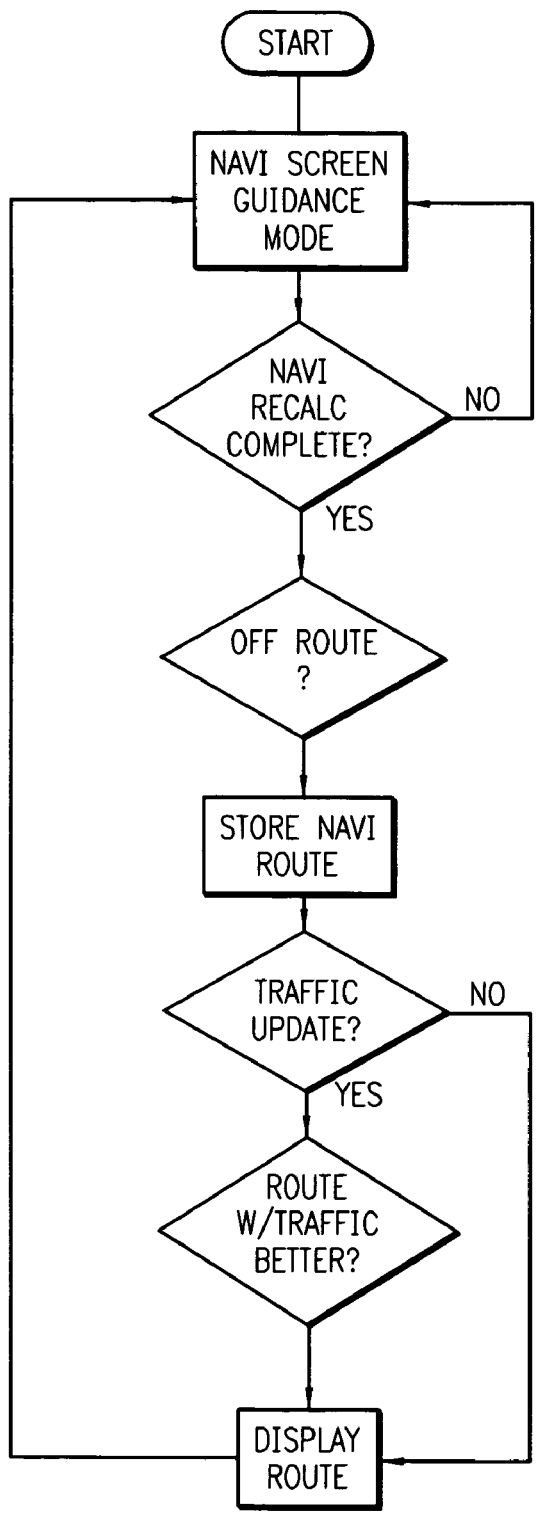
FIG. 19 is a flow diagram of an embodiment that store the traffic information when recalculation is taking place pursuant to aspects of the invention.

FIG. 19 shows an embodiment of a method that stores the traffic information data when a navigation device is recalculating a route and/or receiving a traffic information update. After the recalculation is completed, the method then resumes route calculation with the traffic information data. In addition, the method of FIG. 19 takes the previous traffic information calculated route and compares it with the new recalculated route (e.g., to determine the best route) when the method is between traffic information updates. That is, the method uses its old traffic information until new traffic information has been completely provided to the navigation device.

Figure 20:
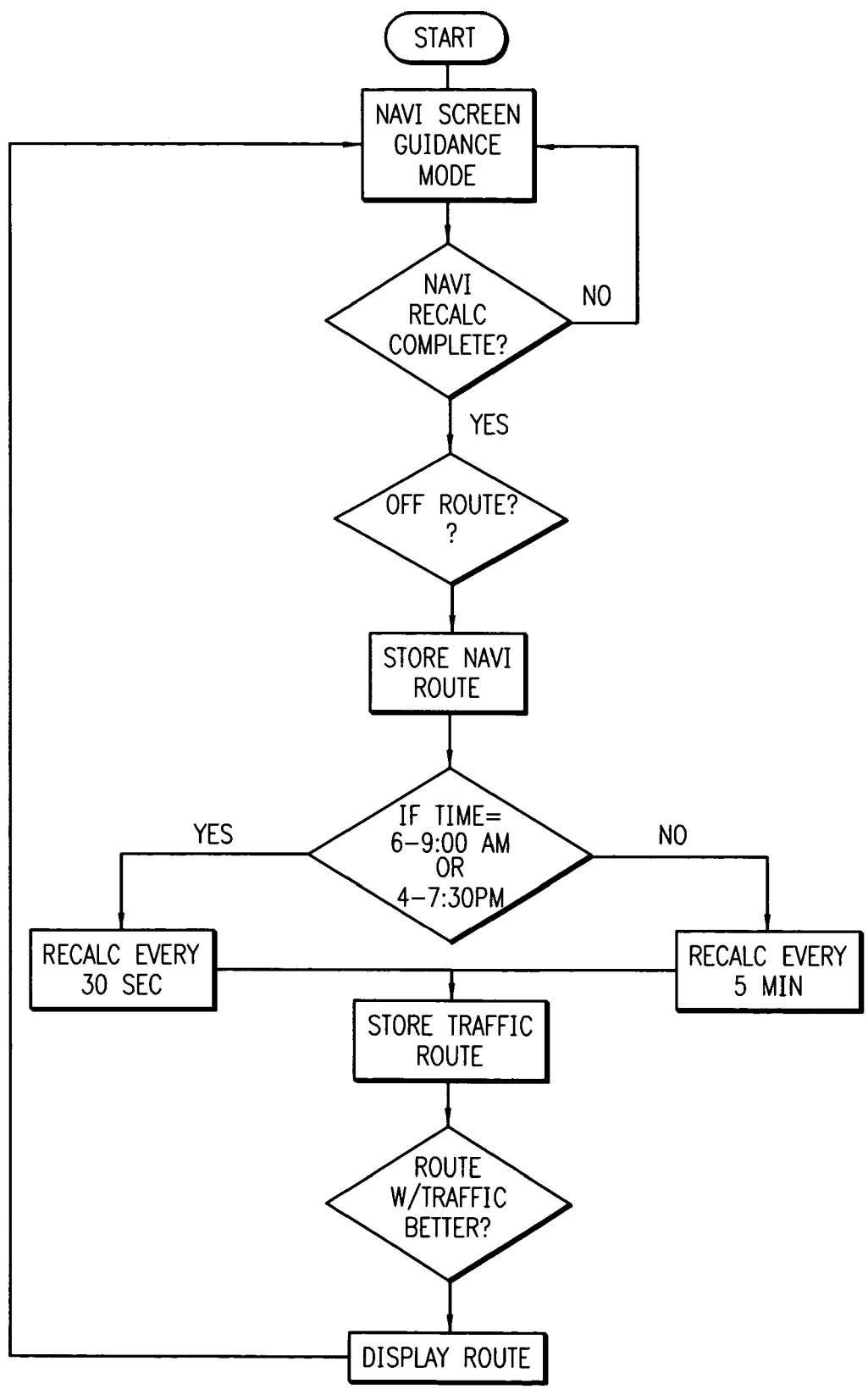
FIGS. 20 and 20a illustrate an embodiment that stream traffic information and varies traffic information update triggers for route calculation and/or recalculation pursuant to aspects of the invention.
Figure 20A:
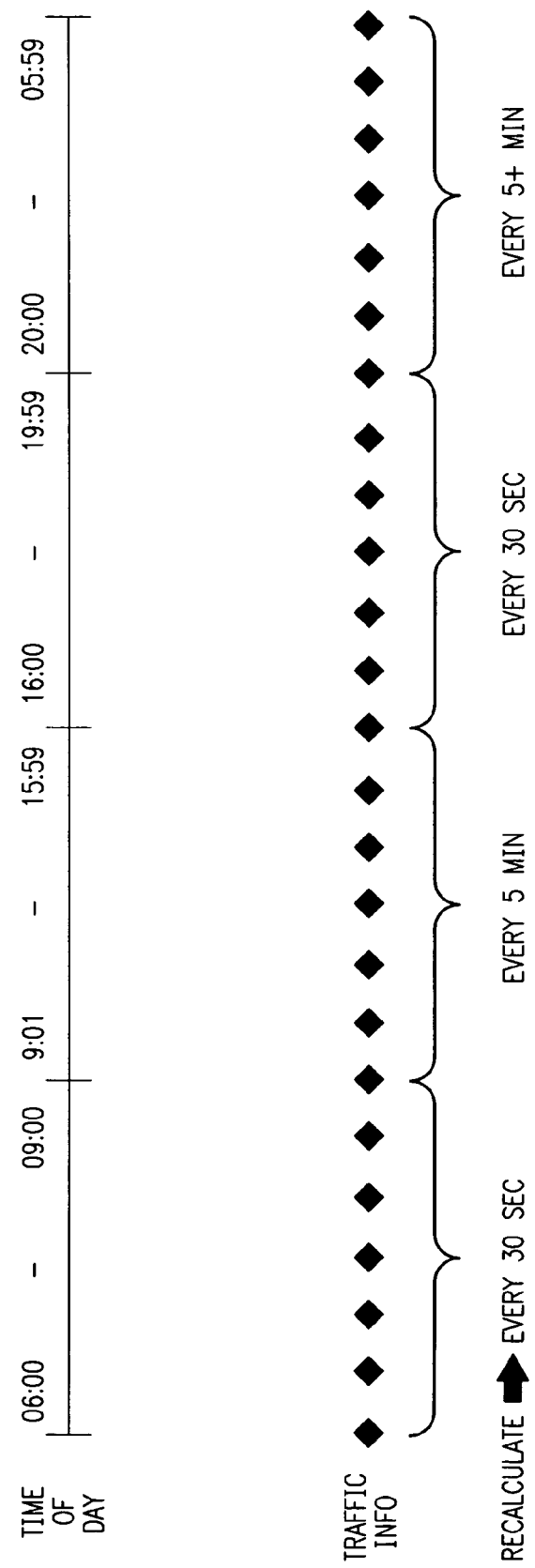

FIGS. 20 and 20a show an embodiment of a method that streams traffic information data to provide users with the most up to date information. In addition, depending on the time of day, the method varies the traffic information update triggers such that, at peak commute times, the recalculation (and calculation) triggers are increased and, at off peak commute times, the triggers are decreased. Those skilled in the art will appreciate that the method of FIGS. 20 and 20a minimizes the amount of time needed for updated traffic information to trigger a new calculation and provides updated traffic information based on a need use basis.

In addition, FIG. 20 shows a method for increasing and decreasing amounts and/or numbers of broadcast traffic information (e.g., via an XM network) based on commute times. More specifically, the method varies the broadcast of traffic information data based on commute times in each time zone, as shown in the following chart.

| Pacific | | Mountain | | Central | | Eastern | |
|---|---|---|---|---|---|---|---|
| Time | Broadcast rate | Time | Broadcast rate | Time | Broadcast rate | Time | Broadcast rate |
| 1:00 AM | 5 min | 2:00 AM | 5 min | 3:00 AM | 5 min | 4:00 AM | 5 min |
| 2:00 AM | 5 min | 3:00 AM | 5 min | 4:00 AM | 5 min | 5:00 AM | 5 min |
| 3:00 AM | 5 min | 4:00 AM | 5 min | 5:00 AM | 5 min | 6:00 AM | 30 sec |
| 4:00 AM | 5 min | 5:00 AM | 5 min | 6:00 AM | 30 sec | 7:00 AM | 30 sec |
| 5:00 AM | 5 min | 6:00 AM | 30 sec | 7:00 AM | 30 sec | 8:00 AM | 30 sec |
| 6:00 AM | 30 sec | 7:00 AM | 30 sec | 8:00 AM | 30 sec | 9:00 AM | 30 sec |
| 7:00 AM | 30 sec | 8:00 AM | 30 sec | 9:00 AM | 30 sec | 10:00 AM | 5 min |
| 8:00 AM | 30 sec | 9:00 AM | 30 sec | 10:00 AM | 5 min | 11:00 AM | 5 min |
| 9:00 AM | 30 sec | 10:00 AM | 5 min | 11:00 AM | 5 min | 12:00 PM | 5 min |
| 10:00 AM | 5 min | 11:00 AM | 5 min | 12:00 PM | 5 min | 1:00 PM | 5 min |
| 11:00 AM | 5 min | 12:00 PM | 5 min | 1:00 PM | 5 min | 2:00 PM | 5 min |
| 12:00 PM | 5 min | 1:00 PM | 5 min | 2:00 PM | 5 min | 3:00 PM | 5 min |
| 1:00 PM | 5 min | 2:00 PM | 5 min | 3:00 PM | 5 min | 4:00 PM | 30 sec |
| 2:00 PM | 5 min | 3:00 PM | 5 min | 4:00 PM | 30 sec | 5:00 PM | 30 sec |
| 3:00 PM | 5 min | 4:00 PM | 30 sec | 5:00 PM | 30 sec | 6:00 PM | 30 sec |
| 4:00 PM | 30 sec | 5:00 PM | 30 sec | 6:00 PM | 30 sec | 7:00 PM | 30 sec |
| 5:00 PM | 30 sec | 6:00 PM | 30 sec | 7:00 PM | 30 sec | 8:00 PM | 5 min |
| 6:00 PM | 30 sec | 7:00 PM | 30 sec | 8:00 PM | 5 min | 9:00 PM | 5 min |
| 7:00 PM | 30 sec | 8:00 PM | 5 min | 9:00 PM | 5 min | 10:00 PM | 5 min |
| 8:00 PM | 5 min | 9:00 PM | 5 min | 10:00 PM | 5 min | 11:00 PM | 5 min |
| 9:00 PM | 5 min | 10:00 PM | 5 min | 11:00 PM | 5 min | 12:00 AM | 5 min |
| 10:00 PM | 5 min | 11:00 PM | 5 min | 12:00 AM | 5 min | 1:00 AM | 5 min |
| 11:00 PM | 5 min | 12:00 AM | 5 min | 1:00 AM | 5 min | 2:00 AM | 5 min |
| 12:00 AM | 5 min | 1:00 AM | 5 min | 2:00 AM | 5 min | 3:00 AM | 5 min |

In addition, if certain metros have more congestions, user demands, vehicles, etc., the above broadcast method can vary the broadcast time or rate in the specific metro as shown in the following chart.

| Metro time | Broadcast rate |
|---|---|
| 6:00 to 9:00 AM | Every 30 sec. |
| 9:01 AM to 3:59 PM | Every 5 min. |
| 4:00 PM to 7:00 PM | Every 30 sec. |
| 7:01 PM to 5:59 AM | Every 5 min. |

Those skilled in the art will appreciate that the above method for providing a variable broadcast rate allows a navigation device to receive quicker and more accurate broadcast traffic information. It should also be appreciated that the above-described mechanisms and processes for variable broadcasting are for exemplary purposes only, and the invention is not limited thereby.

FIG. 21 shows an embodiment of a display system that, when a user is rerouted by a navigation device, displays the new route's mileage 2100 and/or estimated time of arrival (ETA) 2105 and/or differences compared to the original route 2110 so that the user can make a direct comparison of the two routes. More specifically, the present display system allows the navigation device using broadcast traffic information to convey reasons why a new route using the traffic information has been calculated, selected, and/or displayed to the user (e.g., because it has a shorter travel time even if the actual distance may be longer). It should also be appreciated that the above-described display system is for exemplary purposes only and that the invention is not limited thereby.

Figure 22A:
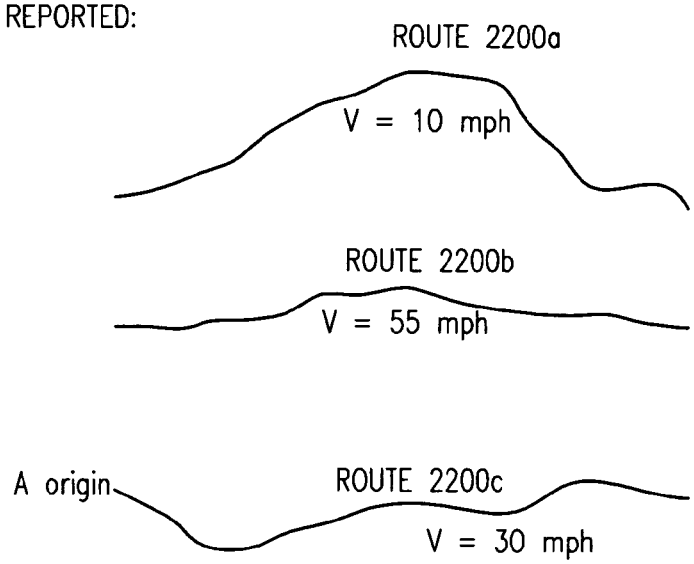
FIGS. 22a and 22b illustrate a case where only traffic incident information is available and addressed by an embodiment of the invention.

In general there are two types of traffic information: traffic flow information and traffic incident information. Ideally, both types of information should be available to a navigation device (e.g. 14 in FIG. 1) so that the navigation device can use the incident information to avoid a traffic incident and the flow information to avoid traffic congestion. To illustrate a particular problem that an embodiment of the present invention addresses, FIG. 22a shows a case where the traffic incident information is available but the flow information is not available. In this case, a navigation device may determine that a route 2200b is free flowing and direct the users to that route 2200b instead of route 2200a or route 2200c. However, as shown in FIG. 22b, route 2200b is actually congested and route 2200c with an reported incident may actually be better (i.e., a faster route).

Figure 22B:
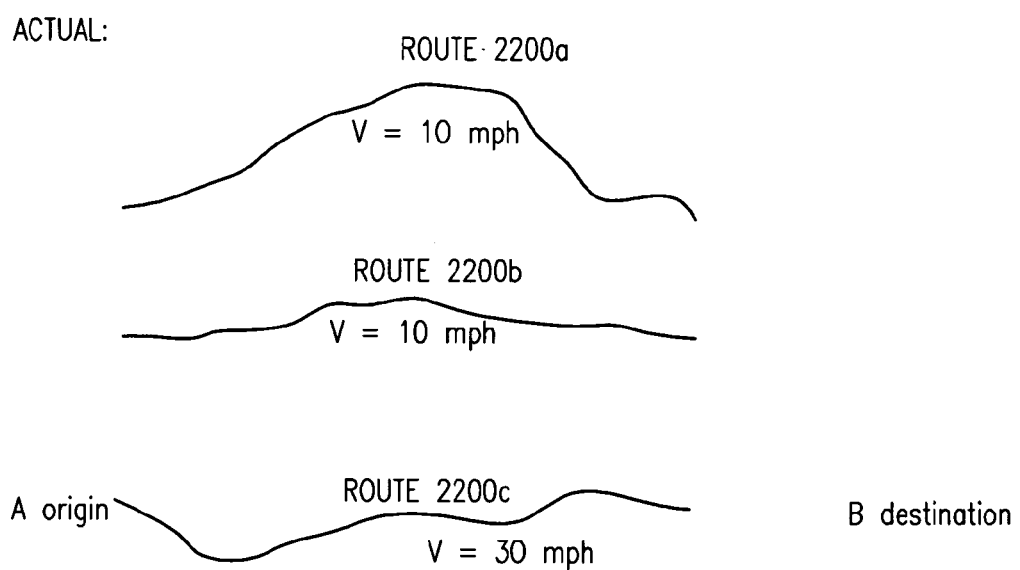

In general, according to problems illustrated in FIGS. 22a and 22b, the embodiment of the present invention provides a method for combining actual and historical traffic information to predict traffic congestion, as diagrammed in FIG. 23. At step 2300, a navigation device (e.g., the navigation device 14 shown in FIG. 1a) calculates a route using traffic information that has been provided. At step 2305, the navigation device determines if the route calculation has the required traffic flow information. If the required traffic flow information is available, the navigation device then calculates the best route and displays this route to a user of the navigation device at step 2330. If the required traffic flow information is not available or cannot be provided, the navigation device contacts a database (e.g., a database in the remote location 10 shown in FIG. 1a) via its back-channel capabilities to receive historical traffic flow information at step 2310. The historical traffic flow information is then broadcast over a broadcast communication network (e.g., 31 in FIG. 1a) to the navigation device at step 2320. At step 2325, the navigation device then calculates the best route and displays this route to a user of the navigation device at step 2330. Again, it should be appreciated that the above-described mechanisms and process for combining actual and historical traffic information are for exemplary purposes only and that the invention is not limited thereby.

FIG. 24 shows an embodiment for providing a time stamp to traffic incident information and for using the time stamp to determine a route for calculation by a navigation device. The embodiment can be applicable to a case when traffic flow information is not available, for example, due to sensor not available, damaged, malfunctioning, etc. The embodiment can also be applicable to a case where traffic information that is provided does not report details of the extent of the congestion (e.g., from where to where is traffic congested) and/or a case where delays occur in providing incident details other than a location of an incident. Specifically, if traffic flow information is not available, traffic incident information with extent of where to where traffic congestion is occurring is not available, and/or there are equal numbers of traffic incidents to avoid, the embodiment provides a method that time stamps traffic incident information (having a location of the incident) and calculates a route by avoiding latest traffic incidents. At step 2400, the method begins a route calculation process. At step 2405, the route calculation process determines if traffic flow information or if traffic incident information with extent information (e.g., extent information from where to where is traffic congested) is available. If the determined traffic information is available, the method moves to step 2412 to perform a route calculation based on the traffic information. The calculated route is then displayed at step 2420. If the traffic flow information and the traffic incident information with extent details are not available, the method moves to 2410 to determine a time from traffic incident reported for each reported traffic incident. The method, at step 2415, then performs a route calculation based on a route having the traffic incidents with the greatest total time (i.e., by avoiding the latest traffic incidents). The calculated route (not having the latest traffic incidents) is then displayed at step 2420.

Those skilled in the art will appreciate that the above method for providing a time stamp to traffic incident information and for using the time stamp to determine a route calculation alleviates problems that occur when only basic traffic incident information is available and provides a user of a navigation device (e.g. a device 14, 214 shown in FIGS. 1a, 2) with a way to automatically avoid traffic incidents based on a timer-based incident avoidance scheme. It should be appreciated that the above-described mechanisms and process for route calculations based on an automatic timer based incident avoidance scheme are for exemplary purposes only and the invention is not limited thereby.

Referring now back to FIG. 8 and FIGS. 9a to 9c, the traffic information supplier broadcasts nationwide traffic information into twenty (20) smaller metropolitan area-wide information (or metros) so that embodiments of the present invention can use position information (e.g., GPS location information) to filter the needed traffic information. However, not all vehicles have GPS navigation systems, and/or receive GPS signals to identify their specific geographic location, and triangulation methodology may not be reliable and/or available due to repeater locations and/or building interference. Accordingly, referring now to FIG. 25, an embodiment of the invention provides a reliable method for filtering traffic updates without the need of GPS navigation systems, GPS signals, repeaters, and/or repeater signals. The embodiment provides a method for a user on a vehicle 2512 to specify its home address and applicable metro location via an owner link 2515 (e.g., a website of the owner link 2515) so that a specific traffic information can be received by the vehicle 2512.

Figure 25:
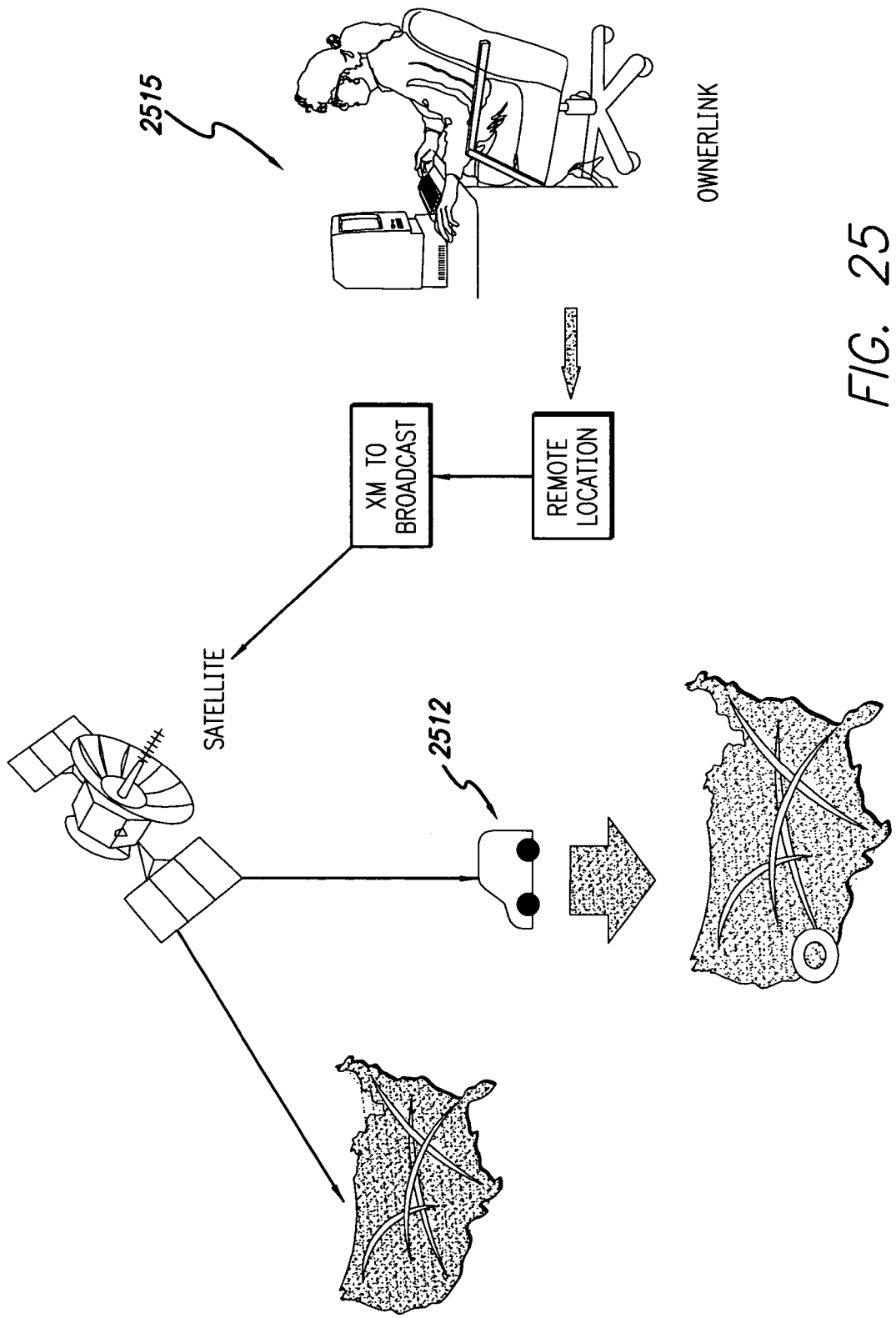
FIG. 25 is a schematic diagram of an embodiment for filtering traffic information without the need of a position determination unit pursuant to aspects of the invention.
Figure 26:
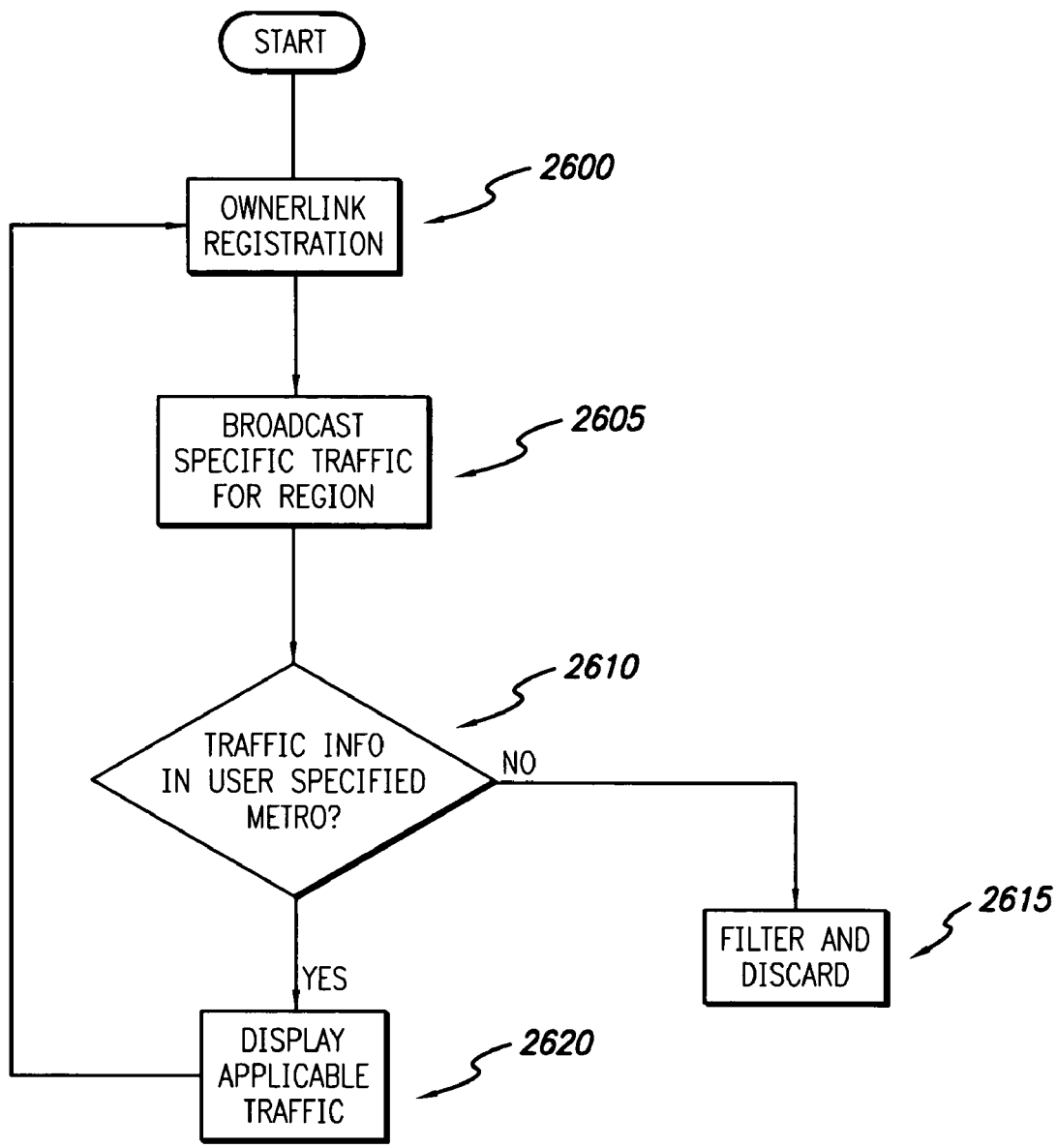
FIG. 26 is a flow diagram of an embodiment for filtering traffic information without the need of a position determination unit pursuant to aspects of the invention.

Specifically, the embodiment of FIG. 25 provides a method that allows a user to manually enter a metro location, as diagrammed in FIG. 26. At step 2600, a user registers (or specifies) its home address and applicable metro location via an owner link 2515. At step 2605, specific traffic information for various regions (or metros) are broadcasted. At step 2610, the method determines whether a specific part of the broadcasted traffic information is in a user-specified metro. If the specific part of the broadcasted traffic information is in the user-specified metro, the method then displays (or calculates a route for the user via a navigation device) using the filtered traffic information at step 2620. However, if the specific part of the traffic information is not in the user-specified metro, then the specific part of the information is discarded at step 2615.

Figure 27:
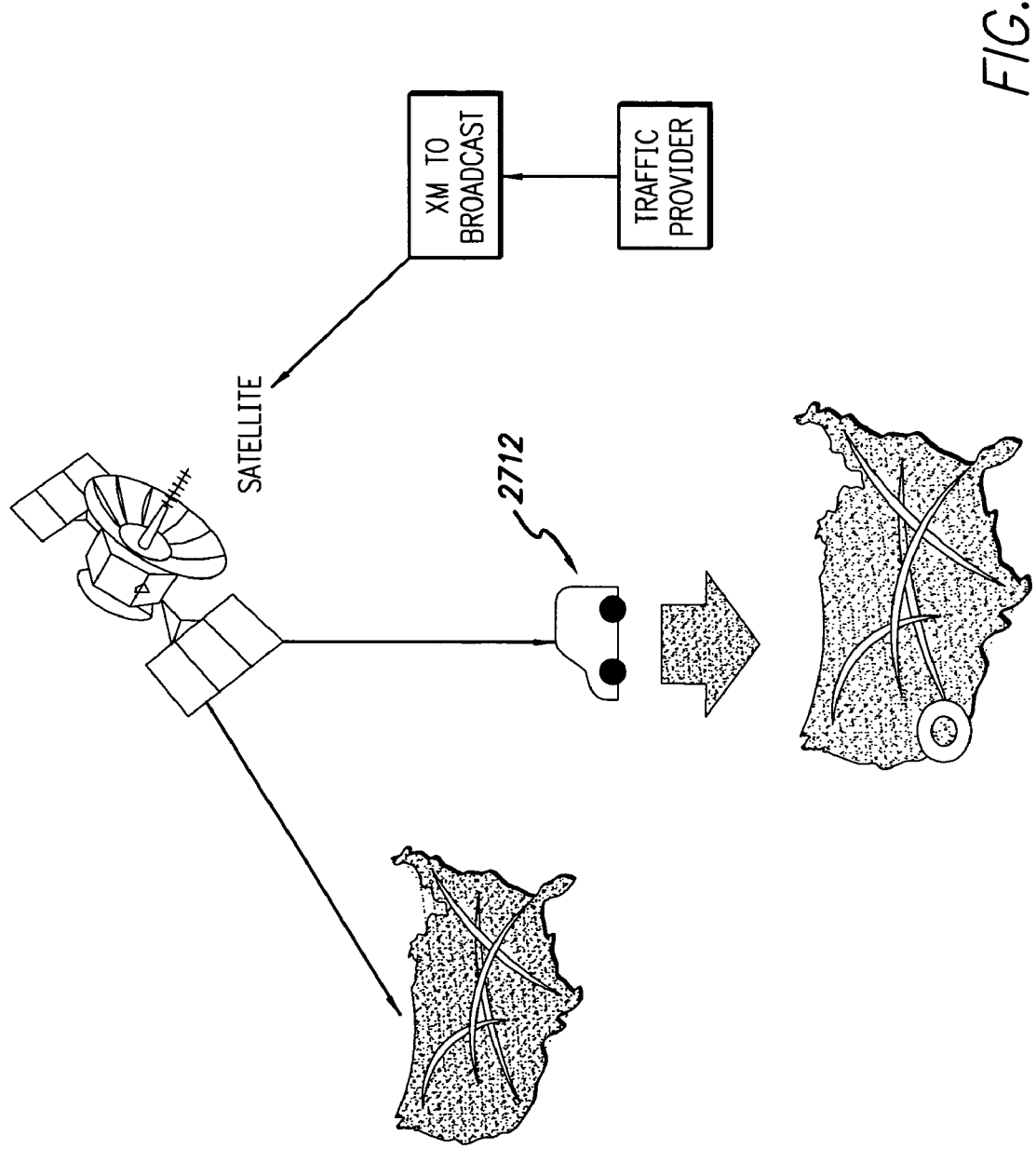
FIG. 27 is a schematic diagram of an alternative embodiment for filtering traffic information without the need of a position determination unit pursuant to aspects of the invention.
Figure 28A:
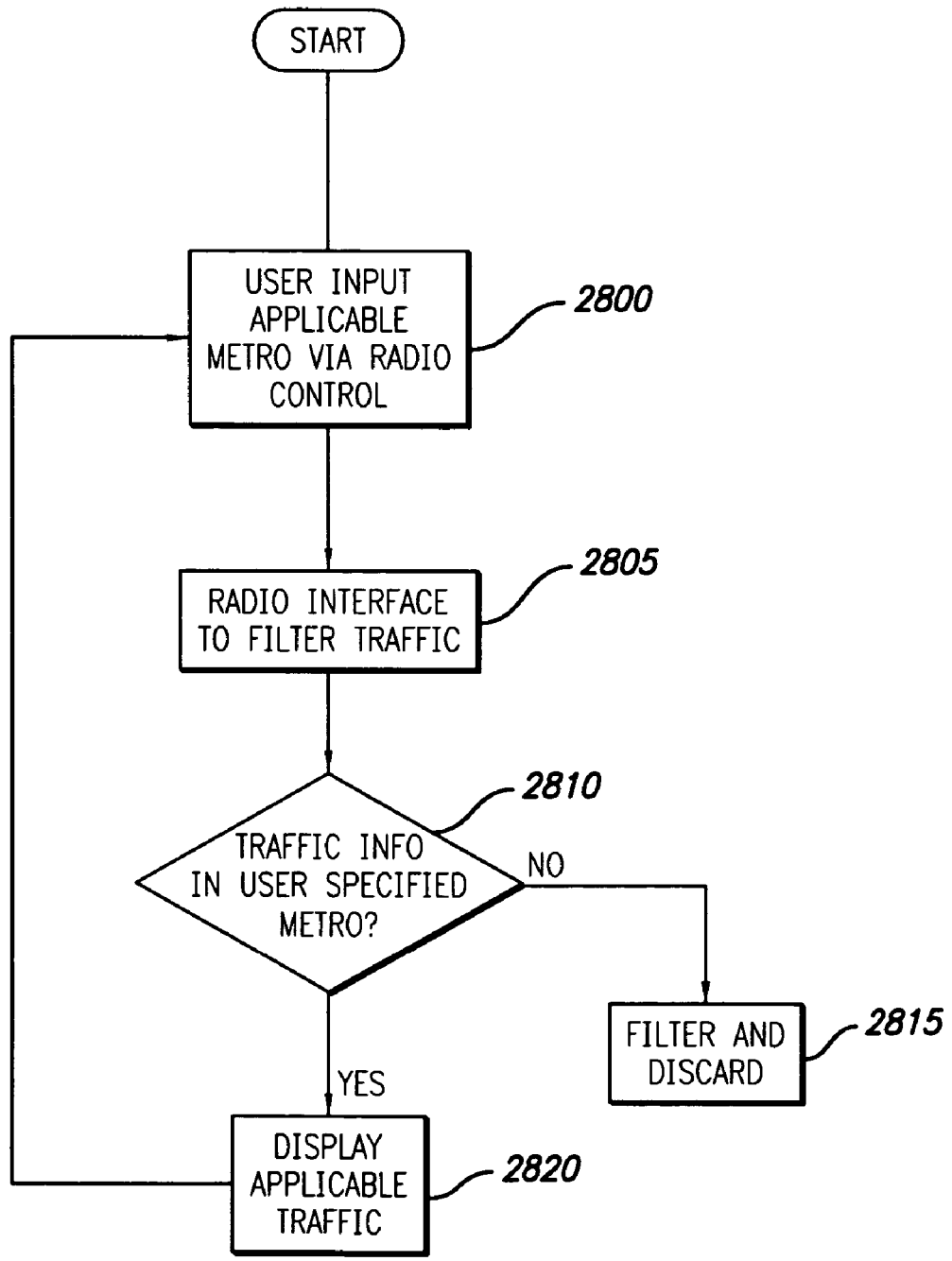
FIG. 28a is a flow diagram of an embodiment for manual filtering traffic information without the need of a position determination unit pursuant to aspects of the invention.

The above-described method for real time traffic filtering is for exemplary purposes only and the invention is not limited thereby. For example, FIG. 27 shows an embodiment that allows a user to manually enter its metro location via a menu on a radio of a vehicle 2712. As diagrammed in FIG. 28a, a method of FIG. 27 begins with a user inputting its applicable metro via a control on a radio at step 2800. At step 2805, the radio of the invention interfaces with broadcasted traffic information to filter the traffic information. At step 2810, the method determines whether a specific part of the broadcasted traffic information is in a user-specified metro. If the specific part of the broadcasted traffic information is in the user-specified metro, the method then displays (or calculates a route for the user via a navigation device) using the filtered traffic information at step 2820. However, if the specific part of the traffic information is not in the user-specified metro, then the specific part of the information is discarded at step 2815.

Figure 28B:
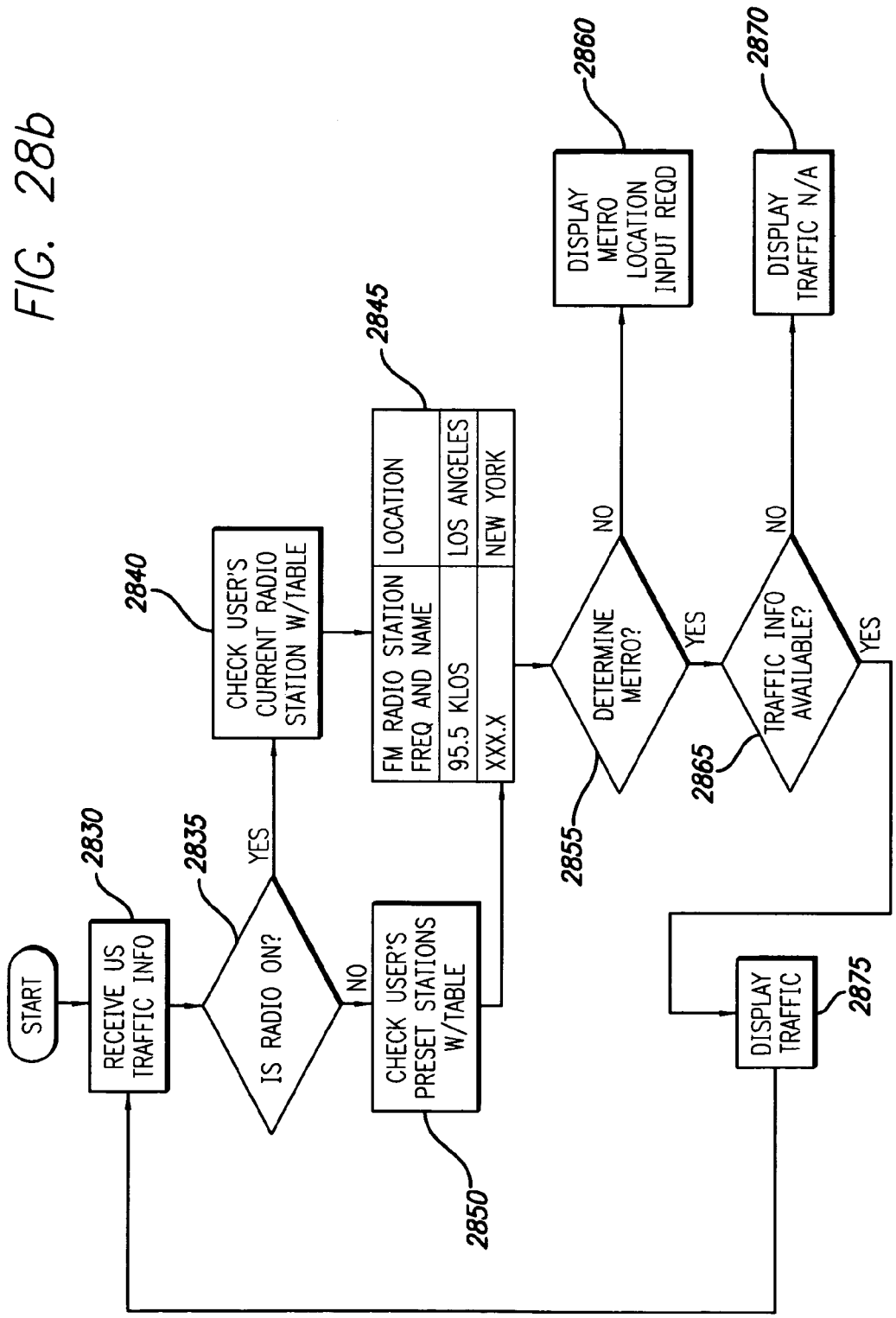
FIG. 28b is a flow diagram of an embodiment for automatic filtering traffic information without the need of a position determination unit pursuant to aspects of the invention.

FIG. 28*b* shows another embodiment of a method for filtering traffic information. This embodiment uses a user's FM radio station presets and/or radio station settings on a radio of a vehicle 2712 to automatically receive and/or filter applicable metro traffic information. As envisioned, the user can also have the option of inputting its specific location manually via the radio. More specifically, the method of FIG. 28*b* receives traffic information (e.g., U.S. traffic information) at step 2830. At step 2805, the method determines if a radio of the vehicle 2712 is powered on. If the radio is on, the method then checks the user's current radio station with a table or database 2845 to determine a location of the user's vehicle 2712 at step 2840. If the radio is not on, the method then checks the user's preset radio station with a table or database 2845 to determine a location of the user's vehicle 2712 at step 2850. At step 2855, the method determines whether it can use this automatically determined location to determine a metro. If the metro can not be determined from the automatically determined location, the method then requests the user to manually specify a metro at step 2860. If the automatically determined location can determine the metro, then the method determines if traffic information for the automatically determined metro is available at step 2865. If the traffic information for the automatically determined metro is not available, the method displays a "traffic information not applicable" indication to the user at step 2870. If the traffic information for the automatically determined metro is available, the method then displays (or calculates a route for the user via a navigation device) using the automatically filtered traffic information at step 2875.

Figure 29:
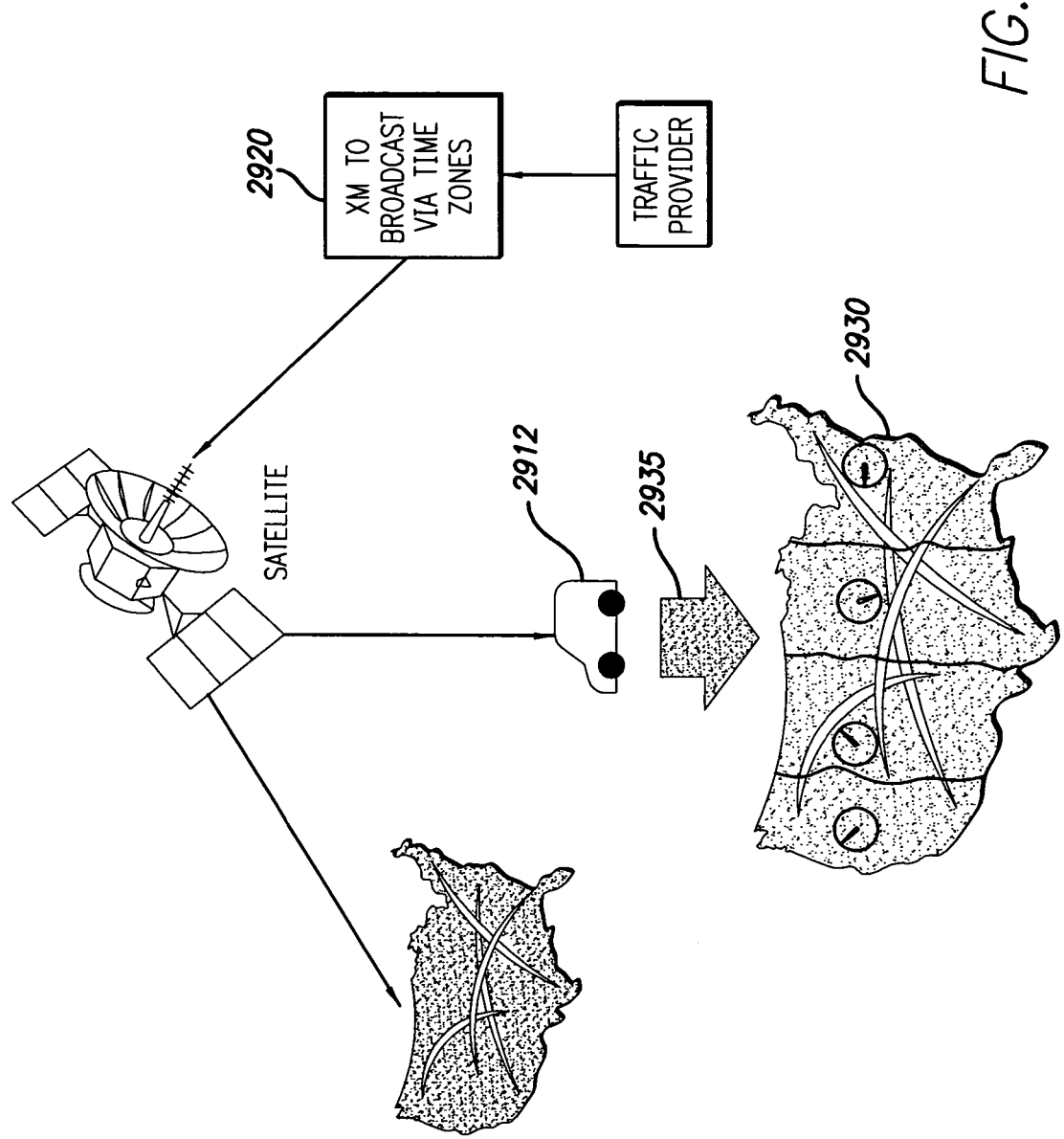
FIG. 29 is a schematic diagram of an another embodiment for filtering traffic information without the need of a position determination unit pursuant to aspects of the invention.

FIG. 29 shows an embodiment for allowing a vehicle 2912 to automatically update via an internal clock of the vehicle 2912 to determine which time zone the vehicle 2912 is in and filters traffic information for the vehicle via the determined time zone. The embodiment broadcasts traffic information based on time zones (e.g., Pacific Time Zone, Mountain Time Zone, Central Time Zone, and Eastern Time Zone) 2920 and the vehicle 2912 then filters 2935 out the non-matching time zone traffic information 2930.

Figure 30:
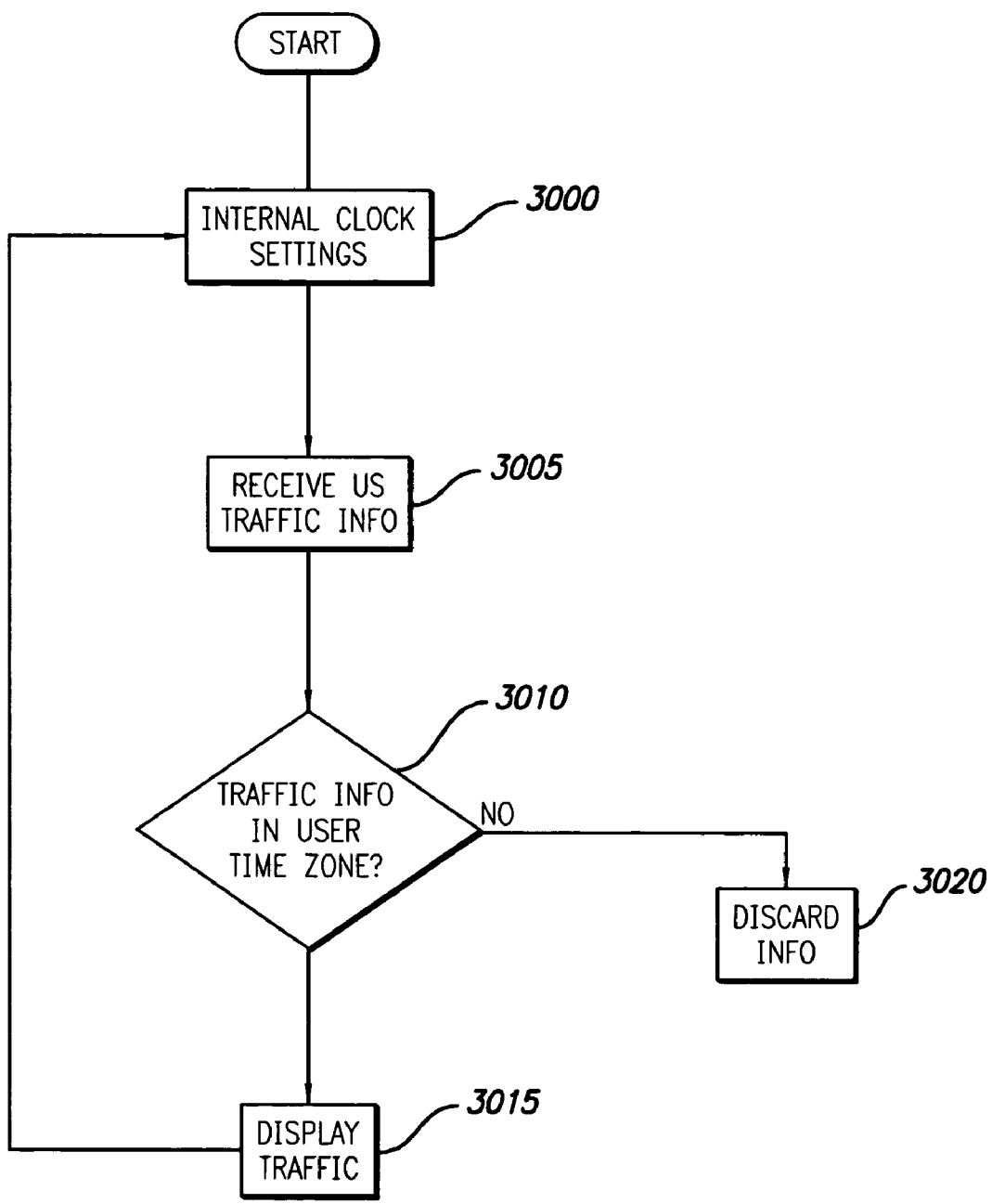
FIG. 30 is a flow diagram of an embodiment for filtering traffic information using time zones pursuant to aspects of the invention.

More particularly, the embodiment of FIG. 29 provides a method that automatically filters traffic information based on time zones, as diagrammed in FIG. 30. At step 3000, the method determines an internal clock setting of a vehicle 2912. At step 3005, the method receives traffic information (e.g., U.S. traffic information). At step 3010, the method determines whether a specific part of the received traffic information is in a user's or a vehicle's identified time zone. If the specific part of the received traffic information is in the vehicle's identified time zone, the method then displays (or calculates a route for the user via a navigation device) using the filtered traffic information at step 3015. However, if the specific part of the traffic information is not in the vehicle's identified time zone, then the specific part of the information is discarded at step 3020.

FIG. 31*b* shows an embodiment of a display system that displays traffic flow information 3100 and incident icons 3110 in the direction that a user is traveling. In addition, the system only displays the roadways or freeways 3115 that the user would be driving on (i.e., if a vehicle is heading south, no northbound freeways will be displayed by the display system). The above-described display systems allows the present display system to convey information to a user in a clear, concise, and understandable manner without inundating the user with redundant, useless, and/or superfluous information as compared with the embodiment shown in FIG. 31*a*.

FIGS. 32*a* and 32*b* show an embodiment of a display system that allows a user to use a cursor 3230 of a navigation device so that the user can click on an actual roadway or freeway to get traffic flow information (and/or traffic incident information) 3200 on the roadway or freeway.

Figure 33:
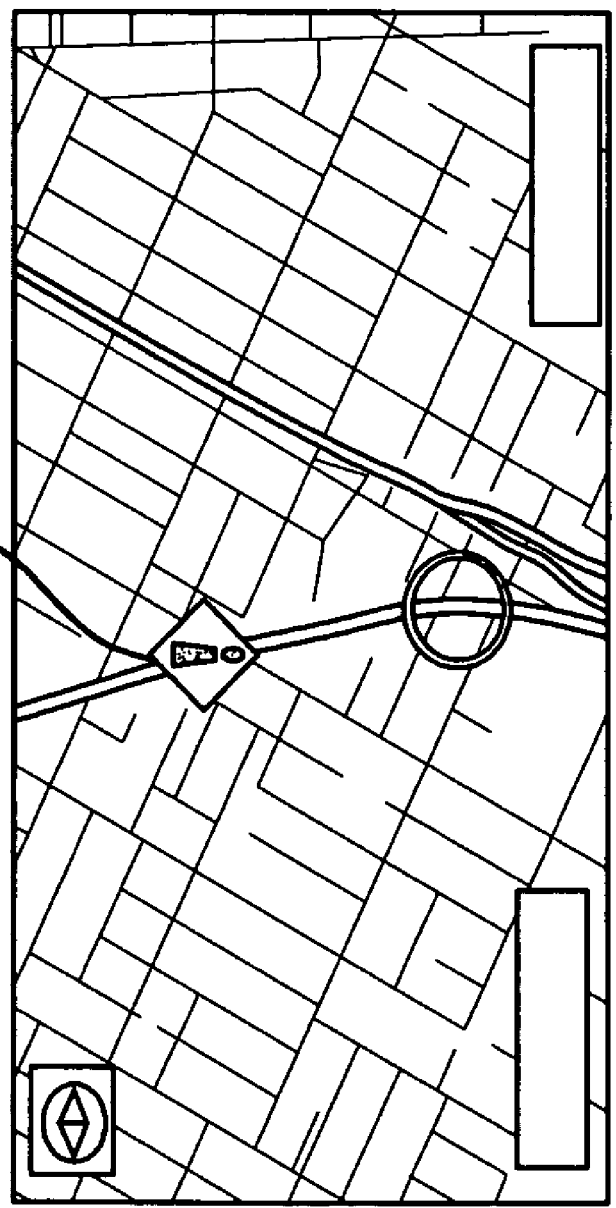
FIG. 33 illustrates another embodiment of a display system having traffic flow information and traffic incident information pursuant to aspects of the invention.

FIG. 33 shows an embodiment of a display system that, when a navigation device is providing a route guidance for a user, the display system of the navigation device provides a display icon 3310 on a road segment so the user can visually see an upcoming incident. In addition, the display system can also provides a turn-by-turn guidance display as shown in the following chart.

| Route | Miles | Time | Incidents on route |
| --- | --- | --- | --- |
| 60 East | 3 | 15 min | ◆ |
| 710 South | 8 | 35 min | ◆ ◆ |
| 105 West | 15 | 16 min | |
| 405 North | 10 | 45 min | ◆ |

Those skilled in the art will appreciate that the above display systems for reducing non-essential traffic information alleviate problems associated with driver distractions. It should be appreciated that the above-described mechanisms and processes for displaying traffic information are for exemplary purposes only and the invention is not limited thereby.

FIG. 34 shows a window 3400 for displaying traffic information on a travel route 3405. The window 3400 is utilized by a navigation device (e.g., 14 in FIG. 1*a*) after the navigation device detects a traffic incident on a route ahead. The navigation device displays the traffic incident details in the window 3400. The window 3400 appears or pops up on an output unit (e.g., 21 in FIG. 1*a*) of the navigation device that is displaying a map 3410 of the route ahead 3405. The window 3400 informs a user of the navigation device of the traffic condition ahead. For example, the pop-up window 3400 informs the user of a location of the incident, distance from a current location of the user, incident details, and/or possible effects on the route calculated by the navigation device. The navigation device should also provide an option 3415 to the user for requesting a new route that avoids the traffic incident. In addition, the navigation device should include an option 3420 to keep the current route, an option 3422 to allow the user to read the incident details, an option 3430 to go to the next traffic incident information, and/or an option 3425 to display all details received for an incident.

More specifically, the embodiment of FIG. 34 provides a method, as diagrammed in FIG. 35. At step 3500, the method calculates a route to a destination. At step 3505, the method receives traffic information (e.g., U.S. traffic information). At step 3510, the method determines whether the received traffic information is referring to roads on the calculated route to the destination. If the received traffic information is not referring to the roads on the calculated route, the method moves back to step 3505. If the received traffic information is referring to the roads on the calculated route, the method displays or shows the traffic information to a user via a map 3410 of the route and a pop-up window 3400 at step 3515. At step 3520, the method determines whether to calculate a new route for the destination to avoid a traffic incident reported using the received traffic information. If the new route is to be calculated, the method moves to step 3500 to calculate the new route to the destination.

An embodiment of the invention reduces the bandwidth requirement for broadcasting traffic information by utilizing a method that does not broadcast free-flow traffic information. Thus, a user of this embodiment only receives traffic information regarding known conditions affecting traffic or only sees traffic information when there is a traffic problem. More specifically, FIG. 36b shows an embodiment of a display system that displays only traffic information indicating traffic problems and does not show free-flow traffic icons on the display system, as compared with the embodiment shown in FIG. 36a.

Figure 37:
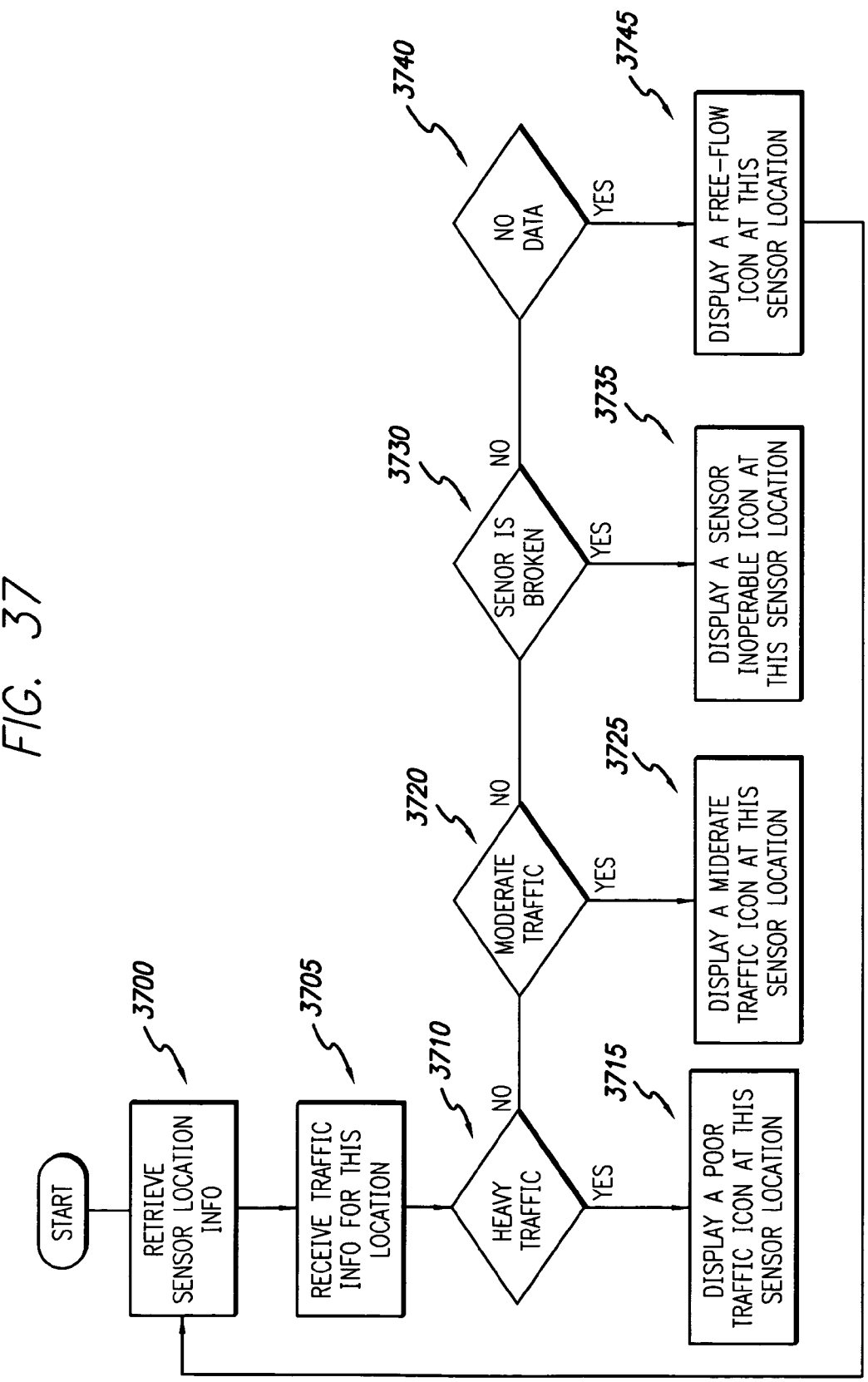
FIG. 37 is a flow diagram of an embodiment for showing a free-flow icon when no data is received on a particular traffic information sensor pursuant to aspects of the invention.

The above-described embodiment for simplifying a display is for exemplary purposes only and the invention is not limited thereby. For example, FIG. 37 shows an alternate embodiment that uses a method that shows free-flow traffic icons by storing the locations of the flow sensors on another medium and cross-referencing with broadcast traffic information data. If no information is received regarding a particular sensor location, the method assumes free-flowing traffic and indicates that particular location with a free-flow icon. More specifically, at step 3700, the method retrieves sensor location information for a sensor. At step 3705, the method receives traffic information associated with the location of the sensor or traffic information from the senor. At step 3710, the method determines whether the received traffic information has data indicating heavy traffic for the location. If the traffic information has data indicating the heavy traffic, the method displays a poor traffic icon at the location of the sensor at step 3715. At step 3720, the method determines whether the received traffic information has data indicating moderate traffic for the location. If the traffic information has data indicating moderate traffic, the method displays a moderate traffic icon at the location of the sensor at step 3725. At step 3730, the method determines whether the received traffic information has data indicating that the sensor is broken. If the traffic information has data indicating that the sensor is broken, the method displays a sensor inoperable icon at the location of the sensor at step 3735. At step 3740, the method determines whether the received traffic information has no data at all. If the traffic information has no data, the method displays a free-flow traffic icon at the location of the sensor at step 3745. Those skilled in the art will appreciate that the above method broadcasts data for indicating broken sensors.

Figure 38:
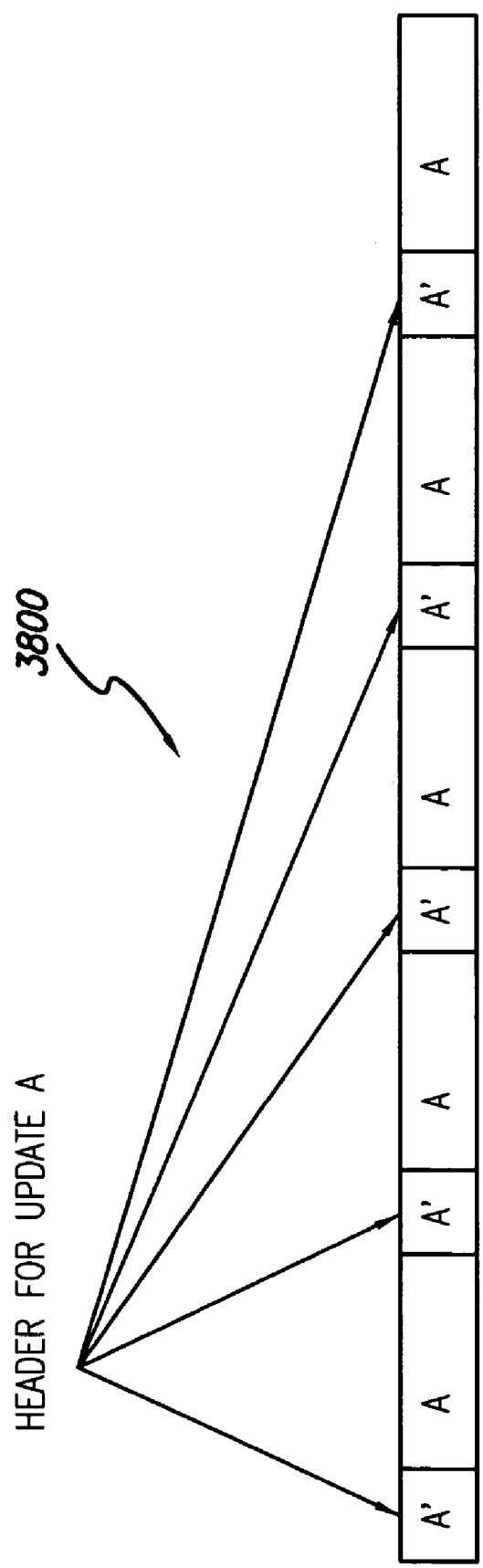
FIG. 38 is a schematic diagram of an embodiment for adding a header pursuant to aspects of the invention.
Figure 39:
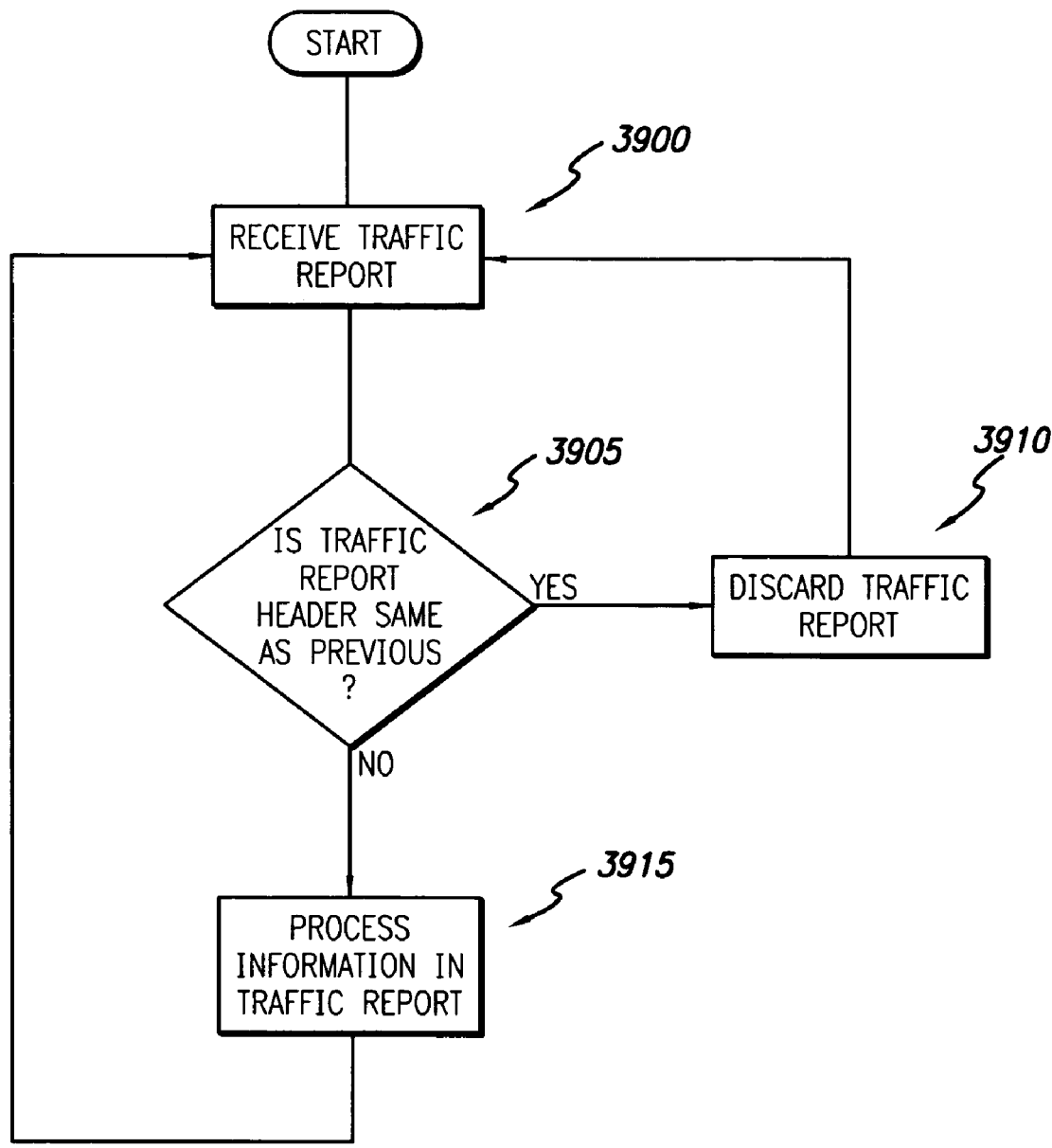
FIG. 39 is a flow diagram of an embodiment for adding a header and utilizing the header pursuant to aspects of the invention.

In general, a traffic information report (i.e., a complete national traffic report) is updated at every five (5) minute intervals but broadcast of the traffic information report can occur at a faster cycle (e.g., every minute). FIG. 38 shows an embodiment that adds a header 3800 to each traffic information report pursuant to aspects of the invention. The header 3800 allows the embodiment to skip or filter broadcast reports that the embodiment has already processed. More specifically, the embodiment of FIG. 38 provides a method for adding a header to allow a navigation device to read only updated traffic information in order to reduce a processing requirement of the navigation device, as diagrammed in FIG. 39. At step 3900, a navigation device (e.g., the navigation device 14 shown in FIG. 1a) receives a traffic report. At step 3905, the navigation device determines if the header of the received traffic report is the same as a previously received header. If the header is the same as the previously received header, the traffic report is discarded at step 3910. If the header is not the same as the previously received header, the navigation device processes the received traffic report at step 3915. It should be appreciated that the above-described mechanisms and process for adding a header to a traffic report are for exemplary purposes only and that the invention is not limited thereby.

Figure 40:
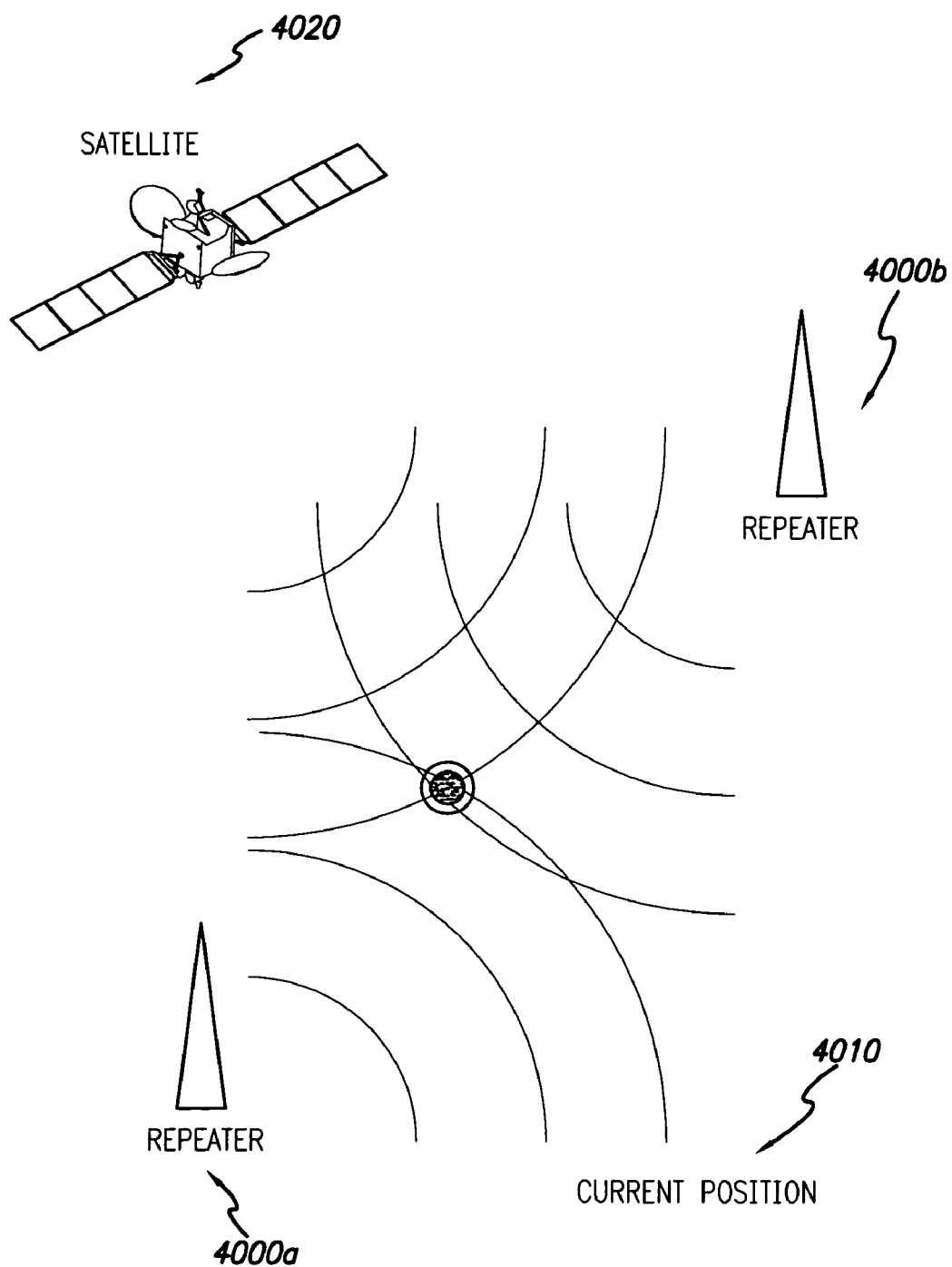
FIGS. 40 and 42 are schematic diagrams of an embodiment for using triangulation of a plurality of repeaters to determine a position and for using the determined position to filter traffic information pursuant to aspects of the invention.
Figure 41:
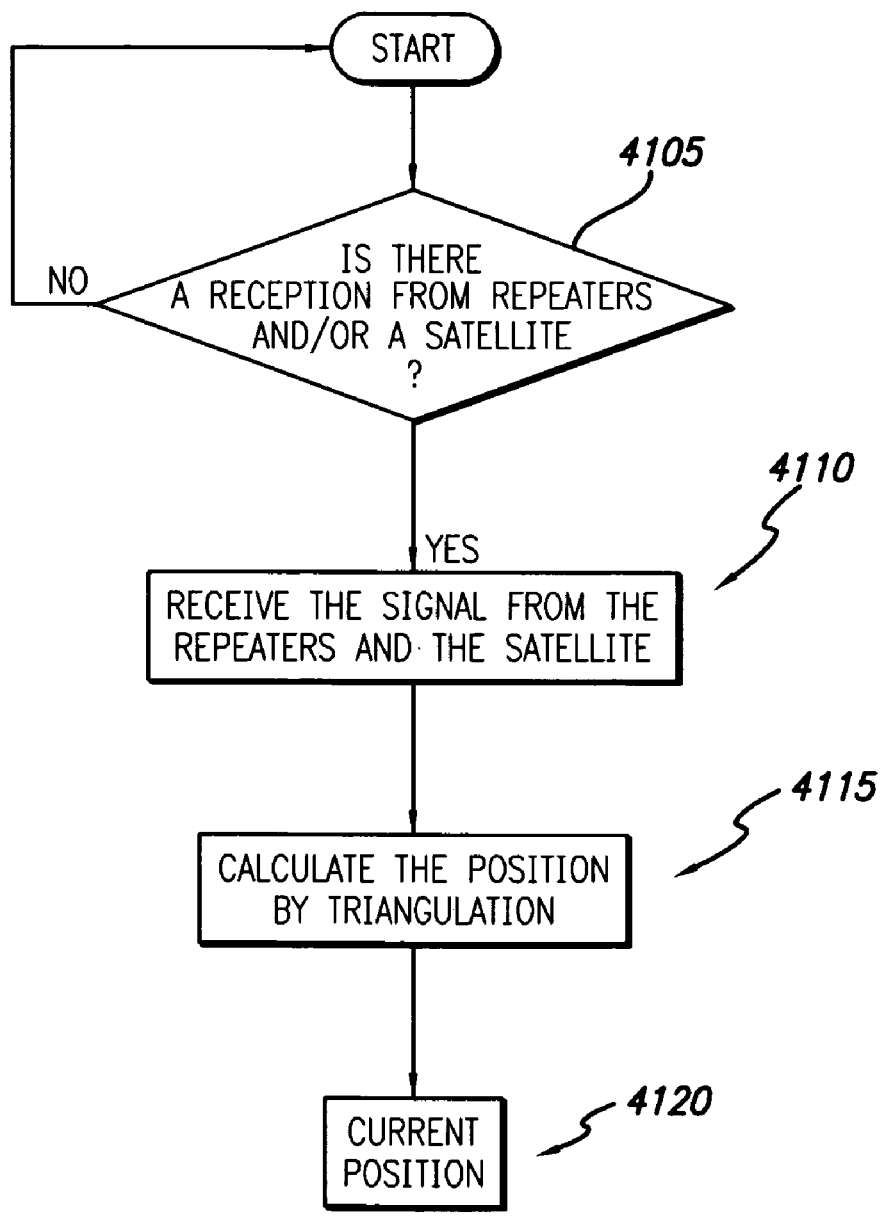
FIGS. 41 and 43 are flow diagrams of an embodiment for using triangulation to determine a position and for using the determined position to filter traffic information pursuant to aspects of the invention.

In general, when a traffic supplier via a one-to-many network broadcasts traffic information (e.g., U.S. traffic information), a navigation device needs to filter the broadcasted information down to information relating to a specific location of the device or the device would have to receive and process non-related or useless traffic information. FIG. 40 shows an embodiment of a navigation device that uses triangulation of repeaters 4000a, 4000b to determine a specific location or position 4010 of the navigation device. In this embodiment, it should be appreciated that the navigation device does not need a GPS navigation system to determine location. More specifically, the embodiment of FIG. 40 provides a method for filtering of traffic information through triangulation of repeaters 4000a, 4000b to determine a specific location, as diagrammed in FIG. 41. At step 4105, the method determines whether there is a reception from repeaters 4000a, 4000a. In addition, the method may determine whether there is a reception from a satellite 4020. If there is (or are) the necessary reception(s), the method receives a signal or signals from each of the repeaters 4000a, 4000b and/or the satellite 4020 at step 4110. The method then calculates a current position 4010 (e.g., a current position of a vehicle) by triangulation at step 4115 and determines the current position 4010 at step 4120.

Figure 42:
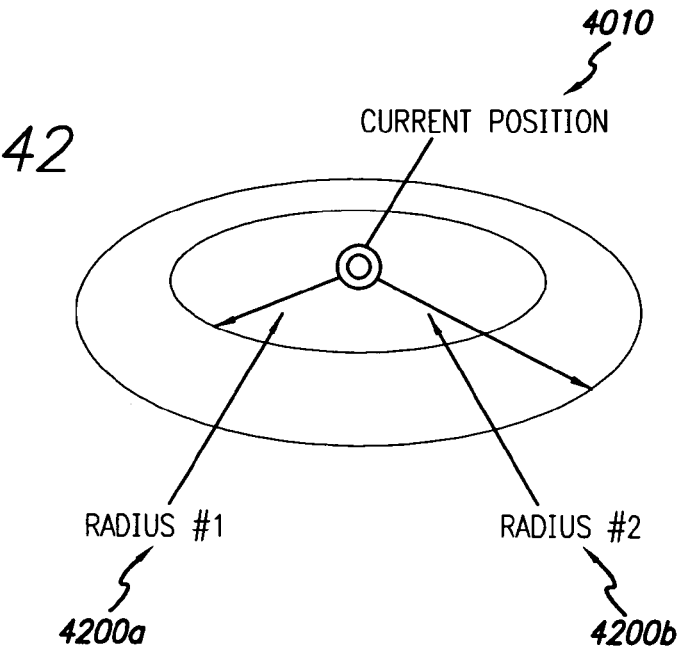
Figure 43:
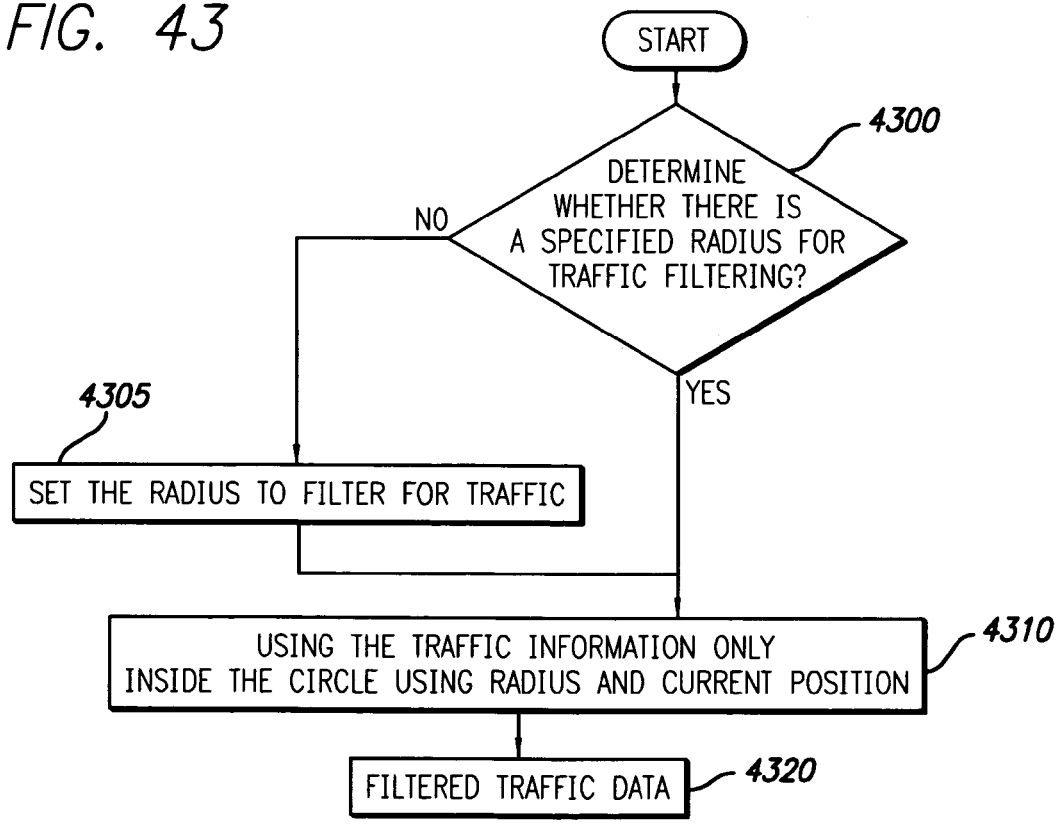

Once the current position has been determined, the method can then filter traffic information as described in the embodiment shown in FIG. 42. That is, the embodiment may filter the traffic information down to first radius 4200a and/or a second radius 4200b of a determined current position 4010. The first radius 4200a and/or second radius 4200b can be a five, ten, twenty, and/or thirty mile radius of the current position 4010. More specifically, the embodiment of FIG. 42 provides a method for filtering of traffic information, as diagrammed in FIG. 43. At step 4300, the method determines whether there is a specific radius 4200a, 4200b for traffic filtering. If there is the specific radius 4200a, 4200b, the method uses the traffic information only inside the parameter of the specific radius 4200a, 4200b to filter traffic information at steps 4310 and 4320. If there is no specific radius, the method sets a radius 4200a, 4200b to filter at step 4305 and then moves to steps 4310 and 4320.

Figure 44:
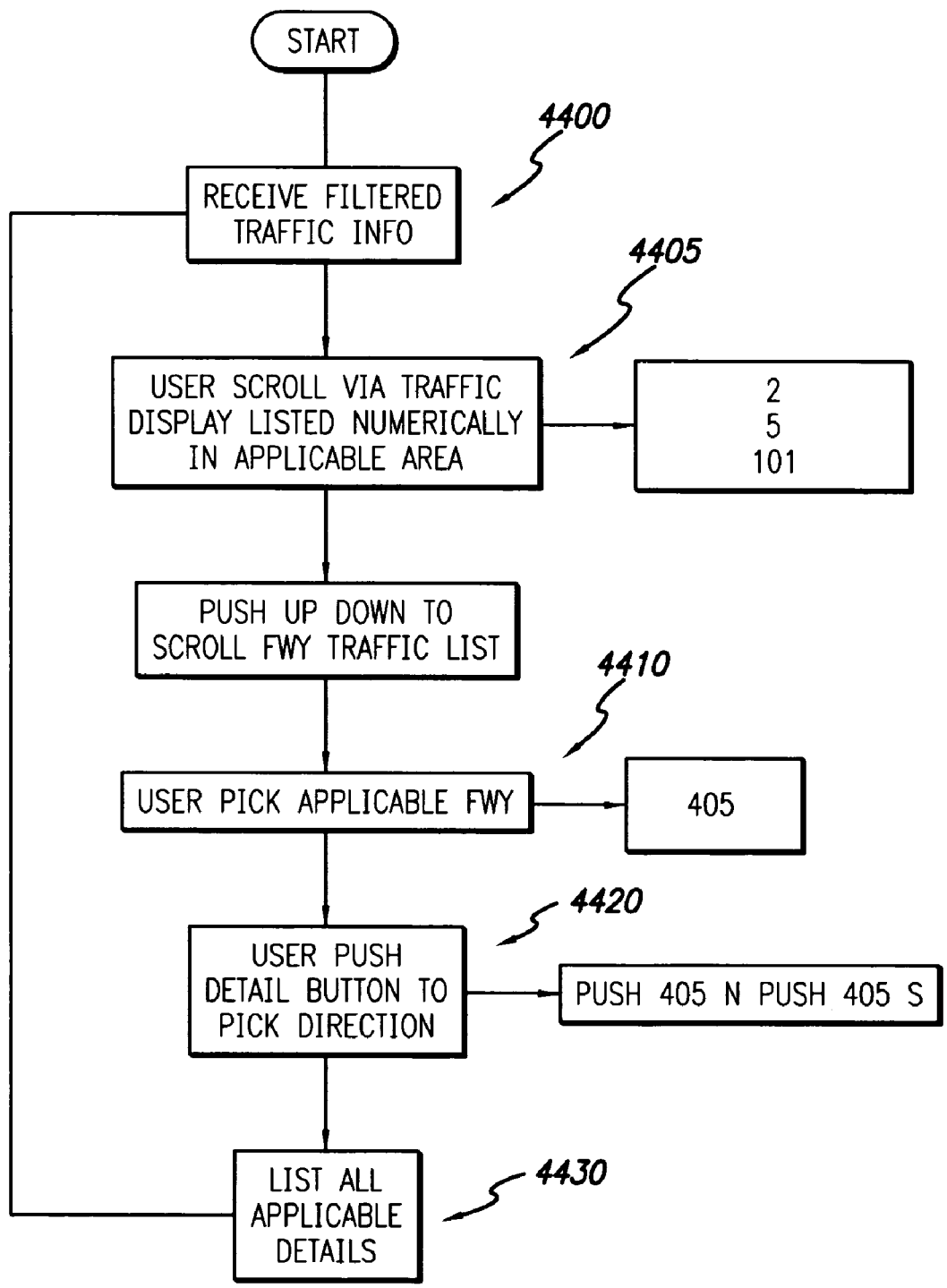
FIG. 44 is a flow diagram of an embodiment for allowing a user to scroll to a needed traffic information pursuant to aspects of the invention.

FIG. 44 shows an embodiment of a method that requires a user to scroll to the needed traffic information in order to reduce display distractions. Specifically, at step 4400, a navigation device (e.g., a navigation device having no GPS) receives filtered traffic information. At step 4405, a user of the navigation device scrolls down a traffic display of the navigation device to select an applicable area (e.g., an applicable freeway). At step 4410, the user selects or picks the applicable area (e.g., the applicable freeway). At step 4420, the user pushes a detail button (e.g., 3425 shown in FIG. 34) on the navigation device and the navigation device list all applicable details of the applicable area at step 4430.

Figure 45:
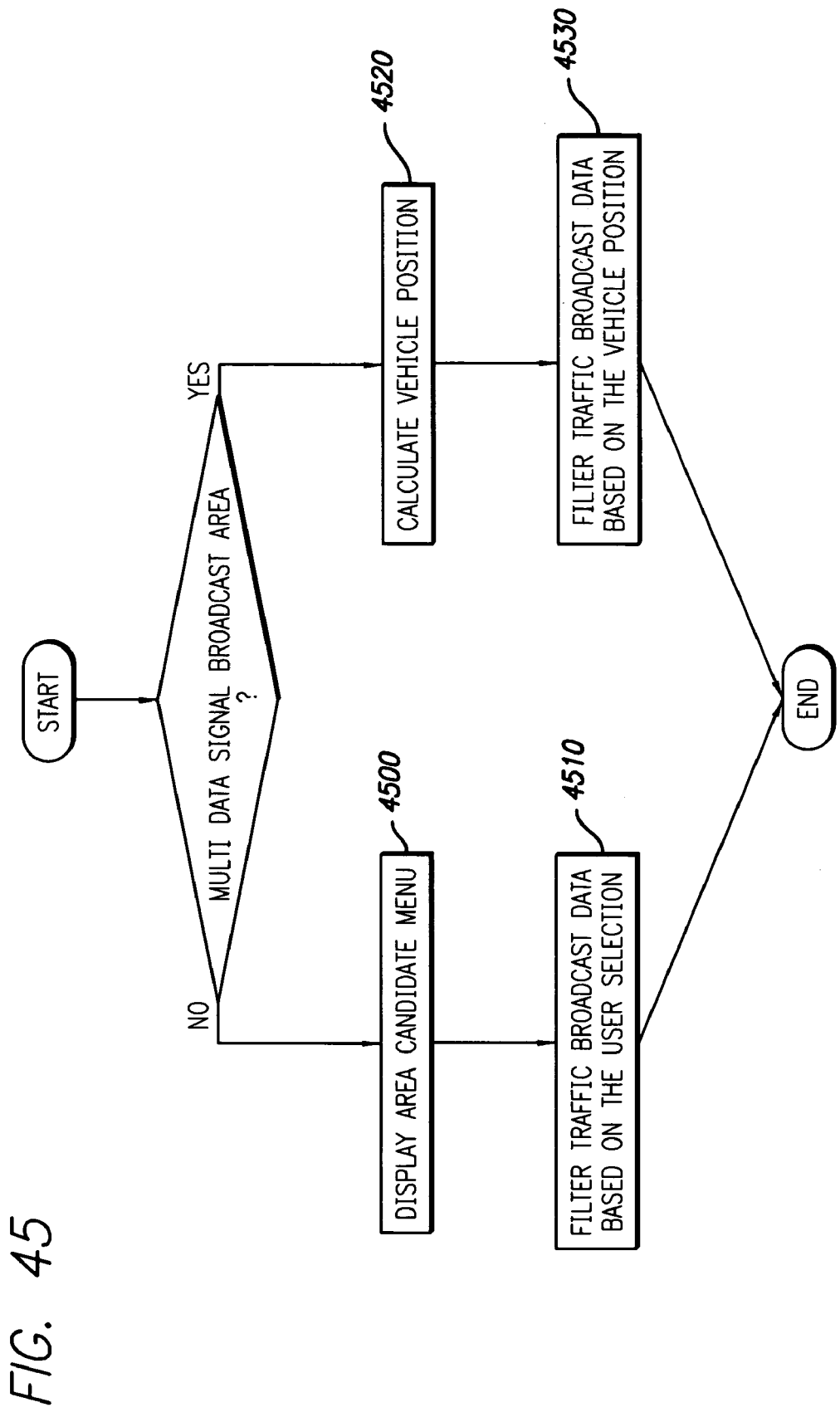
FIG. 45 is a flow diagram of an embodiment for filtering traffic information based on a plurality of parameters entered by a user pursuant to aspects of the invention.

As envisioned, an embodiment of the invention uses four parameters to define specific traffic information for a user in a vehicle. The four parameters are a user's state, metro, county, and city. FIG. 45 shows a method of the present embodiment that determines and filters traffic information for the user based on the four parameters. At step 4520, when a navigation device is in a range of a multiple source data broadcast area, the navigation device calculates approximate position from the delay of the multiple source broadcast signal(s) (e.g., via repeaters 4000b, 4000c in FIG. 40). The navigation device then displays (or filters) traffic information of the determined current position (e.g., 4010 in FIGS. 40, 42) of the vehicle at step 4530. However, if the vehicle is out of the range of the multiple source broadcast signal area (i.e., the navigation device can not calculate the current position) then the navigation device displays a candidate area menu to the user at step 4500. At step 4510, the user then selects one or more of the four parameters described above until a desired traffic broadcast information signal is obtained (or filtered). In addition, each broadcasted traffic information of an embodiment may include a header written such that it allows the navigation device to extract information associated with the four parameters. It should be appreciated the addition of the header allows the navigation device to filter out traffic information having headers (e.g., with parameters) not specified by the user. Moreover, if the location information is successfully provided to the user, an embodiment of the invention reduces location header information until the user specifies other parameters so that the provision of redundant header information can be reduced.

Figure 46:
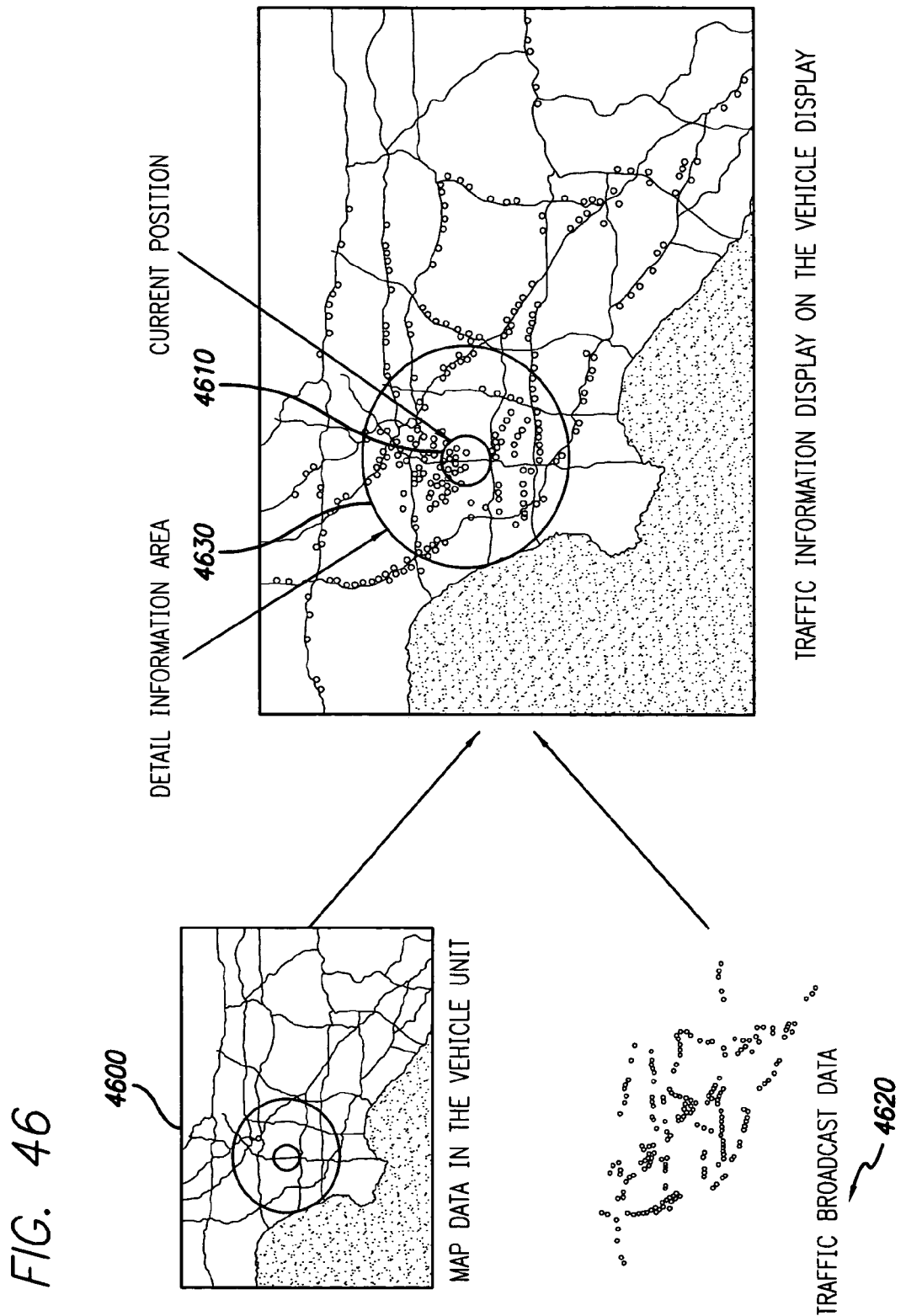
FIG. 46 is a schematic diagram of an embodiment for reducing the broadcast of redundant and/or static traffic information pursuant to aspects of the invention.

FIG. 46 shows an embodiment of a broadcast methodology that reduces the broadcasting of redundant traffic information. More specifically, a navigation device of the embodiment includes a static map 4600 of a metro or a city. A traffic supplier (and/or a remote location) of the embodiment only broadcasts traffic information data 4620 having traffic speed graphic data and a map number. The embodiment does not have to broadcast the static map 4600. In addition, the navigation device includes a filter that displays detailed traffic flow data 4630 around a current position 4610 (e.g., determined via embodiments of FIGS. 40 and 42) on the map 4600 and displays less traffic flow data far from the current position 4600. The current position can be determined by a GPS navigation system. In addition, the increasing traffic-jam portion of the traffic information should have top priority for display in the embodiment and the reducing traffic-jam portion of the traffic information should disappear from the display of the navigation device faster than other traffic jam information in the embodiment. It should be appreciated that the embodiment of FIG. 46 allows a driver to focus on the important information and reduces the amount of driver distractions.

Figure 47:
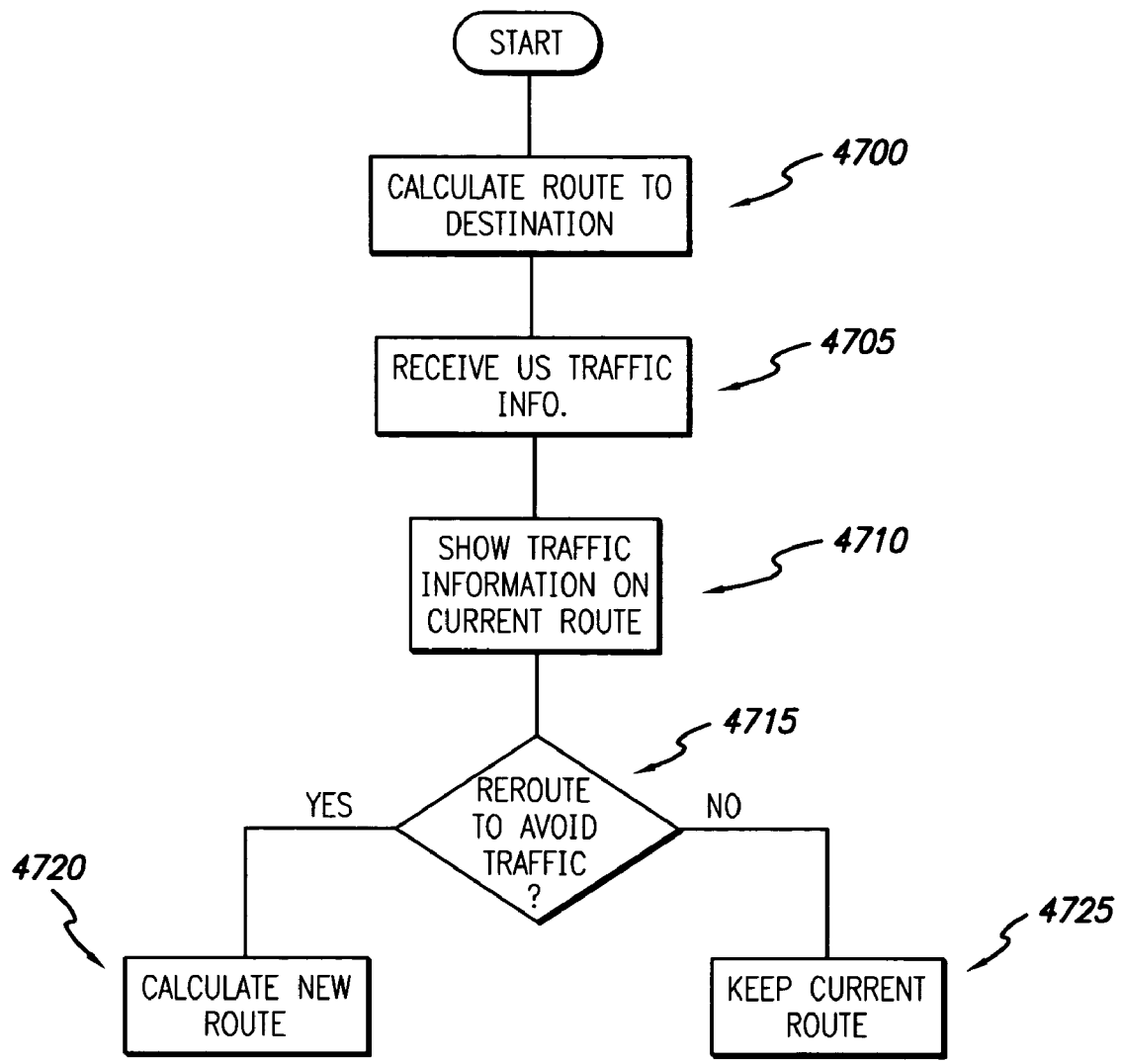
FIG. 47 is a flow diagram of an embodiment that provide an option for a user to avoid a traffic incident and/or congestion pursuant to aspects of the invention.

As envisioned in an embodiment of the invention, a user may travel on a route and receive traffic information about a traffic incident and/or a traffic congestion ahead of the route. If the user is unfamiliar with the area of the route, a user may not know how to avoid the traffic incident and/or congestion. FIG. 47 shows an embodiment of a method that provides an option for a user of a navigation device (e.g., 14 in FIG. 1a) to request a calculation of a new route that will avoid the traffic incident and/or the congestion.

At step 4700 of FIG. 47, the method calculates a route to a destination. At step 4705, the method receives traffic information (e.g., U.S. traffic information). At step 4710, the method displays or shows to a user the traffic information on the current calculated route to the destination. At step 4715, the method determines whether to calculate a new route (or reroute) for the user so that the user can avoid the traffic shown by the traffic information. If the new route is to be calculated, the method calculates the new route at step 4720. If the new route is not to be calculated, the method moves to step 4725 and keeps the current calculated route.

Alternatively, in a case where a user is familiar with the area of the route and goes off-route to avoid the traffic incident and/or congestion, an embodiment of a navigation device of the invention calculates a new route (or recalculate a new route) that avoids the traffic incident and/or the congestion after the user goes off-route. It should be appreciated that this embodiment increases the convenience of the user by providing a recalculation function (e.g., anticipating a user mistake) based on traffic information.

To avoid zigzag routing during a reroute function, an embodiment of the invention provides a method to limit the reroute onto an existing route to avoid zigzagging. More specifically, FIG. 48b shows an embodiment of the invention that considers factors, such as a vehicle's position, speed, heading, destination, incident severity, time of reported traffic information, and/or estimated time for a traffic to clear, to calculate an optimized route 4810. In addition, the embodiment pursuant to aspects of the invention limits the new optimized route 4810 to no more than two reroutes back to an existing route 4800 within a predetermined distance. This embodiment reduces zigzigging effect of recalculating and returning to the existing route as compared with the embodiment shown in FIG. 48a.

Figure 49:
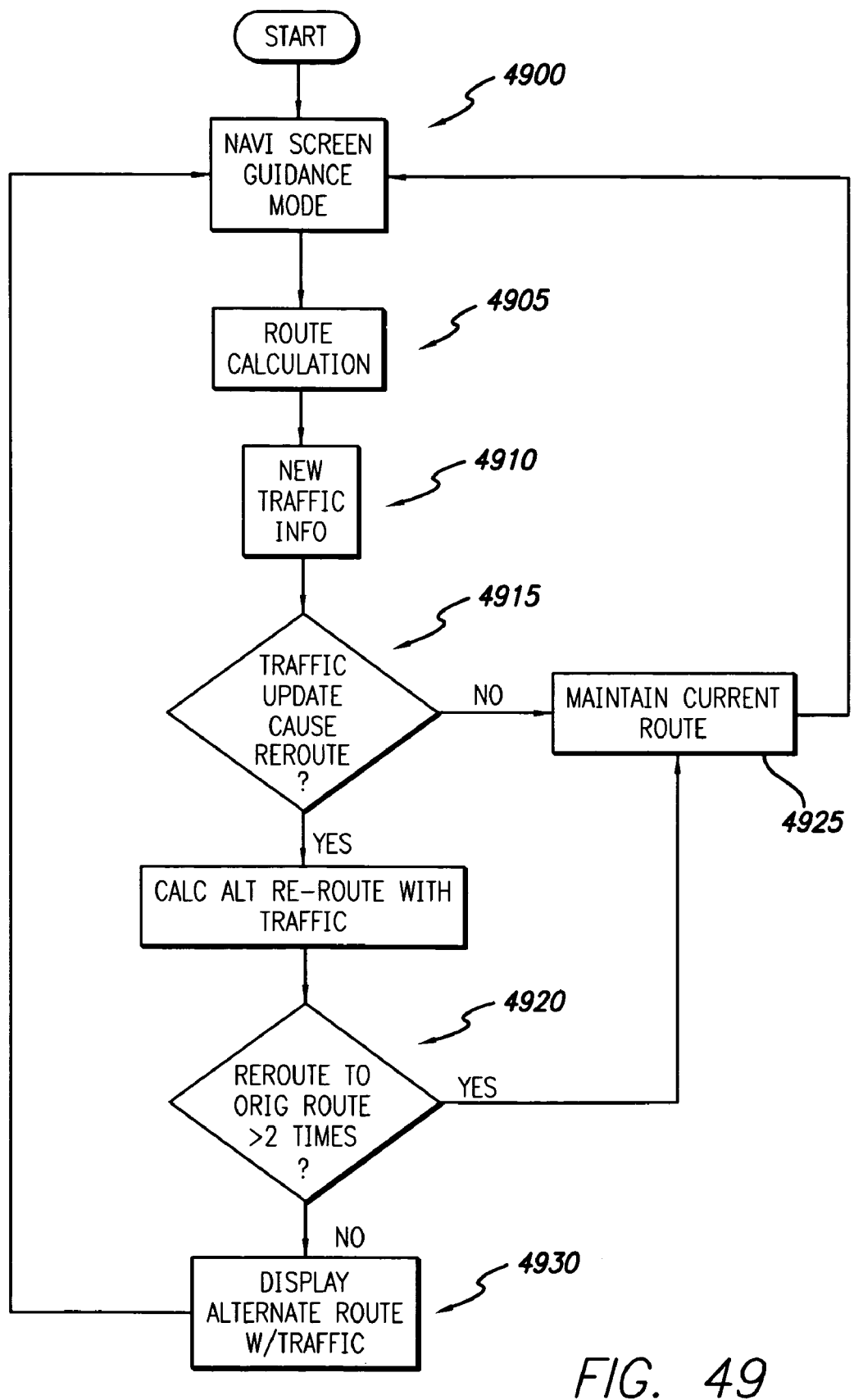
FIG. 49 is a flow diagram of an embodiment that reduces zigzagging pursuant to aspects of the invention.

FIG. 49 shows a method of the embodiment of FIG. 48b that reduces a zigzagging effect. At step 4900, a navigation device is set at a route guidance mode. At step 4905, the navigation device calculate an existing route 4800. At step 4910, the navigation device receives new traffic information. At step 4915, the navigation device determines whether to reroute a user of the navigation to a new route 4810. If the navigation device calculates the new route 4810 with the new traffic information, the new route 4810 is compared with the existing route 4800 to determine whether the new route 4810 has been rerouted back to the existing route 4800 for more than two times at step 4920. If the route 4810 has been rerouted more than twice back to the existing route 4800, the method moves back to 4925 and maintains the existing route 4800 for the user. If the route 4810 has not been rerouted more than twice back to the existing route 4800, the navigation device displays the new alternative route calculated with the traffic information at step 4930.

Embodiments of the invention use a routing algorithm having a cost function that takes into account road speed, distance, road class, and/or other factors to calculate the cost of taking a certain route (or road) to a destination. Traffic information wherever available can also be used by the routing algorithm to calculate the cost of a road link when finding the best route. An easy method for a routing algorithm to calculate a good route using traffic information is to translate traffic information into an appropriate speed and then substitute this speed into the cost function.

In certain embodiments, some traffic information is already transmitted with a speed value that can be directly substituted into the cost function. However, depending on the location of the traffic information and the lifetime of a specific piece of traffic information, it might not be a good idea to directly substitute the speed into the cost function. For example, there may be a fatal accident reported close to San Francisco that has reduced the speed of a major road in San Francisco down to zero (0) mph and at the point of leaving Los Angeles to San Francisco, it usually does not make sense to substitute that speed (i.e., 0 mph) in San Francisco into the cost function to cause the routing algorithm to avoid that road in San Francisco because by the time that the accident location is reached it is very likely that the incident will be cleared. Accordingly, an embodiment of the invention modulates the speed calculated from traffic information to take into account the location of traffic information and/or its expected expiration time.

Figure 50:
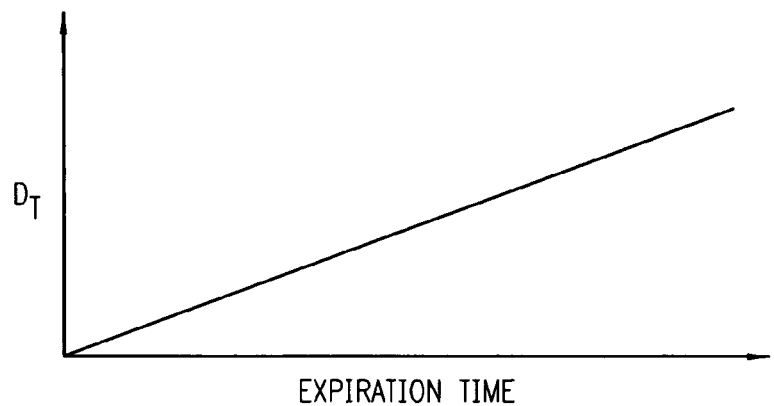
FIGS. 50, 51, 52, 53a, and 53b illustrate embodiments for calculating and utilizing a distance threshold that provides a distance value at which it is likely that a traffic problem location that exists past this distance value from a current location of a vehicle will expire before the vehicle can reach the problem location pursuant to aspects of the inventions.

FIG. 50 shows an embodiment of the invention that provides a method for calculating a distance threshold ($D_T$). The distance threshold ($D_T$), specifies a distance value at which it is likely that traffic information (i.e., a problem location) that exists past this distance value from a current location of a vehicle will expire before the vehicle can reach the traffic problem (i.e., the location reported by the traffic information). In this embodiment, an expiration time should be assigned to each piece of traffic information. This expiration time can be calculated based on historical data for similar types of incidents in similar types of road conditions. As is shown in FIG. 50, the threshold distance ($D_T$) should be calculated such that it increases as the expiration time increases.

Figure 51:
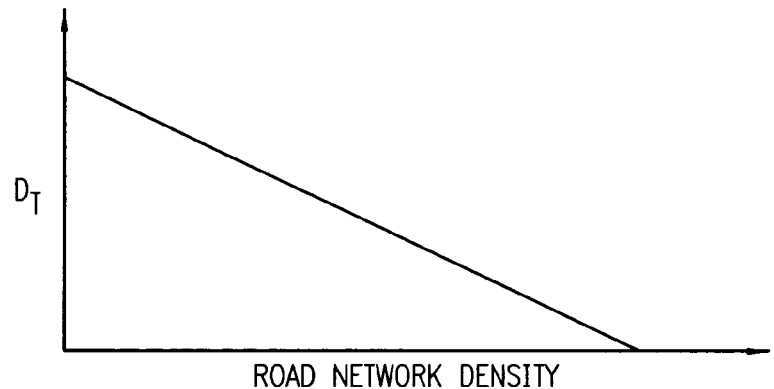

FIG. 51 shows an alternate embodiment that provides a method for determining the distance threshold ($D_T$) based on the density of the road network (e.g., the road network is more dense in city areas than in rural areas). The distance threshold ($D_T$) is determined such that it decreases as the road network becomes more dense.

Figure 52:
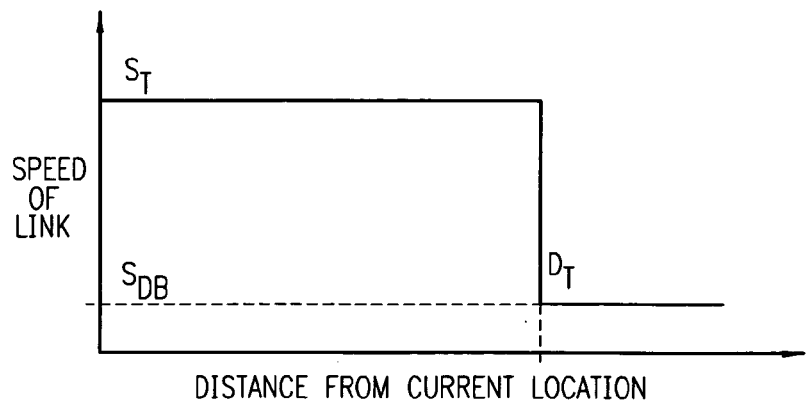
Figure 53A:
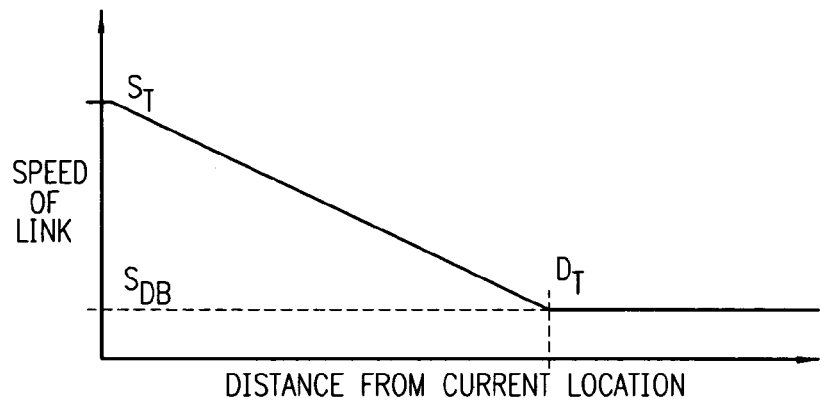
Figure 53B:
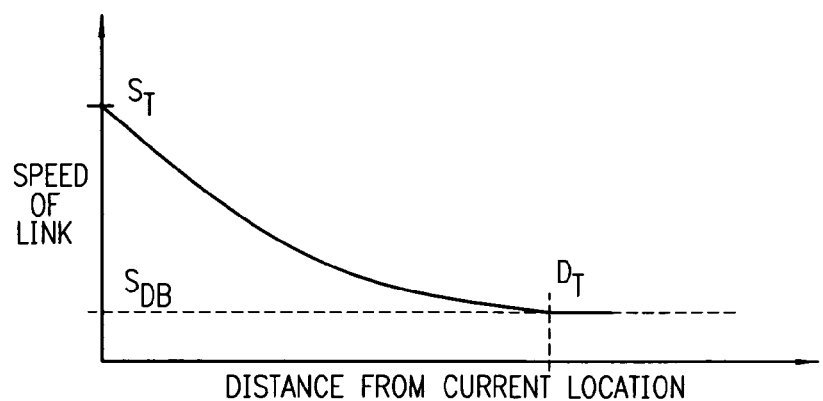

FIG. 52 shows another embodiment of the invention that provides a method for calculating a speed of a link for a route calculation using a distance threshold ($D_T$) from a current vehicle position to the location of the traffic information. For any traffic information that is located within the distance threshold ($D_T$), the speed specified by the traffic information ($S_T$), should be used. Otherwise, if the traffic information lies outside of the threshold distance then the speed included in the onboard database ($S_{DB}$) should be used for route calculation purposes.

A further embodiment of the invention provides a method in which the speed of a link used by the routing algorithm is calculated by taking into account both the dynamic speed from real-time traffic information ($S_T$) and the static speed stored in a map database ($S_{DB}$). Traffic information that is located far away from the vehicle's current position should have less effect on routing than information that is close to the vehicle. One way to do this is to calculate the speed of the link as shown FIG. 52a or 52b. That is, as shown by the linear process of FIG. 52a and the non-linear process of 52b, for traffic information located very close to the current location, the speed from the live traffic information ($S_T$) is used for the link. However, as the location traffic information approaches some threshold distance ($D_T$), the speed of the link should be calculated such that it asymptotically approaches the value of the speed in the database ($S_{DB}$).

It should be appreciated that the above-described mechanisms and process for using a distance threshold ($D_T$), a dynamic speed from real-time traffic information ($S_T$), and a static speed stored in a map database ($S_{DB}$) are for exemplary purposes only and that the invention is not limited thereby.

Having thus described a preferred embodiment of a method and system for traffic management between a vehicle and a remote location, it should be apparent to those skilled in the art that certain advantages of the within system have been achieved. It should also be appreciated that various modifications, adaptations, and alternative embodiments thereof may be made within the scope and spirit of the present invention. For example, the use of broadcast communication networks has been illustrated, but it should be apparent that many of the inventive concepts described above would be equally applicable to the use of other non-broadcast communication networks.

What is claimed is:

1. A method for improving the accuracy of traffic information provided to a navigation device within a vehicle, the vehicle traveling along a road having a plurality of speed sensors that each provide traffic flow information to a traffic information supplier, the method comprising:

(a) receiving location data and speed data from the navigation device;
(b) broadcasting the location data and speed data received in said step (a) to the traffic information supplier;
(c) receiving sensor data from the traffic information supplier;
(d) comparing the speed data received in said step (a) with the sensor data received in said step (c);
(e) generating an alert containing proposed corrective action, if there is a discrepancy between the speed data and sensor data;
(f) broadcasting refined traffic information to the navigation device.

2. The method as recited in claim 1, wherein the location data and speed data received in said step (a) is transmitted by the navigation device over a wireless communication network.

3. The method as recited in claim 1, wherein the location data and speed data received in said step (a) is transmitted by the navigation device over a satellite communication network.

4. The method as recited in claim 1, wherein the sensor data received in said step (c) was transmitted from a sensor located in a similar geographic area as when the vehicle navigation device transmitted the location data and speed data.

5. The method as recited in claim 1, wherein the sensor data received in said step (c) comprises sensor speed data.

6. The method as recited in claim 5, wherein comparing the speed data with the sensor data in said step (d) comprises:

(i) determining the speed difference between the speed data received in said step (a) and a sensor speed data received in said step (c).

7. A method for improving the accuracy of traffic information provided to a navigation device within a vehicle, the vehicle traveling along a road having a plurality of speed sensors that each provide traffic flow information to a traffic information supplier, the method comprising:

(a) receiving location data and speed data from the navigation device;
(b) broadcasting the location data and speed data received in said step (a) to the traffic information supplier;
(c) receiving sensor data from the traffic information supplier;
(d) comparing the speed data received in said step (a) with the sensor data received in said step (c);
(e) generating an alert containing proposed corrective action, if there is a discrepancy between the speed data and sensor data; and
(f) broadcasting refined traffic information to the navigation device;

wherein generating an alert in said step (e) comprises:

(i) generating a first alert, if the speed difference between the speed data received in said step (a) and the sensor speed data received in said step (c) is between zero and ten miles per hour;
(ii) generating a second alert, if the speed difference between the speed data received in said step (a) and the sensor speed data received in said step (c) is between ten and sixteen miles per hour;
(iii) generating a third alert, if the speed difference between the speed data received in said step (a) and the sensor speed data received in said step (c) is between sixteen and twenty miles per hour; and
(iv) generating a fourth alert, if the speed difference between the speed data received in said step (a) and the sensor speed data received in said step (c) is greater that twenty miles per hour.

8. The method as recited in claim 7 wherein the second alert generated in said step (ii) comprises requesting the traffic information supplier to check the sensor data received in said step (c).

9. The method as recited in claim 7 wherein the third alert generated in said step (iii) comprises requesting the traffic information supplier to monitor the speed sensor.

10. A method for improving the accuracy of traffic information provided to a navigation device within a vehicle, the vehicle traveling along a road having a plurality of speed sensors that each provide traffic flow information to a traffic information supplier, the method comprising:
   (a) receiving location data and speed data from the navigation device;
   (b) broadcasting the location data and speed data received in said step (a) to the traffic information supplier;
   (c) receiving sensor data from the traffic information supplier;
   (d) comparing the speed data received in said step (a) with the sensor data received in said step (c);
   (e) generating an alert containing proposed corrective action, if there is a discrepancy between the speed data and sensor data; and
   (f) broadcasting refined traffic information to the navigation device;
   wherein generating an alert in said step (e) comprises:
      (i) generating a first alert, if the speed difference between the speed data received in said step (a) and the sensor speed data received in said step (c) is less than twenty percent;
      (ii) generating a second alert, if the speed difference between the speed data received in said step (a) and the sensor speed data received in said step (c) is between twenty and thirty percent;
      (iii) generating a third alert, if the speed difference between the speed data received in said step (a) and the sensor speed data received in said step (c) is between thirty and forty percent; and
      (iv) generating a fourth alert, if the difference between the speed data received in said step (a) and the sensor speed data received in said step (c) is greater that forty percent.

11. A method for improving the accuracy of traffic information provided to a navigation device within a vehicle, the vehicle traveling along a road having a plurality of speed sensors that each provide traffic flow information to a traffic information supplier, the method comprising:
   (a) receiving location data and speed data from the navigation device;
   (b) broadcasting the location data and speed data received in said step (a) to the traffic information supplier;
   (c) receiving sensor data from the traffic information supplier;
   (d) comparing the speed data received in said step (a) with the sensor data received in said step (c);
   (e) generating an alert containing proposed corrective action, if there is a discrepancy between the speed data and sensor data;
   (f) broadcasting refined traffic information to the navigation device; and
   (g) transmitting the alert generated in said step (e) to the traffic information supplier.

12. A method for improving the accuracy of traffic information provided to a navigation device within a vehicle, the vehicle traveling along a road having a plurality of speed sensors that each provide traffic flow information to a traffic information supplier, the method comprising:
   (a) receiving location data and speed data from the navigation device;
   (b) broadcasting the location data and speed data received in said step (a) to the traffic information supplier;
   (c) receiving sensor data from the traffic information supplier;
   (d) comparing the speed data received in said step (a) with the sensor data received in said step (c);
   (e) generating an alert containing proposed corrective action, if there is a discrepancy between the speed data and sensor data; and
   (f) broadcasting refined traffic information to the navigation device;
   wherein broadcasting refined traffic information in said step (f) comprises:
      (i) correcting the sensor data received in said step (c); and
      (ii) transmitting the traffic information to the navigation device, based at least in part on the sensor data corrected in said step (i).

* * * * *